United States Patent [19]
Katagiri et al.

[11] Patent Number: 5,504,548
[45] Date of Patent: Apr. 2, 1996

[54] IMAGE-PLANE-SIZE CHANGEOVER CAMERA

[75] Inventors: Moriya Katagiri, Hachioji; Kunio Yokoyama, Hino; Takashi Inoue, Hachioji; Yasuo Yamazaki, Hino; Shunji Matsutani, Akishima; Tatsuya Suzuki, Funabashi; Hiroyuki Ando, Hachioji, all of Japan

[73] Assignee: Olympus Optical Co., Ltd., Tokyo, Japan

[21] Appl. No.: 158,685

[22] Filed: Nov. 24, 1993

[30] Foreign Application Priority Data

| | | | |
|---|---|---|---|
| Nov. 26, 1992 | [JP] | Japan | 4-317418 |
| Dec. 3, 1992 | [JP] | Japan | 4-324456 |
| Dec. 4, 1992 | [JP] | Japan | 4-325780 |
| Dec. 4, 1992 | [JP] | Japan | 4-325781 |
| Mar. 12, 1993 | [JP] | Japan | 5-052552 |

[51] Int. Cl.$^6$ ................................ G03B 17/02
[52] U.S. Cl. ................................ 354/159
[58] Field of Search ................ 354/94, 159, 288

[56] References Cited

U.S. PATENT DOCUMENTS

| | | | |
|---|---|---|---|
| 4,728,977 | 3/1988 | Yomogizawa et al. | 354/187 |
| 5,345,285 | 9/1994 | Hasushita et al. | 354/159 |
| 5,376,982 | 12/1994 | Takahashi | 354/159 |

*Primary Examiner*—David M. Gray
*Attorney, Agent, or Firm*—Louis Weinstein

[57] ABSTRACT

This invention is directed to a camera in which an ordinary or normal photographing image-plane size, a photographing image-plane size narrower or smaller than the normal photographing image-plane size, for example, a panoramic size, and the like are changeable, the camera comprising a back closure openable and closable with respect to a camera body, an aperture arranged between a film and a photographing lens, for regulating an exposure range corresponding to the normal photographing image-plane size, a light shielding unit arranged between the film and the photographing lens and so arranged as to be movable between a saving position where the light shielding unit is saved (i.e. spaced) from the inside of the aperture so as not to interrupt an exposure luminous flux incident upon the aperture and a projecting position where the light shielding unit projects inwardly of the aperture to interrupt a part or substantially all of the exposure luminous flux, an operating unit for assigning the narrow photographing image-plane size, a detecting unit for detecting at least one camera operating condition including a power source condition of the camera, an opening and closing condition of the back closure, a forcible rewinding condition of the film and an exposure condition to a film surface, and a drive unit for driving the exposure unit, the drive unit driving the light shielding unit to the inward-most projected position or a saved position in spite of assignment of the operating unit in accordance with an output from the detecting unit.

10 Claims, 32 Drawing Sheets

IMAGE-PLANE-SIZE CHANGEOVER CAMERA

BACKGROUND OF THE INVENTION

1. Field of the Invention

The present invention relates to image-plane-size changeover cameras and, more particularly, to an image-plane-size changeover camera capable of changing or modifying an exposure scope or range in a film.

2. Related Art And Prior Art Statement

Many cameras which change over an image plane size to perform photographing, particularly, cameras which in changeover is made to a trimming size such as a panoramic size or the like so as to be capable of photographing have conventionally been put on the market, and have been proposed. As an example of such cameras, it can be cited as disclosed in Japanese Utility Model Laid-Open No. HEI 3-105834 (105834/1991), Japanese Utility Model Laid-Open No. HEI 3-122435 (122435/1991) or the like.

Technical means disclosed in these publications is arranged such that an exposure region is trimmed by mask means such as a light shielding plate or the like to modify an image plane size. More particularly, modification of the image plane size is performed such that the mask means projects inwardly of an aperture portion in a camera body, whereby the camera is brought to a trimming condition such as panorama or the like, the camera is evacuated or saved outwardly of the aperture portion, whereby the camera is brought to a normal size that is a non-trimming condition, and the like. A mask position under a condition that a back closure opens can optionally be changed over by operation also even at a non-trimming position and at a trimming position. Further, in the camera proposed in these publications, the mask means is always arranged by two image-plane-size regulating elements, in spite of the image plane size of the normal size or the panorama size.

When such camera capable of modifying the image plane size is applied to, for example, a single-lens reflex camera, the camera is arranged such that a focal plane shutter is normally arranged within the aperture portion.

Moreover, when the camera capable of modifying the image plane size is applied to, for example, a lens shutter camera, the arrangement is such that a lens shutter blade, a photographing optical lens and the like are arranged in front of the interior of the aperture portion.

However, with the arrangement of the above-described conventional example, when a back closure of the camera opens at the time of the panoramic condition, a user or a leader portion of the film is inadvertently in contact with the mask element, because the mask element projects into the aperture portion. Thus, there is a fear that the mask element is damaged or broken.

Meanwhile, if the mask means is at the non-trimming position under the condition that the back closure opens, the user is inadvertently in contact with photographing means such as the photographing lens which is arranged in the vicinity of the aperture, the shutter blade of the focal plane shutter, or the like, so that there is a fear that the photographing lens, the shutter blade or the like is exposed to dirt and is damaged. In a case where such photographing lens is dirt so that photographing is not well taken or the shutter blade is broken, it is needless to say that there is a fear that a deficiency such as insufficient exposure, over exposure, under exposure or the like occurs or is generated. Further-more, if the aperture is maintained open upon rewinding of the film, there is a case where the leader portion of the film is in contact with the photographing means such as the photographing lens, the shutter or the like so that a similar problem is generated.

OBJECTS AND SUMMARY OF THE INVENTION

It is a first object of the invention to provide an image-plane-size changeover camera which is high in reliability.

It is a second object of the invention to provide an image-plane-size changeover camera in which mask means is not broken.

It is a third object of the invention to provide an image-plane-size changeover camera in which photographing means is not broken.

It is a fourth object of the invention to provide an image-plane-size changeover camera in which a film is not broken.

It is a fifth object of the invention to provide an image-plane-size changeover camera in which mask means, photographing means or a film is not broken in interlocking with the fact that a power source of the camera is turned OFF from turning-ON.

It is a sixth object of the invention to provide an image-plane-size changeover camera in which mask means, photographing means or a film is not broken in interlocking with the fact that a back closure of the camera is changed from a closed condition to an open condition.

It is a seventh object of the invention to provide an image-plane-size changeover camera in which mask means, photographing means or a film is not broken when the film is forcedly or forcibly rewound.

It is an eighth object of the invention to provide an image-plane-size changeover camera in which an exposure condition to a film surface is detected to prevent mask means, photographing means or a film from being broken.

Briefly, according to the invention, there is provided a camera in which a normal photographing image-plane size and a photographing image-plane size narrower than the normal photographing image-plane size are changeable, the camera comprising an aperture arranged between a film and a photographing lens, for regulating an exposure range corresponding to the normal photographing image-plane size, light shielding means arranged between the film and the photographing lens, the light shielding means being so arranged as to be movable between a saving position where the light shielding means is saved from the inside of the aperture so as not to interrupt an exposure luminous flux which is incident upon the aperture, and a projecting position where the light shielding means projects inwardly of the aperture to interrupt a part or substantially the whole of the exposure luminous flux, operating means for assigning the narrow photographing image-plane size, and drive means for driving the light shielding means, the drive means driving the light shielding means to a predetermined position in spite of assignment of the operating means, in accordance with a condition of the camera.

These and other objects and advantages of the present invention will become further apparent from the following detailed explanation.

DETAILED DESCRIPTION OF THE PREFERRED EMBODIMENTS

Various embodiments of the invention will hereunder be described with reference to the accompanying drawings.

Figure 1:
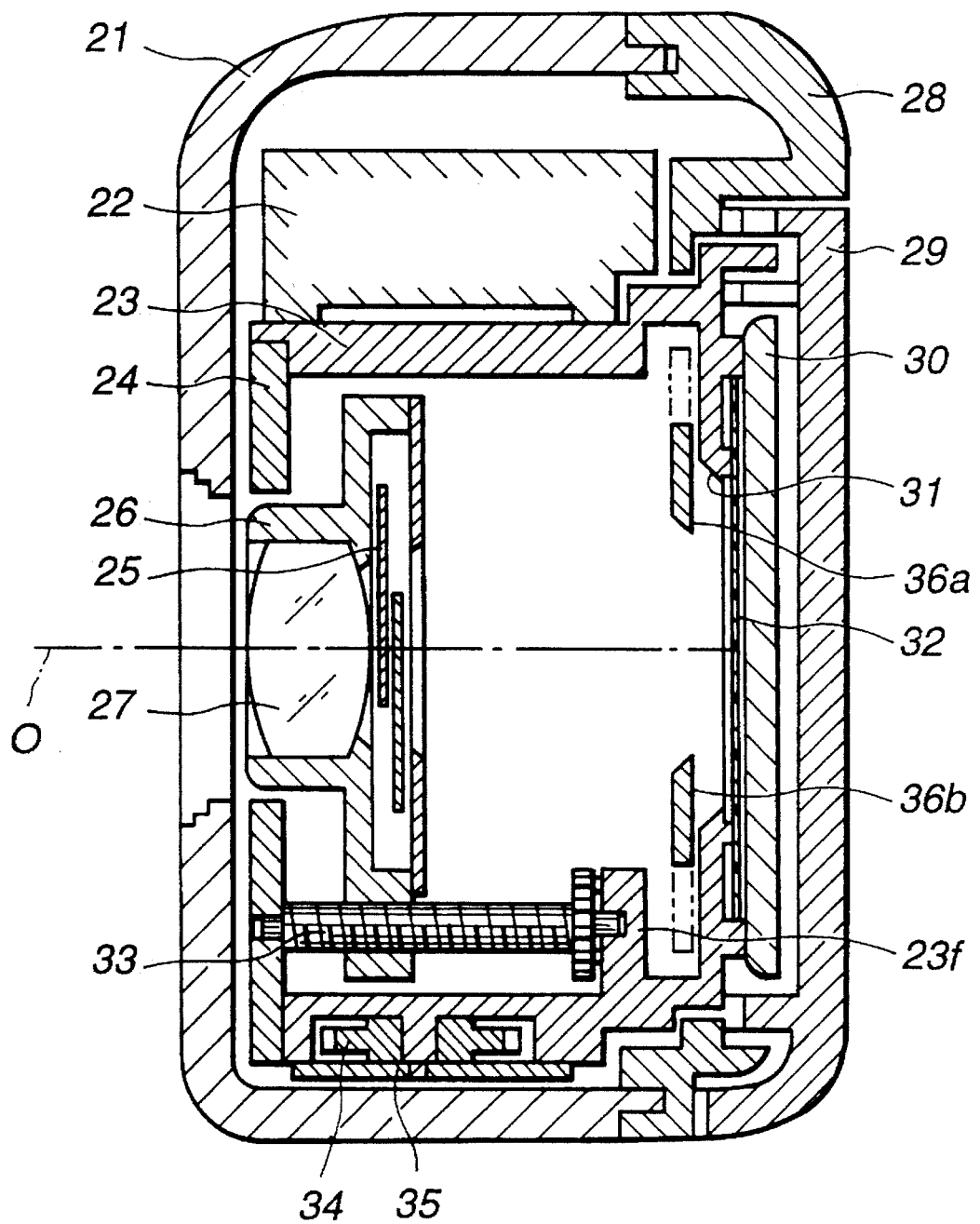
FIG. 1 is a central longitudinal cross-sectional view of an image-plane-size changeover camera, showing a first embodiment of the invention.

FIGS. 1 to 9 show a first embodiment of the invention. FIG. 1 is a central longitudinal cross-sectional view showing an image-plane-size changeover camera according to the first embodiment of the invention.

The first embodiment is directed to the image-plane-size changeover camera which is provided with a lens shutter, and is arranged such that, as shown in FIG. 1 to be described subsequently, a photographing lens 27 is located in front of a shutter blade 25 (the left-hand side in FIG. 1). For this reason, when a back closure 29 opens, the photographing lens 27 is not directly observed from the side of an aperture 31, but an article capable of being viewed is the shutter blade 25. However, since the shutter blade 25 is spaced from the aperture 31 and is arranged in front thereof, there is almost no possibility that a user is in contact with the shutter blade 25. Rather, the possibility is high in which a pair of panoramic masks 36a and 36b which are arranged in the vicinity of the aperture 31 are in contact with the shutter blade 25 when the back closure 29 opens. In this manner, in a case where photographing means such as the photographing lens, the shutter blade or the like is spaced away from the aperture, it is effective that the panoramic mask is saved so as not to be damaged or broken. Such an example will hereunder be described.

The aperture 31 which defines a region of a photographing image plane of 36 mm in width ×24 mm in length (a Leica size), for example, serving as normal photographing, is formed at a rear portion of a camera body 23. Just in rear of the aperture 31, a roll film 32 is developed and stretched so as to be vertical or perpendicular to an optical axis O of the photographing lens 27. Just to the rear of the roll film 32, a pressure plate 30 which is arranged on the back closure 29 is so arranged as to urge the film 32 forwardly. The pressure plate 30 is arranged such that upper and lower edge portions thereof are abutted against pressure-plate rails which are provided to in projection rearwardly horizontally respectively on a rear-surface upper portion and a rear-surface lower portion of the aperture 31, by an urging spring 41 (not shown) (refer to FIG. 2) which is arranged on the side of a rear surface of the pressure plate 30. The film 32 is developed and stretched so as to be capable of being fed into a gap which is defined between the aperture 31 and the pressure plate 30.

The upper changeover mask 36a and the lower changeover mask 36b that are mask means for covering the upward edge portion and the downward edge portion of the aperture 31 to change over the photographing image-plane size so as to define or limit the photographing range of the aperture 31 are arranged just in front of the aperture 31 so as to be movable in upper and lower directions opposite to each other. The masks 36a and 36b are so arranged as be operated from the outside of the camera by an operating element (not shown). When the upper changeover mask 36a and the lower changeover mask 36b are so arranged as to be moved respectively upwardly and downwardly with respect to the aperture 31 (shown by two-dot-and-chain lines), the whole aperture 31 regulates the photographing range. The photographing range at this time is brought to the normal photographing. Meanwhile, when the upper changeover mask 36a and the lower changeover mask 36b are so arranged as to invade respectively a lower portion and an upper portion within the range of the aperture 31 (shown by the solid lines), the photographing image plane is brought to a panoramic photographing image plane of, for example, 36 mm in width ×12 mm in length that is a photographing image plane smaller than the normal photographing. Thus, panoramic photographing is performed.

A lens frame 26 which holds or retains the photographing lens 27 is arranged on a center of a front portion of the camera body 23 in front of the aperture 31. The shutter blade 25 for exposing a subject image onto the film 32 is supported by the lens frame 26 in rear of the photographing lens 27 so as to be capable of opening and being closed. A feed screw shaft 33 formed with a male screw is threadedly engaged with a threaded bore which is formed with a female screw and which is formed in an optical axis direction, at a lower end portion of the lens frame 26. The feed screw shaft 33 has one end thereof which is supported rotatably in parallel to the optical axis O by a lower portion of a front plate 24 which forms a coming and going opening for the photographing lens 27, which is arranged in a front portion of the camera body 23, and the other end which is supported rotatably in parallel to the optical axis O by a support portion 23f which is provided in projection upwardly in a lower portion of the camera body 23 rearwardly thereof. Thus, the lens frame 26 which retains the photographing lens 27 is retracted in the direction of the optical axis O.

A finder frame 50 (refer to FIG. 3) which supports a finder optical system and a distance measuring unit (both not shown) is arranged above the camera body 23. Further, the camera body 23 has a lower portion whose outward surface portion is formed with a gear arrangement bore. A film rewinding gear 34 is rotatably supported by a support shaft which is provided in projection downwardly of the camera body 23, at a center of the gear arrangement bore. The rewinding gear 34 has a downward edge portion thereof at which a ground plate 35 is arranged integrally with the camera body 23 so as to cover the whole gear arrangement bore.

The camera body 23 is arranged such that a portion thereof in the aperture 31 is light-tightly covered by a front cover 21. The front cover 21 has a central portion of a front surface, which is formed therein with an incident bore through which subject light incident upon the photographing lens 27 is transparentized. Moreover, a rear cover 28 is arranged on a portion of the camera body 23 rearwardly from the aperture 31, so as to cover the camera body 23, except a rear surface portion thereof. The rear closure 29 has one side edge portion (not shown) thereof which is arranged on a rearward surface portion of the rear cover 28 rearwardly of the aperture 31 so as to be capable of opening and being closed with respect to the rear cover 28 by a hinge so as to screen or shield rearward outward light.

Figure 2:
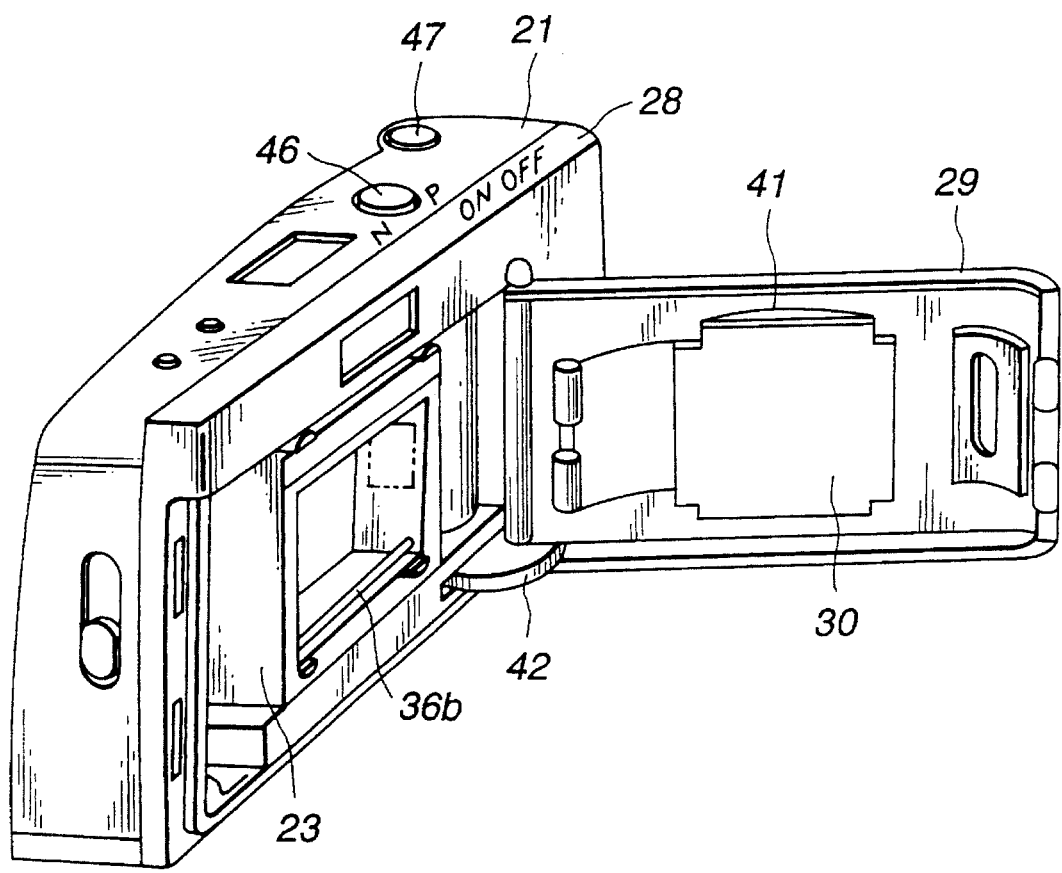
FIG. 2 is an outer-appearance perspective view showing a condition that a back closure open of the image-plane-size changeover camera according to the first embodiment of the invention.

FIG. 2 is an outer appearance perspective view of a condition in which the rear closure is open, of the image-plane-size changeover camera shown in FIG. 1, according to the first embodiment of the invention.

A release button 47 and an image-plane-size changeover knob 46, which changes over photographing (photographing due to the panoramic size, for example) due to non-trimming (photographing due to a normal size) and photographing due to trimming (photographing due to the panoramic size, for example) are arranged on one of the opposite sides of an upper surface of the front cover 21. The image-plane-size changeover knob 46 is fixedly mounted integrally on a forward end portion of an image-plane-size changeover shaft 40 to be described subsequently. Furthermore, the image-plane-size changeover knob 46 is angularly movable partially with respect to the camera body 23. When the knob 46 is angularly moved to a position of "N" as shown in FIG. 2, photographing at the normal size can be performed. Further, when the knob 46 is angularly moved to a position of "P" as shown in FIG. 2, photographing at the panoramic size can be performed.

The back closure 29 is supported for angular movement by an angular-movement central shaft which is vertically supported on the one side end of the rear cover 28, so as to open and be closed. The back closure 29 has a lower portion thereof on which a sector shaped back-closure gear 42 is arranged around the angular-movement central shaft so as to be directed inwardly. Thus, when the back closure 29 is closed, the back-closure gear 42 enters into the camera body 23 from a bore portion which is formed in the camera body 23. The back-closure gear 42 is has a gear portion 42a which is formed only in a peripheral surface adjacent to the camera body 23 (refer to FIG. 7). Thus, only upon opening and closing operation of the back closure 29, the gear portion 42a is in mesh with a mask-changeover-shaft drive gear portion 63 to be described subsequently. In this connection, the back-closure gear portion 42 will be described in detail subsequently.

Figure 3:
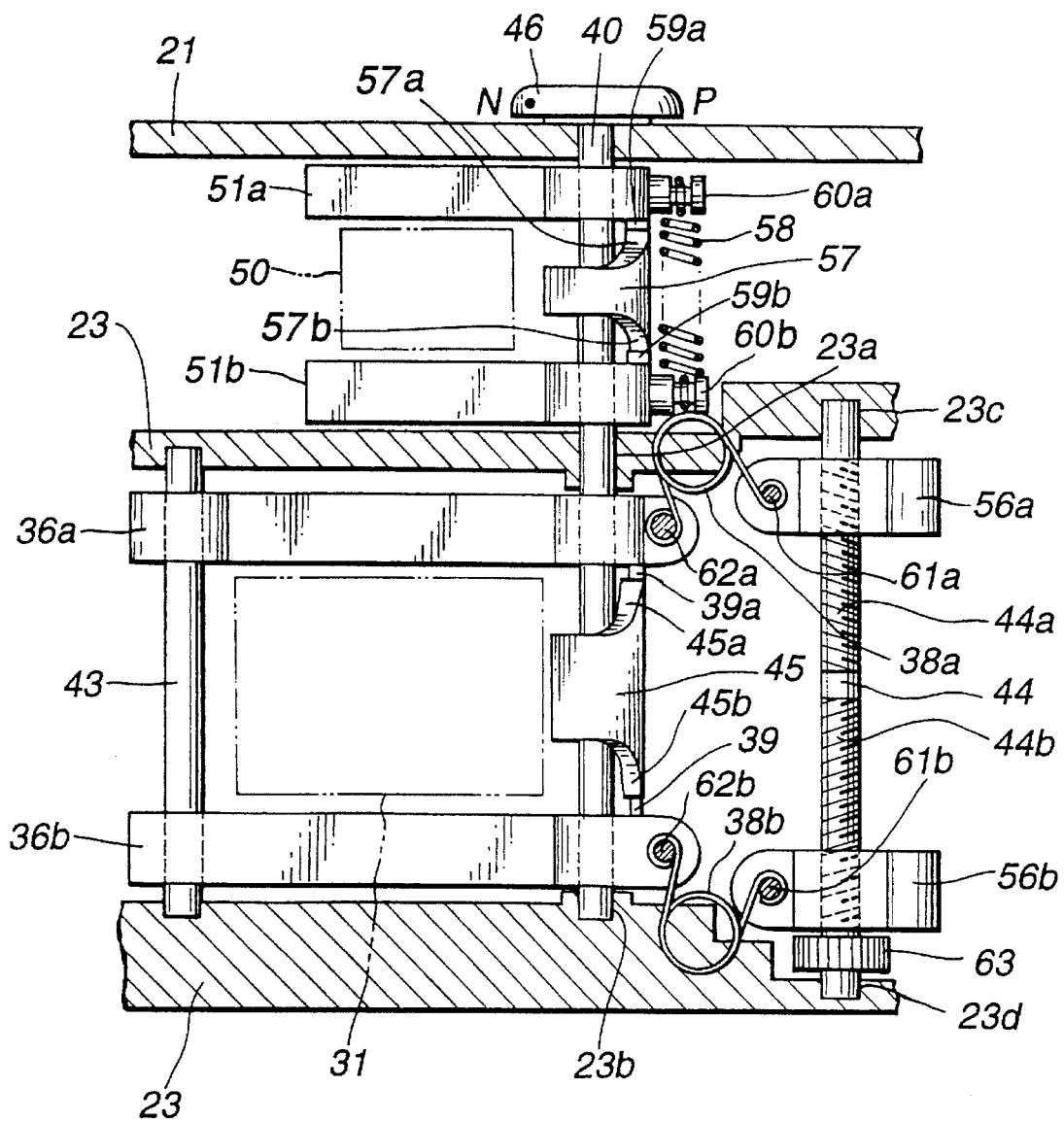
FIG. 3 is a cross-sectional view showing an arrangement of a mask and a peripheral portion thereof at the time the back closure is under a closed condition and the camera is under a normal condition, in the first embodiment.
Figure 4:
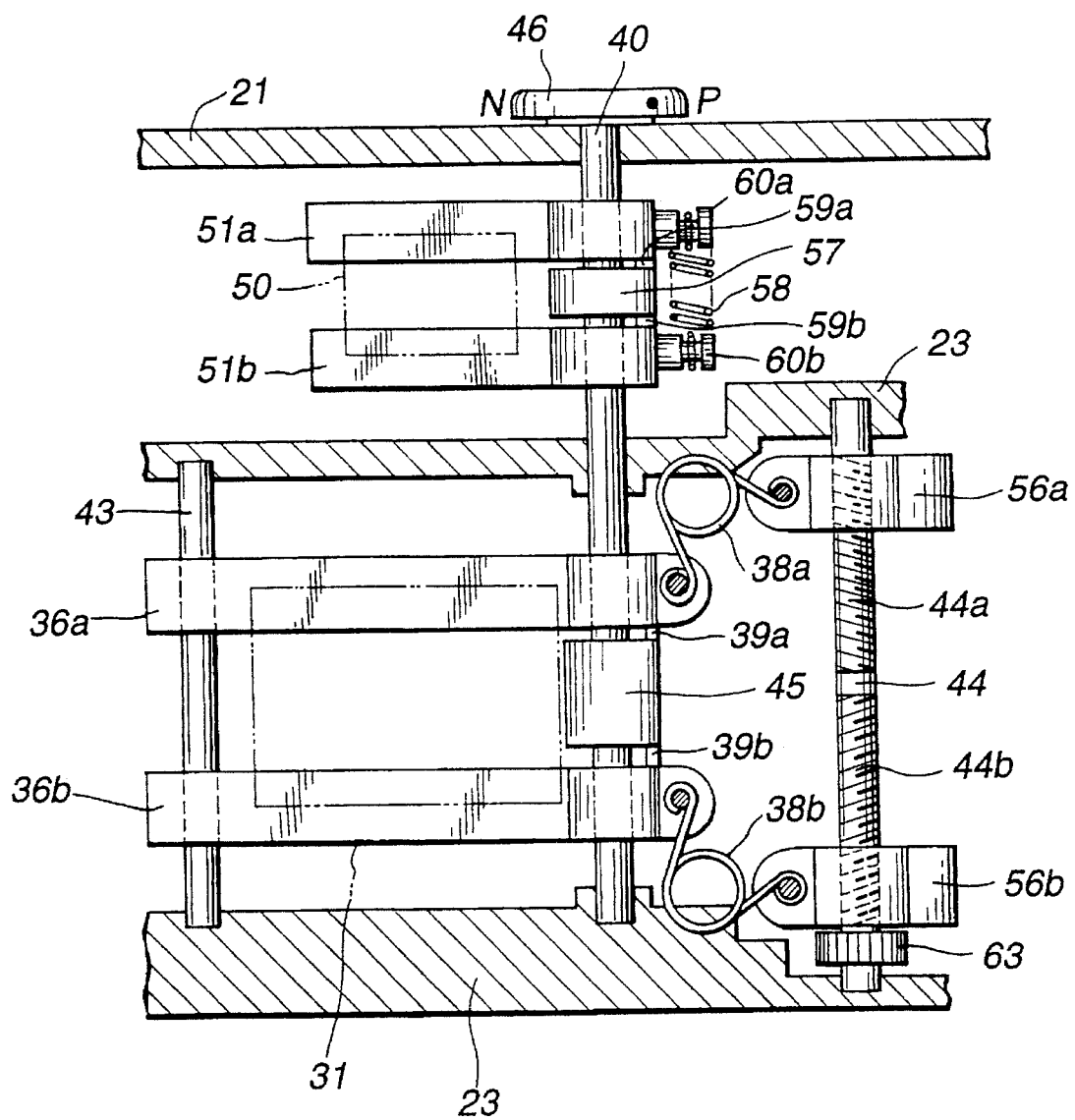
FIG. 4 is a cross-sectional view showing an arrangement of the mask and the peripheral portion thereof at the time the back closure is under the closed condition and the camera is under a panoramic condition, in the first embodiment.
Figure 5:
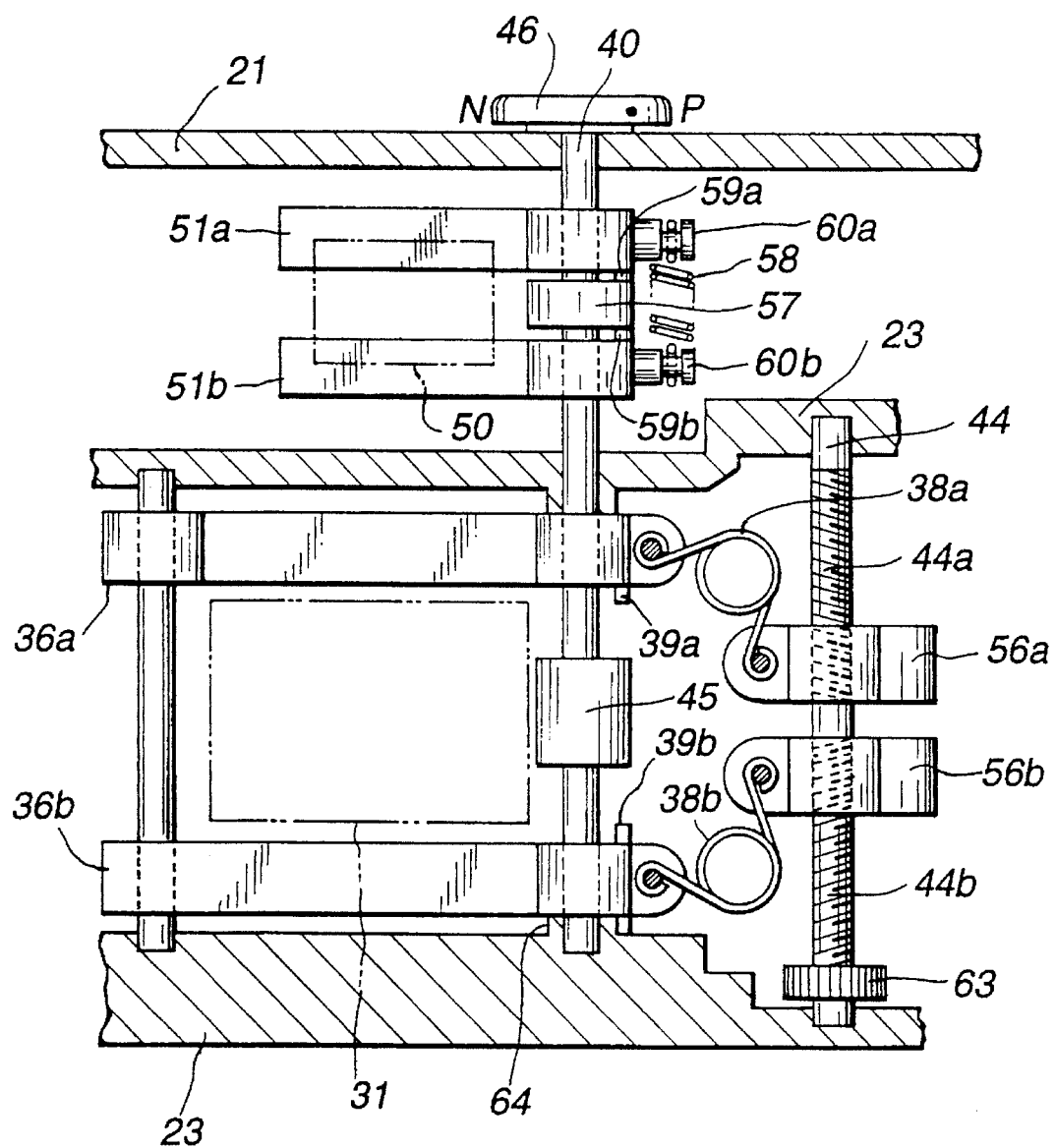
FIG. 5 is a cross-sectional view showing an arrangement of the mask and the peripheral portion thereof at the time the back closure is under an open condition and the camera is under the panoramic condition, in the first embodiment.
Figure 6:
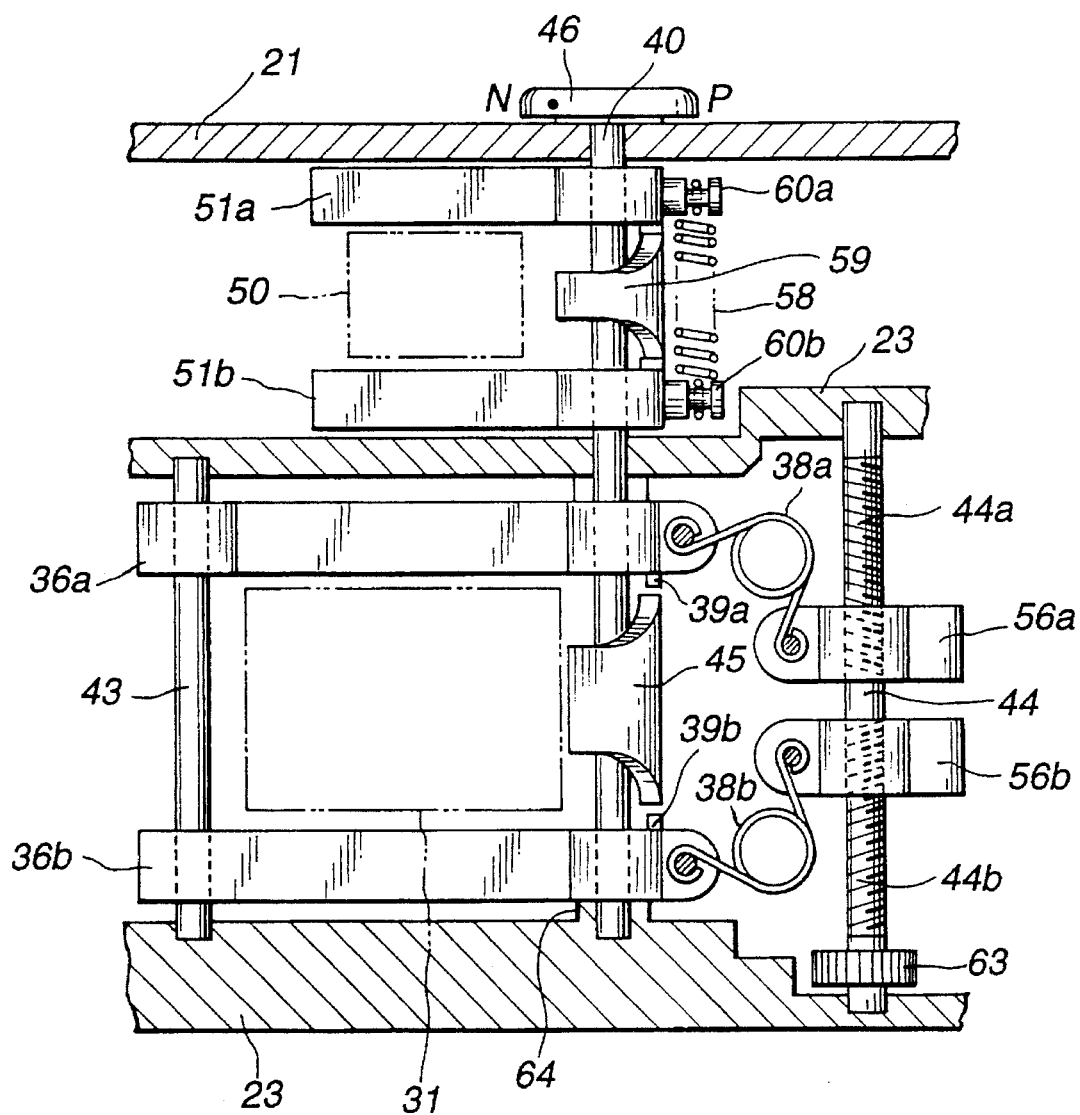
FIG. 6 is a cross-sectional view showing an arrangement of the mask and the peripheral portion thereof at the time the back closure is under the open condition and the camera is under the normal condition, in the first embodiment.

FIGS. 3 to 6 are cross-sectional views showing, in partial transparency, the masks 36a and 36b and the peripheral portion thereof in the first embodiment, from the side of a camera rear surface. In this connection, FIGS. 3 and 4 show a condition under which the back closure 29 is closed, while FIGS. 5 and 6 show a condition under which the back closure 29 opens.

Description will first be made with reference to FIG. 3. FIG. 3 shows that the image-plane-size changeover knob 46 assigns photographing at the normal size, whereby the image-plane-size changeover shaft 40 is in the photographing position (N) at the normal size.

The image-plane-size changeover shaft 40 which extends through the upper surface of the camera body 23 from the bottom of the camera body 23 and which projects through the upper surface of the front cover 21 is arranged on one side (center in FIG. 3) of the camera body 23. The image-plane-size changeover shaft 40 is pivoted for angular movement by a pair of bearing portions 23a and 23b which are provided in projection respectively in upper and bottom surfaces of the camera body 23. Moreover, as described above, the image-plane-size changeover shaft 40 extends from the upper surface of the camera body 23, and the image-plane changeover knob 46 is fixedly mounted on the forward end portion of the shaft 40 which projects from the upper surface of the front cover 21.

A finder cam 57 having end surface cams 57a and 57b which are symmetrical to each other vertically is formed integrally with the outer periphery of the image-plane-size changeover shaft 40, on an upper portion of the changeover shaft 40, i.e., an upper portion of the changeover shaft 40 which is put between the upper surface of the camera body 23 and the front cover 21.

The finder frame 50 is formed on a portion to the left of the finder cam 57 adjacent to the camera center. Furthermore, a pair of finder masks 51a and 51b which are slidable vertically are arranged respectively above and below the finder cam 57 with the image-plane-size changeover shaft 40 serving as a support shaft. The finder masks 51a and 51b offer or present oblong fancy card configuration or strip configuration which extends toward the finder frame 50 from the image-plane-size changeover shaft 40. A pair of cam followers 59a and 59b are formed in projection respectively at positions of proximal ends thereof which are opposed respectively against the cam surfaces 57a and 57b of the finder cam 57, and are abutted respectively against the cam surfaces 57a and 57b. Moreover, spring hooking portions 60a and 60b are formed in projection respectively on proximal end surfaces of the respective finder masks 51a and 51b. Furthermore, a tension spring 58 is provided in suspension between the spring hooking portions 60a and 60b. Thus, the finder masks 51a and 51b are biased toward each other by the tension spring 58. Further, the finder masks 51a and 51b perform vertical movement in directions opposite to each other, in keeping with angular movement of the finder cam 57.

In connection with the above, the finder visual-field frame 50 indicates a visual field or a field of view of the finder upon non-trimming, that is, upon photographing at the normal size.

Meanwhile, a solid or stereophonic cam 45 having end surface cam portions 45a and 45b symmetric with a vertical direction is formed on a lower portion of the image-plane-size changeover shaft 40, that is, on a lower portion of the changeover shaft 40 which is located between the upper surface of the camera body 23 and the bottom surface thereof, integrally with the outer peripheral surface of the image-plane-size changeover shaft 40.

The aperture 31 is formed on the left of the stereophonic cam 45 adjacent to the camera center. Further, the pair of masks 36a and 36b which are slidable vertically with the image-plane-size changeover shaft 40 serving as a support shaft are arranged vertically of the stereophonic cam 45. The masks 36a and 36b offer strip configuration which extends toward the aperture 31 from the image-plane size changeover shaft 40. A pair of cam followers 39a and 39b are formed in projection respectively at positions of the proximal ends thereof opposed respectively against the cam surfaces 45a and 45b of the stereophonic cam 45. When the cam followers 39a and 39b are biased toward each other by torsion coil springs 38a and 38b to be described subsequently, the cam followers 39a and 39b are abutted respectively against the cam surfaces 45a and 45b. That is, under a condition illustrated in FIG. 3, the cam followers 39a and 39b are abutted respectively against the cam surfaces 45a and 45b.

Moreover, spring hooking portions 62a and 62b are formed in projection toward this side of the sheet of paper at the proximal ends of the respective masks 36a and 36b. The torsion coil springs 38a and 38b are provided in suspension respectively between the spring hooking portions 61a and 61b which are formed in projection similarly toward this side of the sheet of paper at one side of charge plates 56a and 56b to be described subsequently. In this connection, the torsion coil springs 38a and 38b are pivoted for angular movement respectively to the spring hooking portions 61a, 61b, 62a and 62b at ends of the torsion coil springs 38a and 38b.

The masks 36a and 36b and the charge plates 56a and 56b are biased away from each other vertically in the figure and are retained by the torsion coil springs 38a and 38b. Specifically, under the condition illustrated in FIG. 3, the masks 36a and 36b are biased toward each other.

Furthermore, the masks 36a and 36b have respective forward ends thereof which are supported for vertical sliding by a support shaft 43 which is arranged between the upper and lower surfaces of the camera body 23.

A mask changeover shaft 44 which is pivoted for angular movement to bearing portions 23c and 23d which are provided in projection respectively in upper and bottom surfaces of the camera body 23 is arranged on the right of the image-plane-size changeover shaft 40. A left-hand threaded portion 44a and a right-hand threaded portion 44b in division into upper and lower portions are threadedly formed in a central portion of the mask changeover shaft 44. Further, the pair of charge plates 56a and 56b which are threadedly engaged respectively with the left-hand threaded portion 44a and the right-hand threaded portion 44b so as to be moved vertically in directions opposite to each other are arranged respectively on the left-hand threaded portion 44a and the right-hand threaded portion 44b. The above-described spring hooking portions 61a and 61b are formed in projection respectively on the charge plates 56a and 56b so as to be directed toward this side of the sheet of paper at one sides thereof.

Further, the mask-changeover-shaft drive gear 63 is integrally arranged below the mask changeover shaft 44. Moreover, the mask-changeover-shaft drive gear 63 is adapted to be in mesh with a gear portion of the back-closure gear 42 only upon opening and closing operation of the back closure 29. That is, under the condition illustrated in FIG. 3 in which the back closure 29 is closed, the back-closure gear 42 and the mask-changeover-shaft drive gear 63 are not in mesh with each other.

Figure 7:
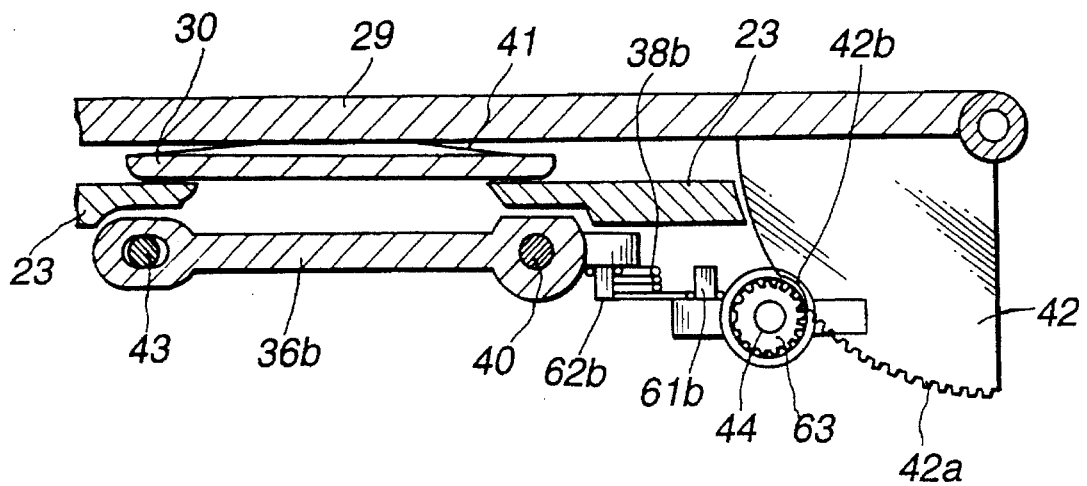
FIG. 7 is a cross-sectional view showing the meshing relationship between a back-closure gear portion and a mask changeover-shaft drive gear at the time the back closure is under a closed condition, in the first embodiment.
Figure 8:
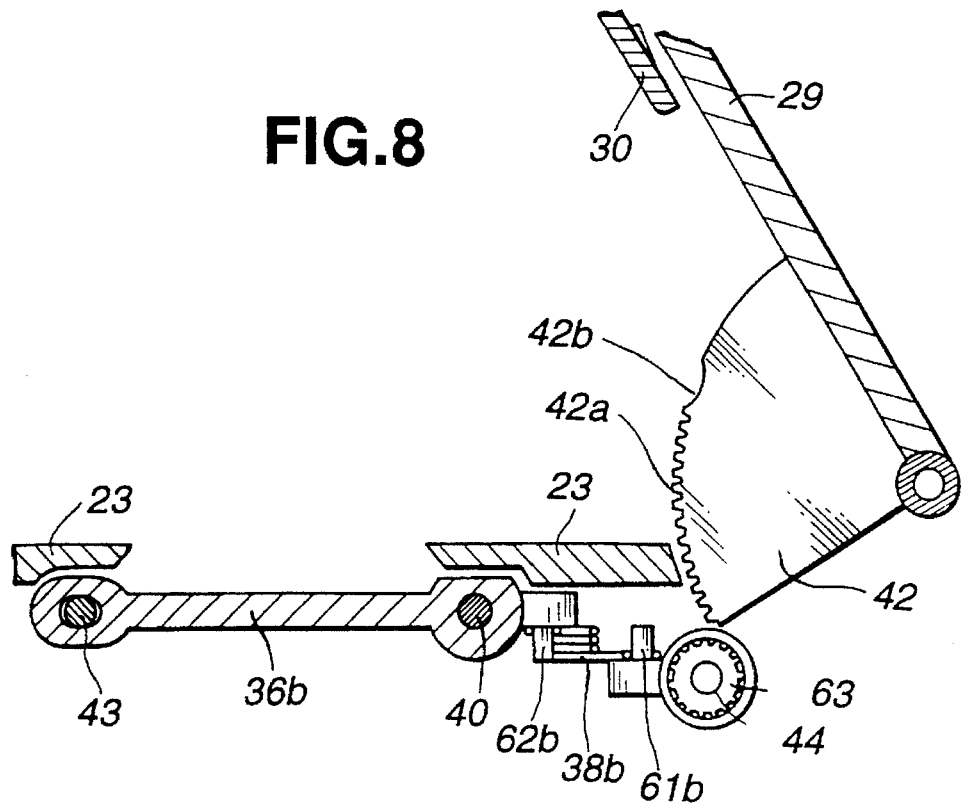
FIG. 8 is a cross-sectional view showing the meshing relationship between the back-closure gear portion and the mask changeover-shaft drive gear at the time the back closure is under an open condition, in the first embodiment.
Figure 9:
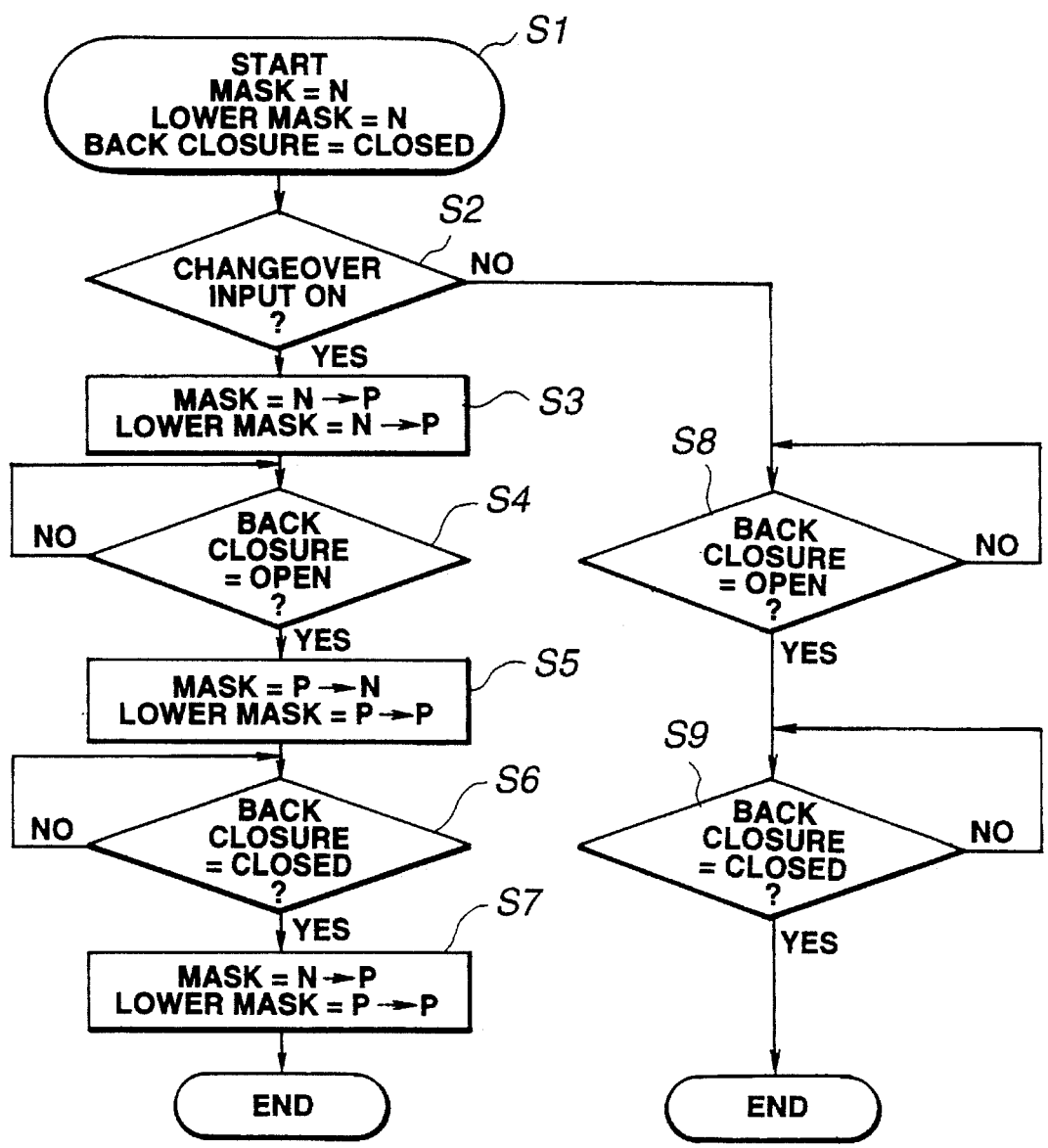
FIG. 9 is a flow chart showing opening and closing operations of the back closure and changeover operation of each of the masks in the image-plane-size changeover camera according to the first embodiment of the invention.

FIGS. 7 and 8 are cross-sectional views which show the meshing relationship between the back-closure gear 42 and the mask-changeover-shaft drive gear 63 as viewed below the camera. Furthermore, FIG. 7 shows a closed condition of the back closure 29, while FIG. 8 shows an open condition of the back closure 29.

The back-closure gear 42 is formed by a sector-shaped thin plate, and is formed with the gear portion 42a at a partial peripheral surface thereof adjacent to the camera body 23. Further, a recess 42b is formed adjacent to the center of the peripheral surface, i.e. at a position opposed against the mask-changeover-shaft drive gear 63 when the back closure 29 is under the closed condition (refer to FIG. 7). Thus, upon the closed condition, the mask-changeover-shaft drive gear 63 and the back-closure gear 42 are not in mesh with each other or are not engaged with each other.

When the back closure 29 opens and is shifted from the closed condition illustrated in FIG. 7 to an open condition illustrated in FIG. 8, the gear portion 42a is in mesh with the mask-changeover-shaft drive gear 63. Thus, the mask-changeover-shaft drive gear 63 is moved angularly. When the back closure 29 further opens, the terminating end of the back-closure gear 42 is spaced from the mask-changeover-shaft drive gear 63. Thus, the meshing relationship ends (refer to FIG. 8).

Operation of the first embodiment will next be described.

FIG. 4 shows a condition under which the image-plane-size changeover shaft 40 is rotated from a position of the photographing position (N) at the normal size to the photographing position (P) at the panoramic size and is changed over from the condition illustrated in FIG. 3.

In keeping with rotation of the image-plane-size changeover shaft 40, the finder cam 57 is rotated in such a direction that a distance between the cam surfaces 57a and 57b at the abutting position between the cam followers 59a and 59b is shortened. Thus, the finder masks 51a and 51b are moved toward each other under the biasing force of the tension spring 58 to cover the upper and lower portions of the finder frame 50 to mask the same. Accordingly, this means that, in FIG. 3, the finder masks 51a and 51b which are in the photographing position at the normal size (the normal position N) are moved to the photographing position at the panoramic size (the panoramic position P) as shown in the figure.

Further, the stereophonic cam 45 is rotated in such a direction that a distance between the cam surfaces 45a and 45b at the abutting position between the cam followers 39a and 39b is shortened. At this time, since the charge plates 56a and 56b are in such a direction as to be spaced from each other, the masks 36a and 36b are thus moved toward each other by the torsion coil springs 38a and 38b to cover the upper and lower portions of the aperture 31 to mask the same. Under the condition illustrated in FIG. 4, photographing at the panoramic size is performed.

FIG. 5 shows a condition under which the back closure 29 opens from the condition illustrated in FIG. 4.

When the back closure 29 opens, shifting is made from the condition illustrated in FIG. 7 to the condition illustrated in FIG. 8, as described previously. Thus, the mask-changeover-shaft drive gear 63 and the mask changeover shaft 44 are moved angularly. In keeping therewith, since the charge plates 56a and 56b are moved toward each other, the masks 36a and 36b are moved away from each other by the torsion coil springs 38a and 38b so as to be displaced from the aperture 31. By the fact that the mask 36b is abutted against the engaging portion 64, the masks 36a and 36b are retained or maintained at the normal position. Moreover, the condition of the finder masks 51a and 51b is not changed, and the finder masks 51a and 51b hold or retain the panoramic position illustrated in FIG. 4.

When the back closure 29 is closed from this condition, the charge plates 56a and 56b are moved away from each other, reversely to the above-described fact. The masks 36a and 36b are moved toward each other to mask the aperture 31. That is, a mask condition is returned to the condition shown in FIG. 4.

FIG. 6 shows a condition at the time the back closure 29 opens, from the condition illustrated in FIG. 3.

Also in this case, when the back closure 29 opens, a gear condition is shifted from the condition shown in FIG. 7 to the condition shown in FIG. 8, as described above. Thus, the mask-changeover-shaft drive gear 63 and the mask changeover shaft 44 are moved angularly. In keeping therewith, the charge plates 56a and 56b are moved toward each other. Although the masks 36a and 36b have already been retained to the position spaced from the aperture 31, by the stereophonic cam 45, the masks 36a and 36b are slightly moved further away from each other by the torsion coil springs 38a and 38b and are retained in this position. By the fact that the mask 36b is abutted against the engaging portion 64, the masks 36a and 36b are retained at the normal position. Moreover, the condition of the finder masks 51a and 51b is not changed, and the finder masks 51a and 51 retain the normal position illustrated in FIG. 3.

Specifically, even if the back closure 29 opens from the normal condition illustrated in FIG. 3, the masks 36a and 36b and the finder masks 51a and 51b are maintained to retain the normal position.

When the back closure 29 is closed from this condition, the charge plates 56a and 56b are moved away from each other, reversely to the fact described above. The masks 36a and 36b are biased toward each other by the torsion coil springs 38a and 38b. However, movement of the masks 36a and 36b is regulated by the stereophonic cam 45, and the masks 36a and 36b are spaced from the aperture 81. That is, a condition is returned to the condition illustrated in FIG. 3.

Furthermore, as will be clear from the above description, even if the image-plane-size changeover shaft 40 is changed over between the normal position (refer to FIG. 3) and the panoramic position (refer to FIG. 6) under a condition in which the back closure 29 opens, the masks 36a and 36b and the finder masks 51a and 51b ensure or secure the normal position, and are always spaced from the aperture 31.

Further, when the back closure 29 is closed while the image-plane-size changeover shaft 40 maintains the panoramic position (refer to FIG. 5) under a condition in which the back closure 29 opens, operation reverse that of the operation described above is performed. The masks 36a and 36b are moved to the panoramic position to mask the aperture 31.

Changeover operation between the back closure and the masks in the first embodiment described above is shown in FIG. 9 as a flow chart.

First, it is assumed that the masks 36a and 36b and the finder masks 51a and 51b are both in or at the normal position (indicated as N in the figure), and the back closure 29 is under the closed condition (Step S1). Here, when image-plane-size changeover inputting is performed (Step S2), the masks 36a and 36b and the finder masks 51a and 51b are both moved to the panoramic position (indicated by P in the figure) (Step S3).

Subsequently, when the back closure 29 opens (Step S4), the masks 36a and 36b are moved from the panoramic position to the normal position, and the finder masks 51a and 51b retain the panoramic position (Step S5). Subsequently, when the back closure 29 is closed (Step S6), the masks 36a and 36b are moved from the normal position to the panoramic position (Step S7).

When the image-plane-size changeover inputting is not performed in Step S2, the condition of the masks 36a and 36b and the finder masks 51a and 51 is not changed in spite of opening and closing of the back closure 29 (Step S8, Step S9).

According to such first embodiment, a drive mechanism for the masks 36a and 36b is skillfully connected to the opening and closing operation of the back closure 29. When the back closure 29 opens, the masks 36a and 36 are moved to positions outside of the aperture 31. Accordingly, there is no fear that a user is inadvertently in contact with the aperture 31 so that the drive mechanism is broken. Thus, the camera is raised in reliability.

Moreover, when the back closure 29 is closed, the masks 36a and 36b are returned to the condition as assignment of the operating means. Furthermore, the finder masks 51a and 51b that are the display means and the image-plane-size changeover shaft 40 which serves as the display means and the operating means do not both correspond to or cope with the opening and closing of the back closure 29, but retain or maintain the condition assigned. Accordingly, confusion is not given to the user, and the camera is brought to a camera which is easy to be used.

Figure 10:
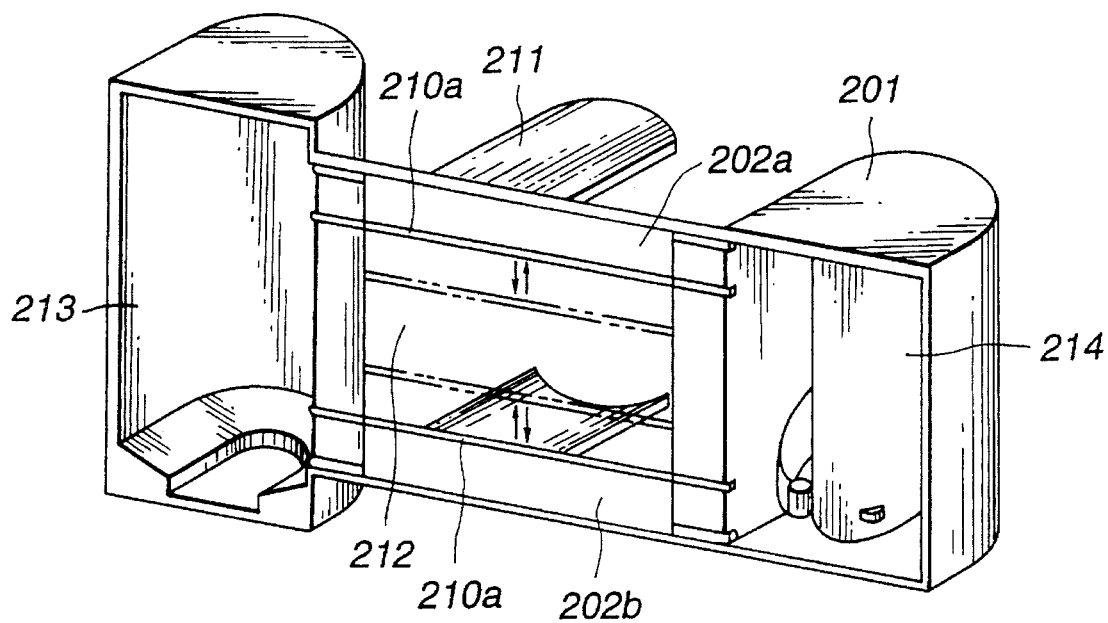
FIG. 10 is a perspective view showing a principal portion of an image-plane-size changeover camera according to a second embodiment of the invention.

FIGS. 10 to 13 show a second embodiment of the invention. FIG. 10 is a perspective view showing a principal portion of an image-plane-size changeover camera according to the second embodiment.

The image-plane-size changeover camera according to the second embodiment is a camera which has ordinary or normal photographing function. A photographing lens barrel 211 is arranged on a front surface of a camera body 201. Furthermore, a patrone chamber 213 is arranged on one side, and a spool chamber 214 is arranged on the other side, with an aperture portion 212 formed in the rear of the photographing lens barrel 211 being put therebetween. Moreover, masks 202a and 202b are arranged respectively at upper and lower portions of the aperture portion 212 for sliding movement vertically. By the fact that the masks 202a and 202b slide vertically, the masks 202a and 202b play a role to regulate a photographing image plane upon photographing at a panoramic size, for example. In this connection, the reference numerals 210a and 210b in FIG. 10 denote film rails which are arranged in the rear of the masks 202a and 202b.

In the present embodiment, the masks 202a and 202b slide vertically to the respective positions thereof illustrated in the two-dot-and-chain lines in FIG. 10 at the time photographing is performed at the panoramic size, to mask the upper and lower parts of the aperture portion 212. Thus, photographing at the panoramic size is made possible.

Figure 11:
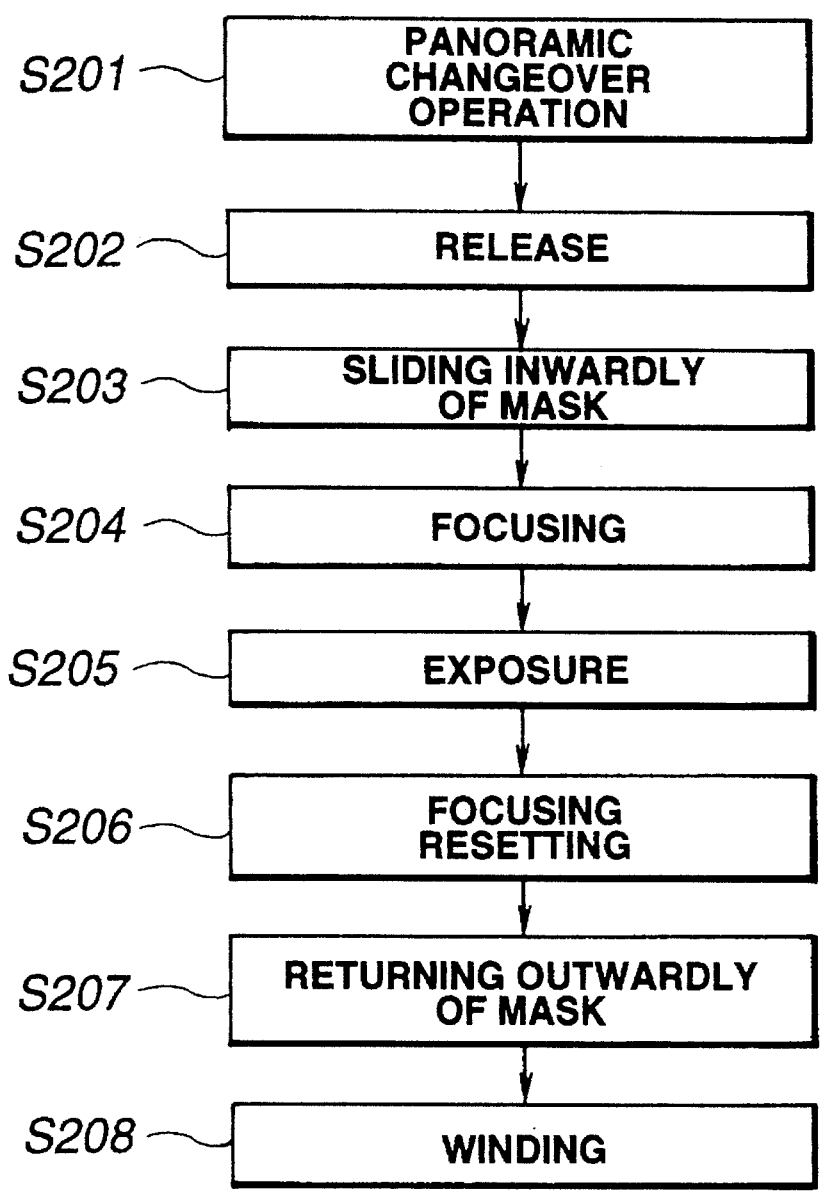
FIG. 11 is a flow chart showing operation of the image-plane-size changeover camera according to the second embodiment.

FIG. 11 is a flow chart showing operation of the image-plane-size changeover camera according to the second embodiment.

First, changeover operation to photographing at the panoramic size is performed (Step S201). When release operation is performed (Step S202), the masks 202a and 202b slide inwardly of the aperture portion 212 (Step S203). Subsequently, focusing and exposure operation are performed (Step S204, S205). Focusing resetting is performed (Step S206). Subsequently, the masks 202a and 202b are spaced outwardly of the aperture portion 212 (Step S207), and winding operation of the film is performed (Step S208).

Specifically, the masks 202a and 202b are not interlocked with the image-plane-size changeover operation, but are always held at the position of the normal size. The masks 202a and 202b slide inwardly of the aperture portion 212 only before and after the exposure operation upon photographing at the panoramic size. That is, interlocked with the image-plane-size changeover operation are a finder visual field frame, a date projecting optical system and the like. Movement of the masks 202a and 202b should be driven in synchronism with a drive source for focusing.

The masks 202a and 202b and peripheral portions thereof in the present second embodiment will next be described in further detail.

Figure 12:
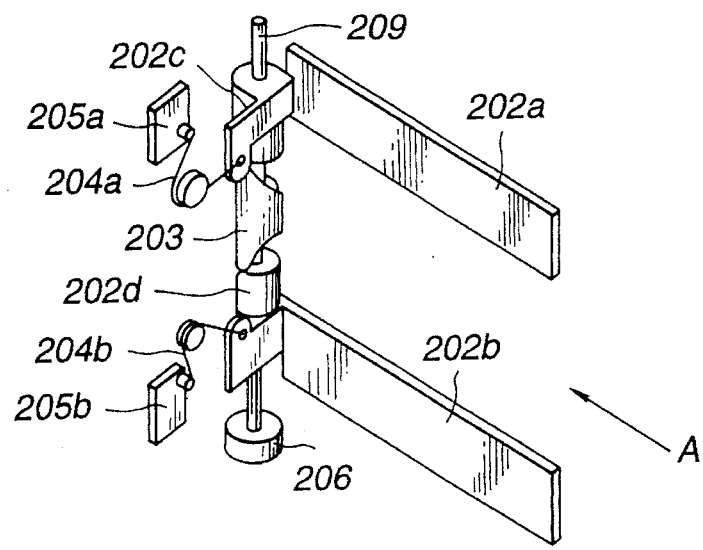
FIG. 12 is a principal-portion enlarged perspective view showing a mask and a peripheral portion thereof in the image-plane-size changeover camera according to the second embodiment.

FIG. 12 is a principal-portion enlarged perspective view showing the masks 202a and 202b and the peripheral position thereof in the image-plane-size changeover camera according to the second embodiment.

As shown in FIG. 12, cam follower portions 202c and 202d are arranged on one side of the masks 202a and 202b, and integral with the masks 202a and 202b so as to be directed forwardly. A lower portion of the cam follower portion 202c and an upper portion of the cam follower portion 202d offer both substantially columnar configurations, and a cam follower is formed at a position at which the lower portion of the cam follower portion 202c and the upper portion of the cam follower portion 202d are opposed against each other. The cam follower portions 202c and 202d are both supported slidably vertically by the same or identical support shaft 209.

A stereophonic cam 203 is arranged, integrally with the support shaft 209, between the cam follower portions 202c and 202d. The stereophonic cam 203 and the cam follower portions 202c and 202d cooperate with each other to form a cam mechanism. A driven gear 206 which is moved angularly in synchronism with the drive source for focusing (not shown) is arranged at a lower portion of the support shaft 209, integrally with the support shaft 209. The arrangement is such that the stereophonic cam 203 is moved angularly in interlocking manner with angular movement of the driven gear 206.

Meanwhile, changeover elements 205a and 205b which are moved vertically in interlocking manner with an image-plane-size changeover operating element (not shown) are arranged respectively further in front of the cam follower portion 202c and the cam follower portion 202d. Further, toggle springs 204a and 204b are arranged respectively between the changeover elements 205a and 205b and the cam follower portions 202c and 202d so as to be capable of changing over a biasing direction with respect to the masks 202a and 202b in keeping with vertical movement of the changeover elements 205a and 205b.

Figure 13:
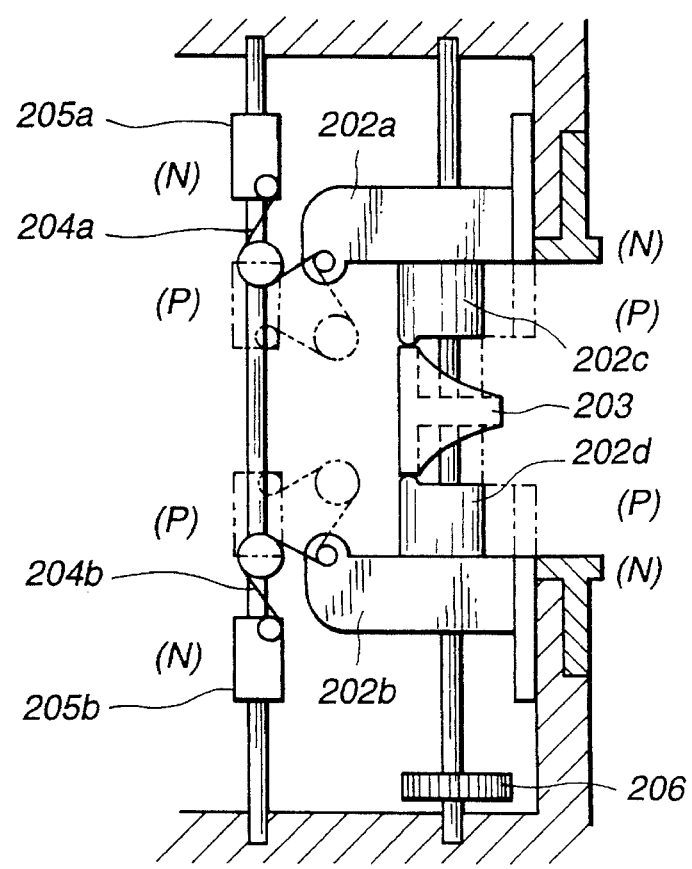
FIG. 13 is a side elevational view showing the mask, a solid or stereoscopic cam and a changeover element and a peripheral portion thereof in the image-plane-size changeover camera according to the second embodiment.

FIG. 13 is a side elevational view showing the masks 202a and 202b, the stereophonic cam 203 and the changeover elements 205a and 205b and peripheral portions thereof in the image-plane-size changeover camera according to the second embodiment, as viewed from a direction indicated by the arrow A in FIG. 12.

Upon photographing at the panoramic size, the changeover elements 205a and 205b are in a (P) position indicated by two-dot-and-dash lines in FIG. 13. The masks 202a and 202b are biased inwardly of the aperture portion 212 (refer to FIG. 10) by the toggle springs 204a and 204b (indicated by two-dot-and-dash lines in FIG. 13). At this time, when the driven gear 206 is moved angularly in synchronism with focusing, the stereophonic cam 203 is also moved angularly in interlocking manner with the driven gear 206. The masks 202a and 202b slide along the stereophonic cam 203 by the above-described cam mechanism, to mask upper and lower parts of the aperture portion 212.

Upon photographing at the normal size, the changeover elements 205a and 205b are in the (N) position indicated by the solid line, and the masks 202a and 202b are biased outwardly of the aperture portion 212 by the toggle springs 204a and 204b (indicated by the solid lines in FIG. 13). At this time, the driven gear 206 is moved angularly in synchronism with focusing. Even if the stereophonic cam 203 is moved angularly in interlocking manner with the driven gear 206, the masks 202a and 202b are not moved.

According to the present second embodiment, the masks 202a and 202b operate only before and after the exposure operation, and are always maintained or retained at a position of the photographing condition at the normal size other than the exposure operation. Accordingly, even if the user inadvertently opens the back closure, the masks 202a and 202b do not exist within the aperture portion 212. Thus, it is possible to prevent such an accident that the user is in contact with the masks 202a and 202b to damage or break the same.

FIGS. 14 to 21 show a third embodiment of the invention.

An image-plane-size changeover camera according to the third embodiment is arranged similarly fundamentally or basically to the above-described first embodiment. A central longitudinal cross section as viewed from a side surface is as shown in FIG. 1. Accordingly, as occasion demands, description will be made with reference to FIG. 1. Further, the same or identical reference numerals are applied to elements and components which perform functions similar to those of the first embodiment, and the description thereof will be omitted.

Figure 14:
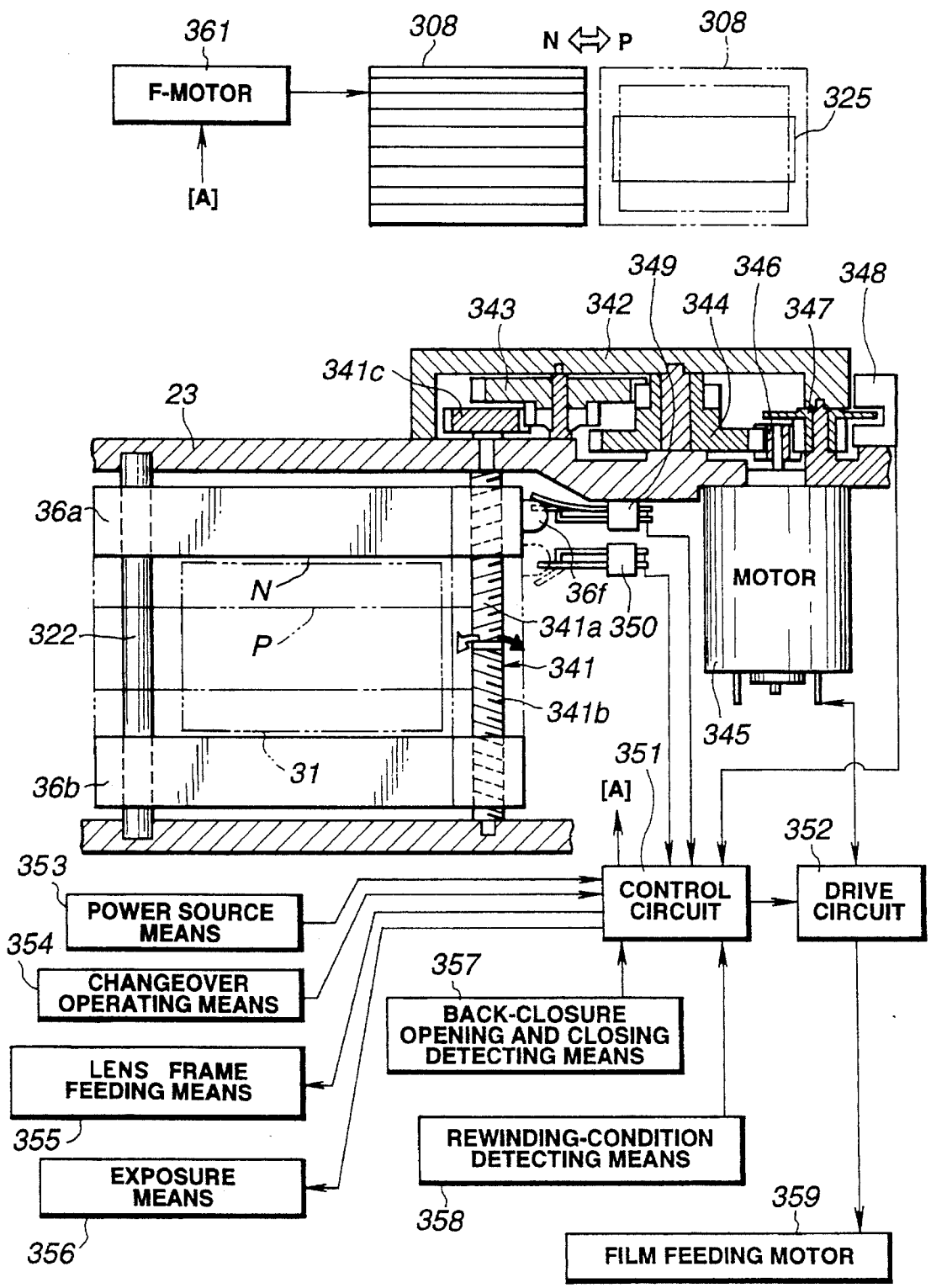
FIG. 14 is a cross-sectional view and a block circuit view showing a principal portion of an image-plane-size changeover camera according to a third embodiment of the invention.

FIG. 14 is a rear view and a block circuit view, showing a principal portion of the image-plane-size changeover camera according to the third embodiment. FIG. 14 is a view as viewed from the side of a rear surface of the image-plane-size changeover camera according to the third embodiment, that is, is a view as viewed from the side of a film. The photographing means such as the photographing lens 27, the shutter blade 25 of the lens shutter, and the like is arranged in front of the optical axis of the aperture 31, as shown in FIG. 1.

A support shaft 322 and an image-plane-size changeover shaft 341 angularly movable in parallel to the support shaft 322 are provided on the camera body 23 on the left-hand side thereof and the right-hand side thereof, respectively, with the aperture 31 put therebetween. The image-plane-size changeover shaft 341 has an upper half which has a right-hand threaded portion 341a, and a lower half which has a left-hand threaded portion 341b. The upper mask 36a and the lower mask 36b are threadedly engaged respectively with the right-hand threaded portion 341a and the left-hand threaded portion 341b symmetrically with each other vertically with the aperture 31 being put therebetween. The masks 36a and 36b are also engaged slidably with the support shaft 322. The masks 36a and 36b are movable to the position (the normal position) N where the masks 36a and 36b are spaced outwardly of the aperture 31 and the position (the panoramic position) P where the masks 36a and 36b project slightly inwardly there of to regulate the exposure region of the panoramic photograph.

The image-plane-size changeover shaft 341 has an upper portion thereof which projects into a gear enclosure 342 fixedly mounted on the camera body 23, so that a gear 341c is integrally provided. The gear 341c is in mesh with a pinion gear 346 on an output shaft of a motor 345 which is integrally supported by the camera body 23, through a second speed-reduction gear 343 and a first speed-reduction gear 344. Meanwhile, a photo-interrupter gear 347 is in mesh with the pinion gear 346. A blade portion light-shieldable in the form of a propeller is formed on the photo-interrupter gear 347. Thus, the arrangement is such that it is possible to photoelectrically detect a rotational amount of the photo-interrupter gear 347 by a photo-interrupter 348.

The first speed-reduction gear 344, the second speed-reduction gear 343 and the photo-interrupter gear 347 are supported for angular movement by the camera body 23, and are clamped by the gear enclosure 342.

The upper mask 36a is arranged such that a projection 36f is provided from a right-hand end surface of the upper mask 36a. The projection 36f is engaged with an N switch (a normal-position detecting switch) 349 or a P switch (a panoramic switch) 350 which are integrally supported by the camera body 23, to turn ON and OFF the N switch 349 and the P switch 350. The N switch 349 and the P switch 350 are so-called leaf switches. When the masks 36a and 36b are in an N (a normal position), the N switch 349 is turned OFF, while the P switch 350 is turned ON. Moreover, the arrangement is such that, when the masks 36a and 36b are in the P (a panoramic position), the N switch 349 is turned ON, while the P switch 350 is turned OFF.

The N switch 349 and the P switch 350 are both connected to a control circuit 351. Furthermore, the motor 345 and the photo-interrupter 348 are controlled by the control circuit 351 through a drive circuit 352. In this connection, the drive circuit is formed by a bridge circuit due to a power transistor and the like.

Connected to the control circuit 351 are power source means 353 that is a so-called main switch capable of being switched to OFF in which the camera is incapable of photographing and ON in which the camera is capable of photographing, changeover operating means 354 for depressing an operational bottom to turn ON the same to thereby instruct or indicate an N (normal) and a P (panorama), lens-frame feeding means 355 for controlling movement of a lens frame in an optical axis direction to control focusing operation, exposure means 356 for performing opening and closing control of a shutter blade, back-closure opening and closing detecting means 357 so arranged as to turn ON and OFF a leaf switch that is well known switch means, by a part or portion of the back closure, rewinding-condition detecting means 358 for detecting that the film is under a rewinding condition to further feed a signal to the control means, and a film feeding motor 359 driven by the drive circuit 352, for driving film feeding means (not shown) to perform film winding and rewinding. In this connection, the changeover operating means 354 is an electric switch for outputting a changeover indication every urging or depressing operation, which is not particularly provided with display function or the like. Further, the power source means 353 is formed by a switch which is capable of being switched to an OFF condition in which the camera is incapable of photographing and an ON condition in which the camera is capable of photographing. The power source means 353 is connected to the control circuit 351, and is brought to ON in the present embodiment.

The control circuit 351 is further connected to a finder motor (referred simply to "an F-motor" in the drawings) 361 which is provided on a finder unit. The finder motor 361 moves a changeover element 308, that is a polarizing plate, in a horizontal direction, onto an optical axis of a wavelength plate 325 to be described subsequently, to thereby form a finder mask. Specifically, a changeover element 308 is inserted into a finder optical path to thereby change over a finder field of view or a finder visual field to a panoramic photographing condition (P), and is spaced from the finder optical path to thereby change over a finder field of view to a normal photographing condition (N). In this connection, a finder unit therefor will subsequently be described in detail.

Operation of the present third embodiment arranged in this manner will be described.

The closing condition of the back closure 29 (refer to FIG. 1) is detected by the back-closure opening and closing detecting means 357. Under a condition in which information thereof is outputted to the control circuit 351, that is, under a condition in which the back closure 29 is closed, when the panoramic position is instructed or indicated by the changeover operating means 354 at the time the masks 36a and 36b indicated by the solid lines in FIG. 14 are in the normal position, the drive circuit 352 activates the motor 345 in accordance with an output from the control circuit 351. Rotation of the motor 345 is reduced in speed by the gears and is transmitted to the image-plane-size changeover shaft 341. The image-plane-size changeover shaft 341 is rotated in a direction indicated by a white arrow in FIG. 14.

Thus, the masks 36a and 36b are moved toward each other. The N switch 349 is turned ON from OFF. The photo-interrupter 348 outputs rotation of the photo-interrupter gear 347 as a pulse signal. When the masks 36a and 36b are brought to the panoramic position, the P switch 350 is turned OFF. By a signal thereof, the control circuit 351 stops the motor 345. As described above, the image plane size is changed from the normal size to the panoramic size.

Moreover, simultaneously, the finder motor 361 is driven by the control circuit 351 to mask the upper and lower portions of the finder field of view.

Furthermore, also in a case where the image plane size is changed over from the panoramic size to the normal size, the motor 345 is rotated in a reverse direction similarly to the above-described operation. The image-plane-size changeover shaft 341 is rotated in a direction indicated by a black arrow in FIG. 14. The masks 36a and 36b are moved from the panoramic position to the normal position. The N switch 349 is turned OFF whereby the motor 345 stops so that a condition is changed over from the panoramic condition to the normal condition. Similarly, the finder unit is also changed over from the panoramic condition to the normal condition.

Meanwhile, when the back closure 29 opens at the time the finder unit is under the panoramic condition, the open condition is detected by the back closure opening and closing detecting means 357. Information thereof is inputted to the control circuit 351. By control of the control circuit 351, the finder motor 361 is driven. Thus, the finder unit is changed over from the panoramic condition to the normal condition, and is changed over to the normal position condition of the masks 36a and 36b. Subsequently, even if the back closure 29 is again closed, the finder unit and the masks 36a and 36b both retain the normal condition.

Figure 15:
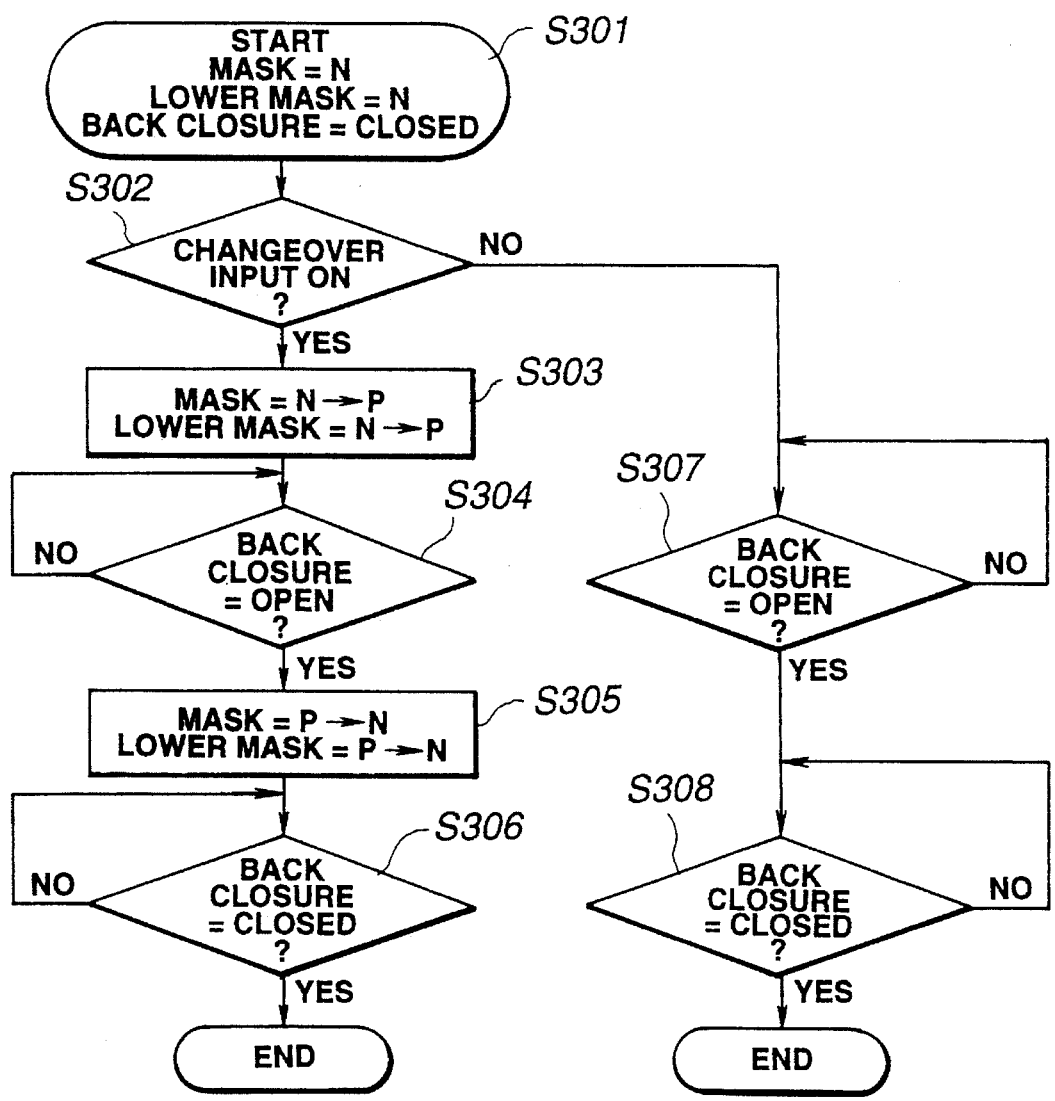
FIG. 15 is a flow chart showing opening and closing operations of a back closure and operation of a mask and an LCD in the image-plane-size changeover camera according to the third embodiment.

Operation of the masks 36a and 36b and the finder unit in keeping with the opening and closing operation of the back closure 29 will be described with reference to a flow chart shown in FIG. 15.

First, it is assumed that the masks 36a and 36b and the finder unit are both in the normal position (indicated by N in the figure), and the back closure 29 is under the closed condition (Step S301). Here, when image-plane-size changeover inputting is performed (Step S302), the masks 36a and 36b and the finder unit are both moved to the panoramic position (indicated by P in the figure) (Step S303).

Subsequently, when the back closure 29 opens (Step S304), the masks 36a and 36b and the finder unit are both moved from the panoramic position to the normal position (Step S305). Subsequently, even if the back closure 29 is closed, the condition is not changed (Step S306).

Further, when the image-plane-size changeover inputting is not performed in Step S302, the condition of the masks 36a and 36b and the finder unit is not changed, in spite of opening and closing of the back closure 29 (Step S307, Step S308).

In this manner, according to the third embodiment of the invention, when the back closure opens at the time of the panoramic condition, the mask is brought to a saving position. Accordingly, there is no fear that a user is in contact with the mask so that the mask is broken. The camera is brought to a camera high in reliability. Moreover, even if the back closure opens under the panoramic condition, the mask and the LCD are both under the normal condition. Even if the back closure is closed, the normal condition is maintained or held. Accordingly, by the fact that the back closure opens, resetting is made to the normal condition that is a normally used mode. Thus, the camera is brought to a camera which is superior in convenience in use.

The details of the finder unit in the third embodiment will next be described.

The finder unit is arranged such that a flux of light from a subject which is transparentized through an objective lens 301 which is arranged on the side of the subject is focused to an incident surface 303 of a Porro prism 302, and an image thereof is observed by an ocular lens 305 while the image is brought to an erected non-reverse image by the prism 302.

The Porro prism 302 is arranged such that, as known well, a pair of small rectangular prisms 302b and 302c having reflecting surfaces thereof, respectively, consisting of slant or oblique surfaces, which are the same in configuration and the same in size as each other are integrally mounted on a bottom surface of a large rectangular prism 302a which is rectangular in shape and whose bottom surface is so arranged as to be directed upwardly such that a reflecting surface of one of the prisms 302b is directed toward the ocular lens 305, and a reflecting surface of the other prism 302c is directed toward the objective lens 301.

In the Porro prism 302 arranged in this manner, the luminous flux from the subject is incident upon the incident surface 303 which is perpendicular to the rectangular prism 302b. The luminous flux from the subject is reflected downwardly by the reflecting surface on the rearward side. The luminous flux from the subject is reflected laterally by one of the reflecting surfaces of the rectangular prism 302a. The luminous flux from the subject is reflected upwardly by the other reflecting surface, and is incident upon the rectangular prism 302c. The luminous flux from the subject is reflected rearwardly by a reflecting surface of the prism 302c, and is transparentized through a perpendicular outgoing surface 304. The luminous flux from the subject enters the ocular lens 305. The subject image is observed as an erected non-reverse image.

A range of the standard observation visual field frame within a finder visual field is regulated or rectified by display of a black frame 326 by means of printing or the like on a periphery of the incident surface 303 of the Porto prism 302. This is a first visual field range. A wavelength plate 325 (which may be a ½ wavelength plate or a ¼ wavelength plate, or a wavelength film) that is a polarization changeover means, for rectifying or regulating a range of a panoramic visual field frame, for example, narrower than the first visual field range is arranged on a front surface of the incident surface 303. Further, on a front surface thereof, a polarization plate 307A having a vertical polarizing direction, which has its dimension or size capable of completely covering the first visual field range is arranged.

Furthermore, in the present embodiment, a changeover element 308 that is a polarization plate in a horizontal direction in the present embodiment is adapted to be inserted into an optical path which extends from the outgoing surface 304 of the rectangular prism 302c to the ocular lens 305.

Here, a principle of each of the ½ wavelength plate and the ¼ wavelength plate will be described.

Figure 17:
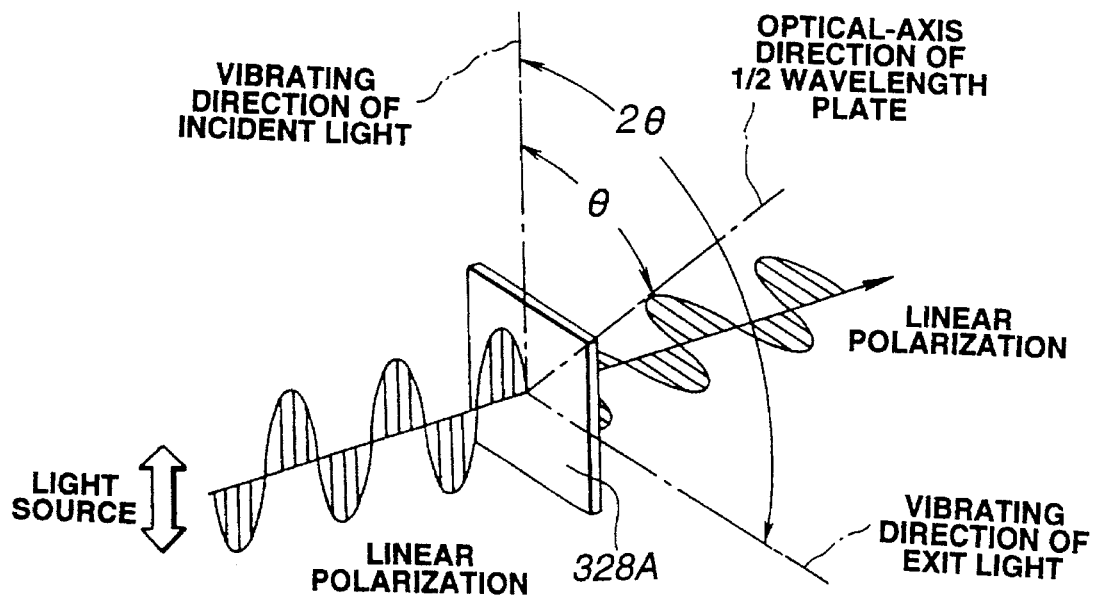
FIG. 17 is a diagram showing a principle of a ½ wavelength plate which is used in the finder unit in the third embodiment.

As shown in FIG. 17, what is the ½ wavelength plate 328A is a wavelength plate having function to cause or generate a phase difference of ½ wavelength to an incident light ray (a slow component is delayed as compared with a fast component in the outgoing surface of the wavelength plate). When the incident light ray which is polarized straightly is incident upon the ½ wavelength plate 328A such that a vibrating direction thereof is incident at an angle θ upon an optical axis direction of the ½ wavelength plate 328A, an outgoing in the same manner light ray is also outgone as a straight polarization. Thereupon, the vibrating direction of the straight polarization outgone defines the angle θ on the side opposite to the vibrating direction of the incident light ray, with respect to the optical axis direction of the ½ wavelength plate 328A. That is, if the straight polarization is incident upon the ½ wavelength plate 328A such that a vibrating direction thereof defines the angle θ with respect to the optical axis direction of the ½ wavelength plate 328A, the straight polarization is outgone as a straight polarization in which the vibrating direction is rotated through 2θ. The light ray outgone is only rotated through 2θ by the ½ polarization plate, but light quantity or light intensity of the ray is not changed.

Figure 18:
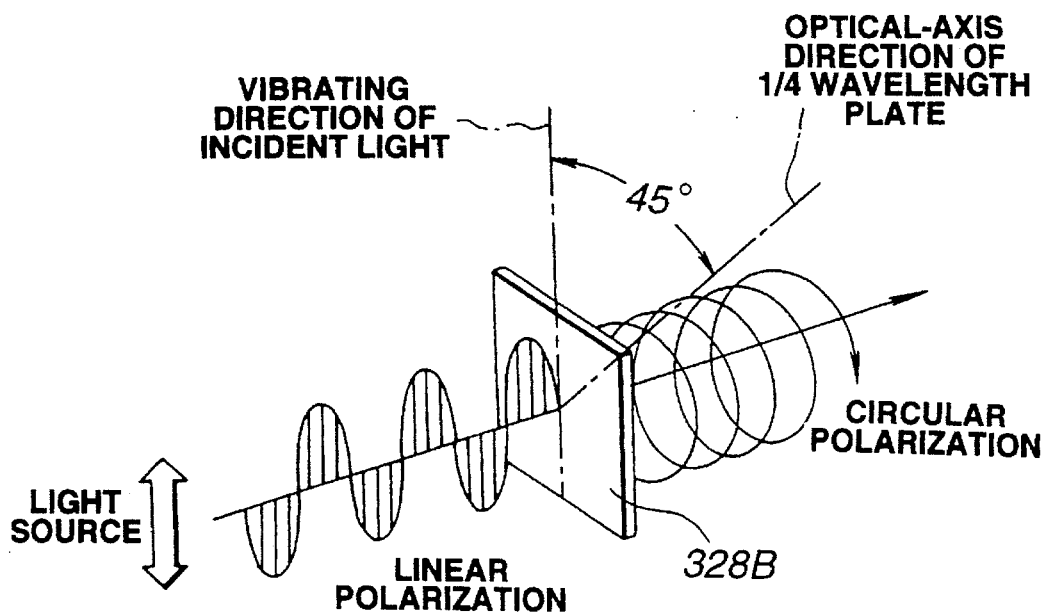
FIG. 18 is a diaphragm showing a principle of a ¼ wavelength plate which is used in the finder unit in the third embodiment.

Next, as shown in FIG. 18, what is the ¼ wavelength plate 328B is a wavelength plate which has function to generate a phase difference of the ¼ wavelength to the incident light ray (a slow component is delayed as compared with a fast component in the outgoing surface of the wavelength plate). When the incident light ray which is straight polarized is incident upon the ¼ wavelength plate 328B such that a vibrating direction thereof is at an angle θ=45 degrees with respect to the optical axis direction of the ¼ wavelength plate 328B, the outgoing light ray is brought to a circular polarization. That is, when the vibrating direction of the incident light ray and the optical axis direction of the ¼ wavelength plate 328B define an angle of θ=−45 degrees, the outgoing light ray is brought to a circular polarization in rotation reverse to that when θ=45 degrees. The outgone light ray is only circularly polarized by the ¼ wavelength plate, but the light quantity of the light ray is not changed.

Figure 19:
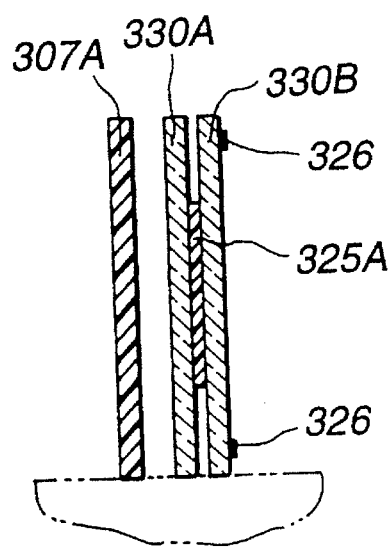
FIG. 19 is an enlarged cross-sectional view showing details of the wavelength plate which is used in the finder unit in the third embodiment.

Here, a specific arrangement of the wavelength plate 325 will be described with reference to FIG. 19.

The arrangement is as follows. That is, a polarization changeover wavelength film 325A is put at a central portion between two glass plates 330A and 330B (or transparent sheets), and a polarization plate 307A is arranged at a front portion thereof. A black frame 326 which indicates the range of the first visual field frame is provided, by printing or the like, on a range which limits a standard photographing frame of a rear surface of the rearward glass plate 330B (or the transparent sheet).

Visual field changeover function of the finder unit arranged described above will be described with the wavelength plate 325 divided into the ½ wavelength plate and the ¼ wavelength plate.

Figure 16:
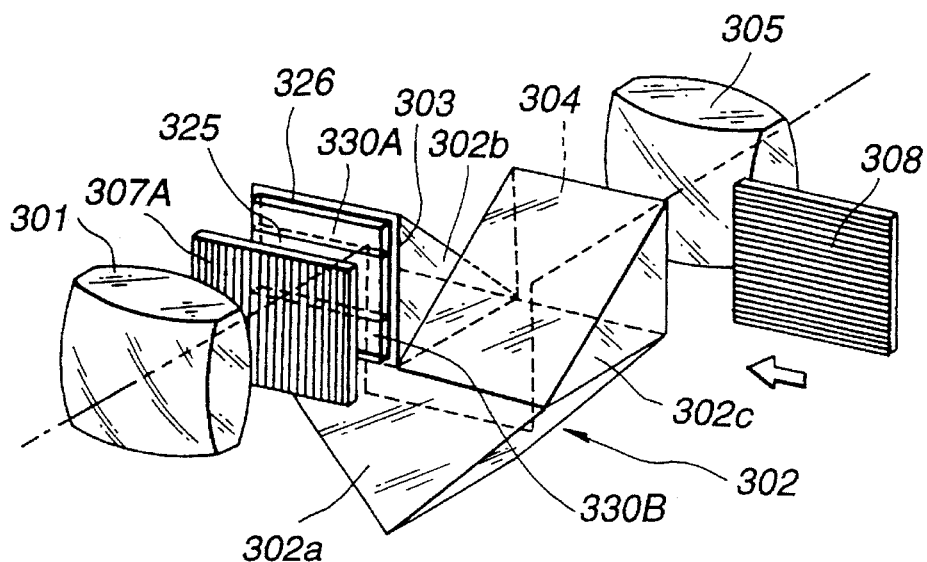
FIG. 16 is a perspective view showing a finder unit in the image-plane-size changeover camera according to the third embodiment.

First, when the wavelength plate 325 shown in FIG. 16 is the ½ wavelength plate 328A, the luminous flux which is transparentized through the polarizing plate 307A and which is polarized perpendicularly is rotated through an angle of 90 degrees at a central location where there is a ½ wavelength film, and is brought to a luminous flux of polarization in a horizontal direction. Meanwhile, a luminous flux which is transparentized through the upper and lower glass plates 330A and 330B of the wavelength plate 325 passes as it is, but is maintained as the luminous flux of the vertical polarization. In this manner, the luminous flux of the horizontal polarization passes through a central portion longer in width, of the standard visual field frame, and a luminous flux in a vertical direction passes through upper and lower portions longer in width, of the visual field frame. Thus, the light quantity or light intensity is brought to a uniform light quantity as the whole standard visual field frame.

When the changeover element 308 that is a polarizing plate in the horizontal direction invades into the finder visual field frame, the luminous flux at the central portion which is transparentized through the wavelength plate 325 is transparentized through the changeover element 308, since the luminous flux is polarized by the luminous flux in the horizontal direction. On the contrary, the luminous flux which is transparentized through the upper and lower glass plates 330A and 330B of the wavelength plate 325 is not transparentized through the changeover element 308, since the luminous flux is polarized by the luminous flux in the vertical direction. Specifically, only the luminous flux which is transparentized through the wavelength plate 325 reaches the ocular lens 305 and is changed over to the observation visual field frame of the panoramic photographing. Thus, it is possible to observe the subject image by the panoramic visual field frame.

Next, when the wavelength plate 325 is the ¼ wavelength plate 328B, the luminous flux which is transparentized through the polarizing plate 307A and which is polarized vertically is transparentized through the wavelength plate 325 and is brought to a circularly polarized luminous flux at a central location where there is the ¼ wavelength film. Meanwhile, the luminous flux which is transparentized through the upper and lower glass plates 330A and 330B of the wavelength plate 325 passes, without stopping, through as it is, but is maintained as a luminous flux of vertical polarization. In this manner, the central portion elongated laterally, of the standard visual field frame is brought to a circularly polarized luminous flux, and the luminous flux in the vertical direction is transparentized through the upper and lower portions elongated laterally, of the visual field frame. Thus, the luminous flux is brought to a uniform light intensity or quantity as the whole standard visual field frame.

Here, when the changeover element 308 that is the polarizing plate in the horizontal direction invades into the finder visual field frame, since the luminous flux at the central portion which is transparentized through the wavelength plate 325 is the circularly polarized luminous flux, only the luminous flux of a component in a horizontal direction is transparentized through the changeover element 308, and reaches the ocular lens 305, while the light intensity is attenuated or damped. On the contrary, the luminous flux which has been transparentized through the upper and lower glass plates 330A and 330B of the wavelength plate 325 is not transparentized through the changeover element 308, because the luminous flux is polarized into the luminous flux in the vertical direction. That is, only the luminous flux which is transparentized through the wavelength plate 325 reaches the ocular lens 305, and changeover is made to the observation visual field frame of the panoramic photographing. Thus, it is possible to observe the subject image by the panoramic visual field frame.

Figure 20:
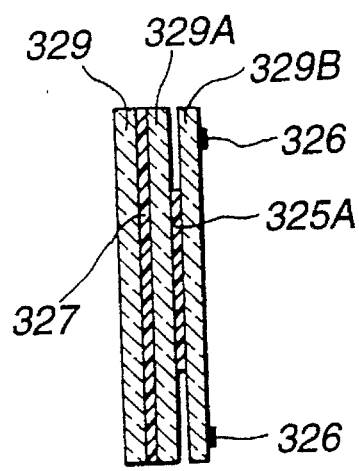
FIG. 20 is an enlarged cross-sectional view showing an another example of the wavelength plate shown in FIG. 19.

Further, the wavelength plate 325 may be so formed as to be integral with the polarizing plate which is arranged in front of the wavelength plate 325, as shown in FIG. 20. That is, the arrangement is such that the wavelength film 325A for polarization changeover is put at a central portion between two glass plates 329A and 329B (or transparent sheets) in the rear pair of three glass plates 329, 329A and 329B (or transparent sheets), and a polarizing film 327 is put between front two glass plates or transparent sheets 329 and 329A, to form the wavelength plate 325 integrally. The black frame 326 indicating the range of the first visual field frame is provided in a region which limits a standard photographing frame at the rear surface of the rear glass plate 329B (or transparent sheet).

Moreover, the changeover element 308 may be inserted into any position, if the position is a location which is intersected with the whole standard visual field frame of the finder optical system.

According to the finder unit arranged as described above, according to the third embodiment, since two polarizing plates in which polarizing directions extend perpendicular to each other are used, a changeover mechanism for the observation visual field frame and a changeover mechanism of display or non-display within the observation visual field frame are simplified, and the finder unit is reduced in size. Accordingly, it is possible to remove disadvantages of the conventional arrangement of this kind. Furthermore, the wavelength plate is arranged within the finder optical path, whereby it is possible to uniformize brightness within the finder upon standard photographing.

Figure 21:
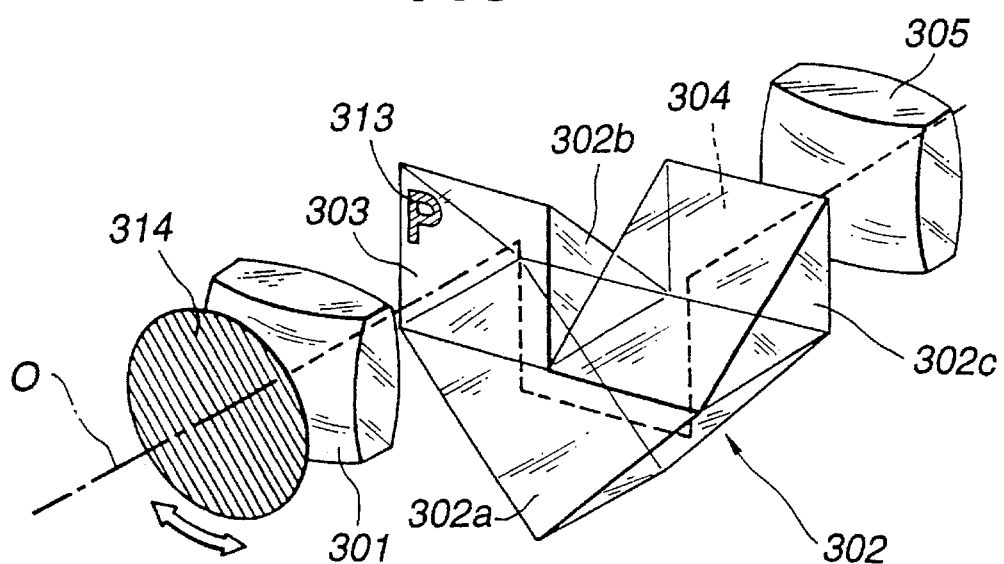
FIG. 21 is a perspective view showing an another example of the finder unit showing in FIG. 16.

Further, in the finder unit according to the third embodiment, a finder unit having an arrangement thereof illustrated in FIG. 21 may be used. Finder units of the other example are ones which display characters within the standard visual field frame. In this connection, in FIG. 21, the first visual field mask for defining a range of the standard observation visual field frame within the finder visual field is arranged on the side of a front surface of the incident surface 303 of the rectangular prism 302b, but this is omitted from illustration.

In the finder unit, a display element 313 is arranged on the side of a front surface of the incident surface 303 of the rectangular prism 302b, and the changeover element 314 is arranged on the front side of the objective lens 301.

The display element 313 is formed by a polarizing plate in the form of a character such as "P" or the like indicating, for example, the panoramic condition, and is so arranged as to be located at one corner of the upper portion, for example, of the visual field frame. Moreover, the changeover element 314 is formed by a circular polarizing plate, and is arranged such that a center of a circle thereof is positioned on the optical axis O of the finder optical system, and the changeover element is rotated around the optical axis. The remaining arrangement of FIG. 21 is substantially similar to that of FIG. 16 described above.

In such arrangement described above, when a character is not displayed, the changeover element 314 is rotated such that the polarizing direction of the polarizing plate of the display element 313 and the polarizing direction of the polarizing plate of the changeover element 314 are coincident with each other. The luminous flux from the subject which is polarized by the polarizing plate of the changeover element 314 passes through the polarizing plate of the display element 313 in the same polarizing direction and the interior of the standard visual field frame other than the display element 313. That is, the luminous flux from the subject passes through the entirety within the standard visual field frame so that the character formed by the display element 313 within the standard visual field is not recognized.

Here, when changeover is made to the character display, the changeover element 314 is rotated to a position at which the polarizing direction of the polarizing plate extends perpendicularly to the polarizing direction of the polarizing plate of the display element 313. Then, the luminous flux from the subject which is polarized by the polarizing plate of the changeover element 314 cannot pass through the polarizing plate of the display element 313. Thus, the character which is formed on the display element 313 is confirmed within the standard visual field frame.

If such arrangement of the finder unit is applied, the circular polarizing plate 314 is only rotated by the use of a finder motor so that the panoramic display can be performed. Accordingly, it is not required that the polarizing plate 314 is saved (i.e. spaced) from the optical path. Thus, advantages can be produced that a mechanism is simple, and a small space is sufficient.

FIGS. 22(A) to 26 show a fourth embodiment of the invention.

An image-plane-size changeover camera according to the fourth embodiment has a principal portion thereof which is substantially similar to that illustrated in FIG. 10 of the second embodiment and, accordingly, description will be made with reference to FIG. 10 as occasion demands. In this connection, in FIG. 10 showing the second embodiment, the masks 202a and 202b are different in shape from each other in the fourth embodiment. Accordingly, in the fourth embodiment, reference numerals are changed or modified in correspondence to these differences so that the masks 202a and 202b are brought to masks 402a and 402b, respectively. Moreover, similarly, the film rails 210a and 210b are also modified in reference numeral, and are brought respectively to film rails 410a and 410b.

Figures 22A, 22B:
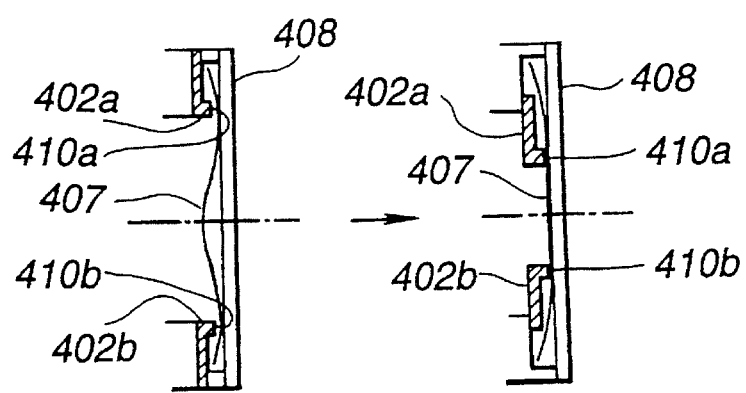
FIGS. 22(A) and 22(B) are side cross-sectional views showing the positional relationship between a mask and a film upon photographing at FIG. 22A a normal size and 22B panoramic size, of an image-plane-size changeover camera according to a fourth embodiment of the invention.

FIGS. 22(A) and 22(B) are side elevational cross-sectional views showing the positional relationship between the masks 402a and 402b and a film 407 illustrated in FIG. 10 upon photographing at (A) a normal size and (B) a panoramic size. In this connection, the reference numeral 408 in FIGS. 22(A) and 22(B) denotes a pressure plate for urging the film 407 from the rear.

As shown in FIG. 22(B), when the masks 402a and 402b slide into the aperture portion 212 (refer to FIG. 10) upon photographing at the panoramic size, the neighborhood of the central portion of the film 407 is urged rearwardly by the film rails 410a and 410b which are provided in projection on the side of rear surfaces of the respective masks 402a and 402b. Thus, flatness or plane of the film 407 is maintained also even upon photographing at the normal size shown in FIG. 22(A). However, as shown in FIG. 22(B), the film rails 410a and 410b are located in the vicinity of the central portion. By the fact that the film 407 is urged, the flatness of the film 407 which is slightly bent at the central portion is further improved.

By the way, when the film 407 is wound after photographing under the condition illustrated in FIG. 22(B), that is, at the panoramic size, there is a fear that film flaws or wounds are generated on the surface of the film 407 due to friction with respect to the film rails 410a and 410b. Accordingly, when the next frame is photographed at the normal size after photographing at the panoramic size, deficiencies due to the film flaws are generated within a photographing image plane. Further, similar deficiencies due to the film flaws raise a problem, not to be limited to the film winding operation, but also in a case where a plurality of image-plane-size changeover operations are performed before photographing, or in a case where the rewinding operation is performed under a condition illustrated in FIG. 22(B).

In the present embodiment, consideration is also given to the above-discussed problems. Countermeasure means for the above-discussed problems will next be described.

In connection with the above, operation of the image-plane-size changeover camera according to the fourth embodiment is similar to that described with reference to FIG. 11 which shows the second embodiment and, accordingly, the description thereof will be omitted.

Figure 23:
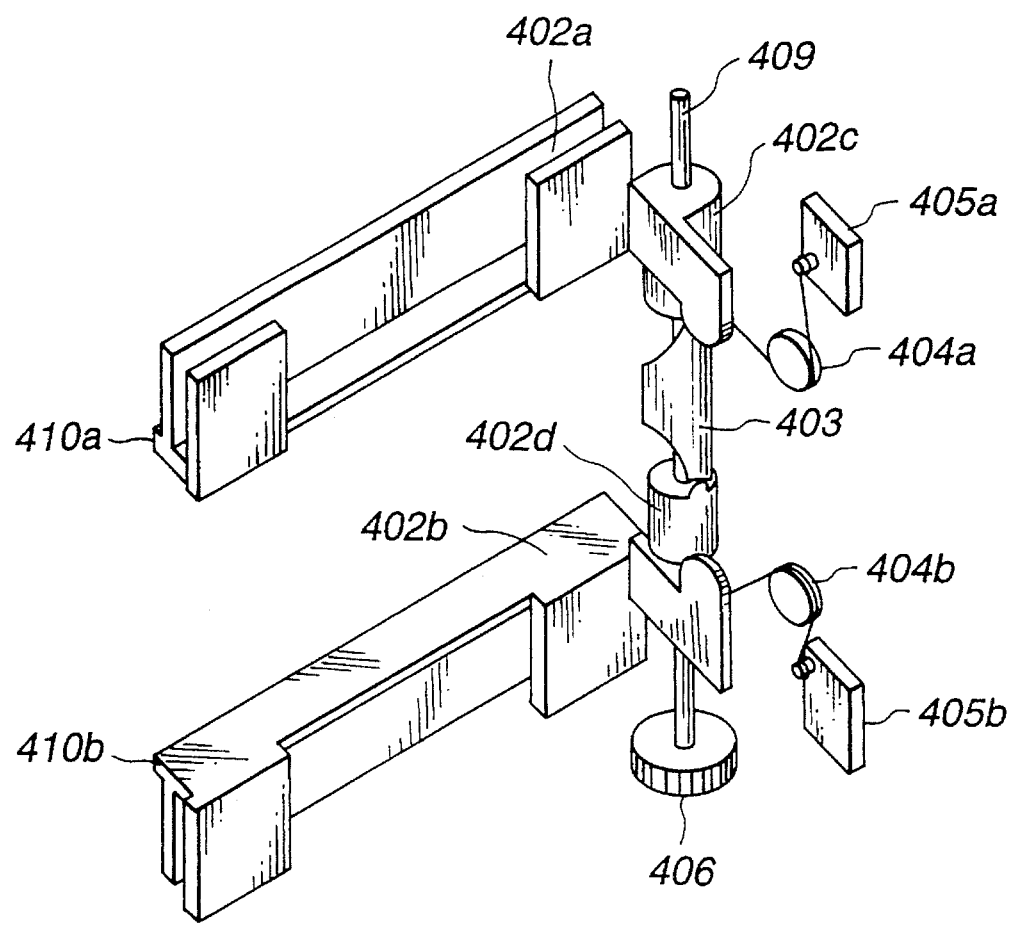
FIG. 23 is a principal-portion enlarged perspective view showing a mask and a peripheral portion thereof in the image-plane-size changeover camera according to the fourth embodiment.

FIG. 23 is a principal-portion enlarged perspective view showing the masks 402a and 402b in the image-plane-size changeover camera according to the fourth embodiment and a peripheral portion thereof.

As shown in FIG. 23, cam follower portions 402c and 402d are arranged on one sides of each of the masks 402a and 402b in a manner of being integral with the masks 402a and 402b so as to be directed forwardly. A lower part of the cam follower portion 402c and an upper part of the cam follower portion 402d are formed with cam followers at positions opposite to each other, each of which presents a substantially columnar configuration. The cam follower portions 402c and 402d are supported for sliding movement in a vertical direction by the same or identical support shaft 409.

A stereophonic cam 403 is integrally arranged on the support shaft 409 at a location between both the cam follower portions 402c and 402d. The stereophonic cam 403 and the cam follower portions 402c and 402d cooperate with each other to form a cam mechanism. A driven gear 406 which is moved angularly in synchronism with a drive source for focusing (not shown) is arranged at a lower portion of the support shaft 409 in a manner of being integral with the support shaft 409. In interlocking manner with the angular movement of the driven gear 406, the stereophonic cam 403 is moved angularly.

Meanwhile, changeover elements 405a and 405b which are moved vertically in interlocking manner with an image-plane-size changeover operating element (not shown) are arranged respectively further in front of the cam follower portions 402c and 402d. Moreover, toggle springs 404a and 404b are arranged in suspension respectively between the changeover elements 405a and 405b and the cam follower portions 402c and 402d. The arrangement is such that a biasing direction with respect to the masks 402a and 402b can be changed over in keeping with the vertical movement of the changeover elements 405a and 405b.

Figure 24:
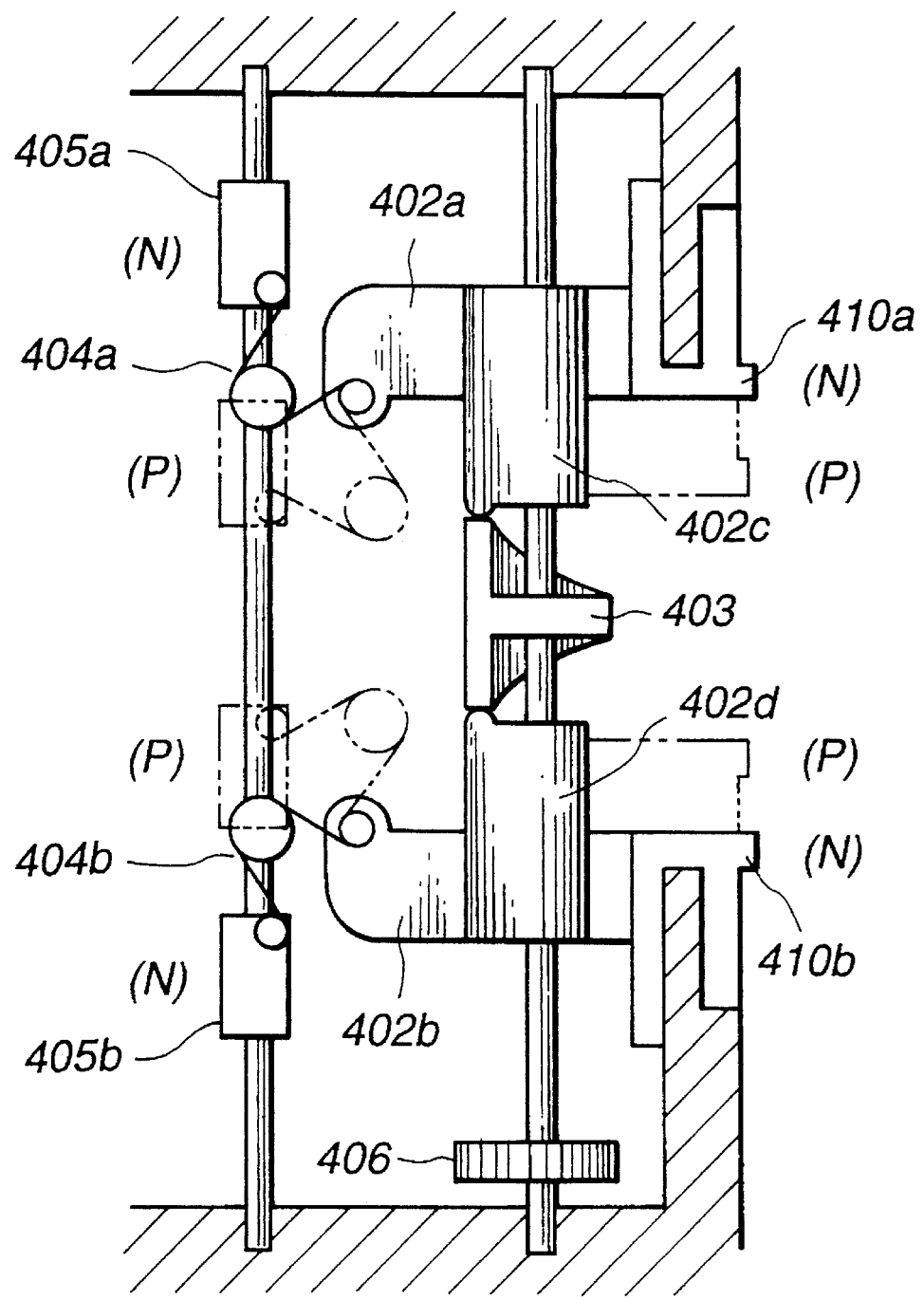
FIG. 24 is a side elevational view showing the mask, a solid or stereoscopic cam and a changeover element and a peripheral portion thereof in the image-plane-size changeover camera according to the fourth embodiment.

FIG. 24 is a side elevational view showing the masks 402a and 402b, the stereophonic cam 403 and the changeover elements 405a and 405b in the image-plane-size changeover camera according to the fourth embodiment, and peripheral portions thereof.

Upon photographing at the panoramic size, the changeover elements 405a and 405b are in a (P) position indicated by two-dot-and-chain lines in the figure, and the masks 402a and 402b are biased inwardly of the aperture portion 212 (refer to FIG. 10) by the toggle springs 404a and 404b (indicated by two-dot-and-dash lines in FIG. 10). At this time, when the driven gear 406 is moved angularly in synchronism with the focusing, the stereophonic cam 403 is also moved angularly in interlocking manner with the driven gear 406. By the above-described cam mechanism, the masks 402a and 402b slide along the stereophonic cam 403, to mask upper and lower parts of the aperture portion 212.

When photographing at the normal size, the changeover elements 405a and 405b are in an (N) position indicated by the solid lines in the figure, and the masks 402a and 402b are biased outwardly of the aperture portion 212 by the toggle springs 404a and 404b (indicated by the solid line in the figure). At this time, the driven gear 406 is moved angularly in synchronism with the focusing. Thus, even if the stereophonic cam 403 is moved angularly in interlocking with the driven gear 406, the masks 402a and 402b are not moved.

According to the fourth embodiment, since the masks 402a and 402b having the film rails 410a and 410b are operated only in rear of and in front of the exposure operation, and are so maintained as to always be retained to the position under the photographing condition (refer to FIG. 22(A)) at the normal size other than the same, there is no case where the film surface is damaged by the winding and rewinding of the film and the changeover operation of the image-plane-size changeover element.

Further, since the masks 402a and 402b are absent or are not present within the camera body, the degree of design freedom of the interior of the camera body increases to contribute also small-sizing or miniaturization of the camera.

In this manner, according to the fourth embodiment arranged as described above, the masks 402a and 402b are operated only in front of and in rear of the exposure operation, and are so maintained as to be always retained to the position of the photographing condition at the normal size other than the same. Accordingly, even if the user inadvertently opens the back closure, the masks 402a and 402b do not exist within the aperture portion 212. Thus, it is possible to inadvertently prevent such an accident that the user is in contact with the masks 402a and 402b to break or damage the same. Moreover, according to the present embodiment, since the film rail is formed integral with the panoramic mask, spacing between the rails is reduced in the panorama mode. Thus, it is possible to improve flatness of the film in the panorama mode.

Figure 25:
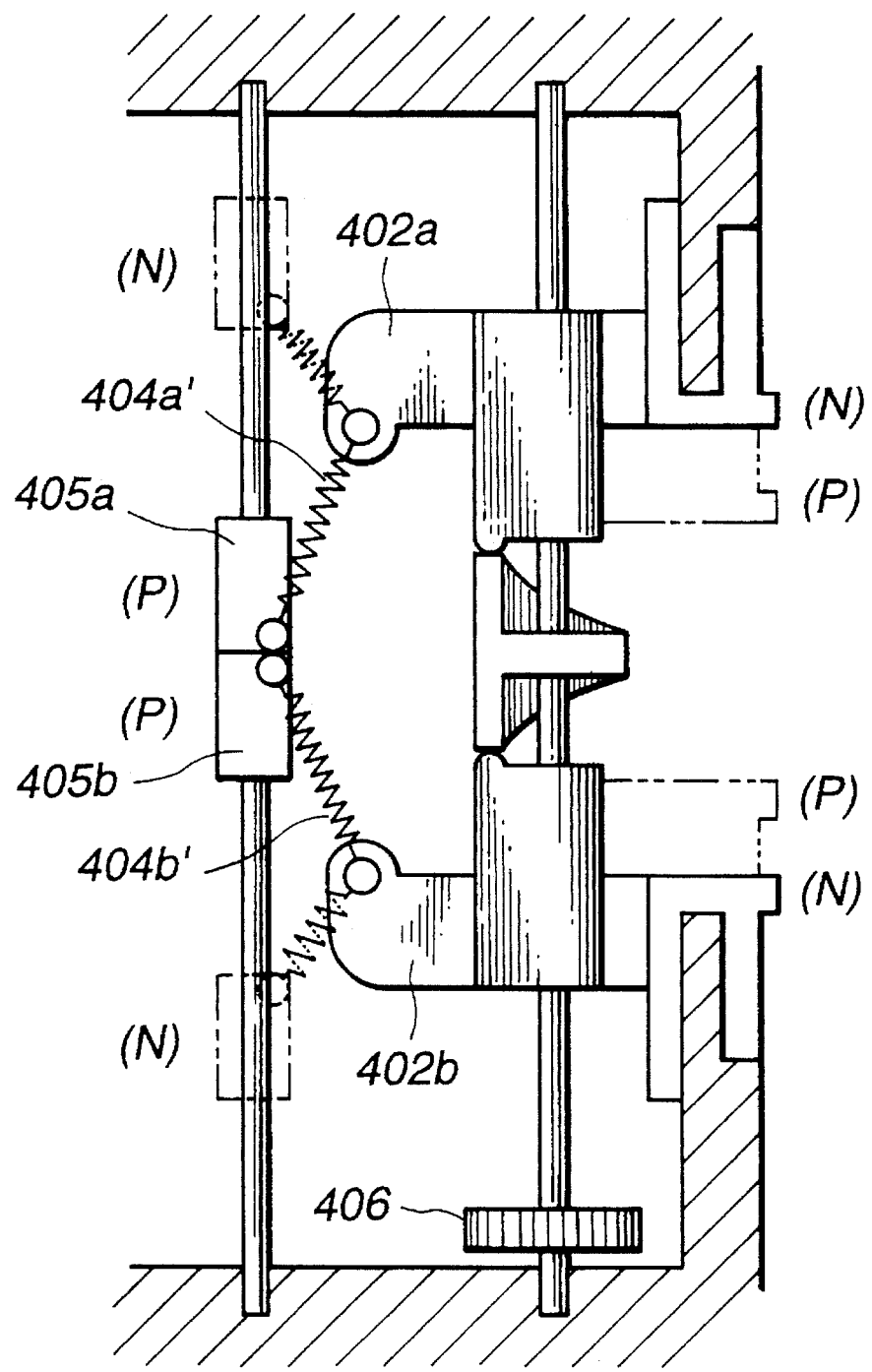
FIG. 25 is a principal-portion enlarged side elevational view of the image-plane-size changeover camera, showing an another example of the arrangement illustrated in FIG. 24.

FIG. 25 is a principal-portion enlarged side elevational view of an image-plane-size changeover camera, showing another example of the arrangement illustrated in FIG. 24, of the fourth embodiment.

The basic or fundamental arrangement of the example shown in FIG. 25 is substantially similar to that illustrated in FIG. 24. However, the arrangement is such that the toggle springs 404a and 404b in the fourth embodiment are replaced by a pair of tension springs 404a' and 404b', and the positional relationship between the changeover elements 405a and 405b, that is, the positional relationship between one upon photographing at the normal size and one upon photographing at the panoramic size is reverse to the aforesaid positional relationship. The other arrangements and functions are similar to those described above, and the description thereof will be omitted.

Figure 26:
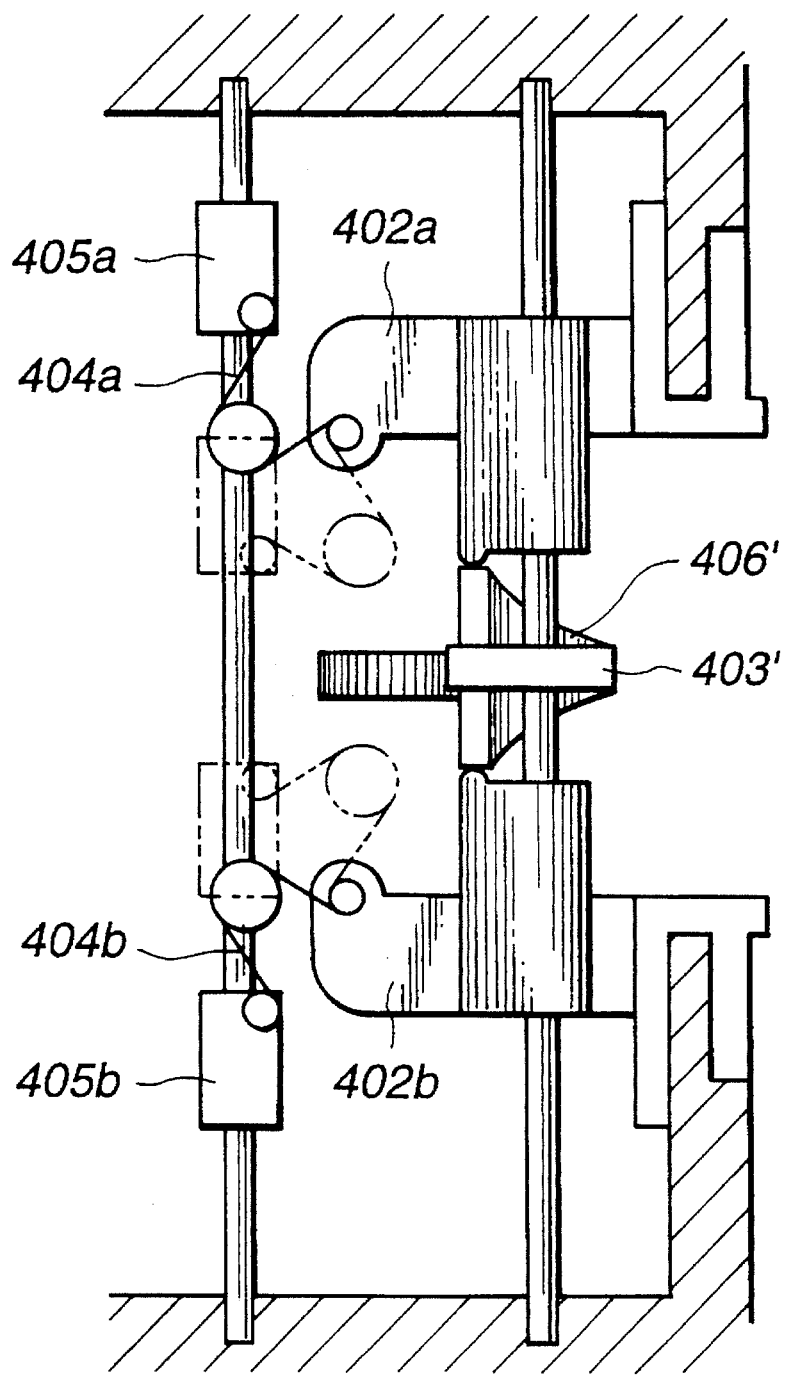
FIG. 26 is a principal-portion enlarged side elevational view of the image-plane-size changeover camera, showing still another example of the arrangement illustrated in FIG. 24.

FIG. 26 is a principal-portion enlarged side elevational view of an image-plane-size changeover camera, showing a further example of the arrangement illustrated in FIG. 24, of the fourth embodiment.

The basic or fundamental arrangement of the example illustrated in FIG. 26 is substantially similar to that illustrated in FIG. 24. However, the arrangement is such that the driven gear 406 in the fourth embodiment is arranged at the inner peripheral portion of the stereophonic cam 403 in an integral manner with the stereophonic cam 403 (indicated by the reference numerals 403' and 406' in the figure). The other arrangements and functions are similar to those described above, and the description thereof will be omitted.

Figure 27:
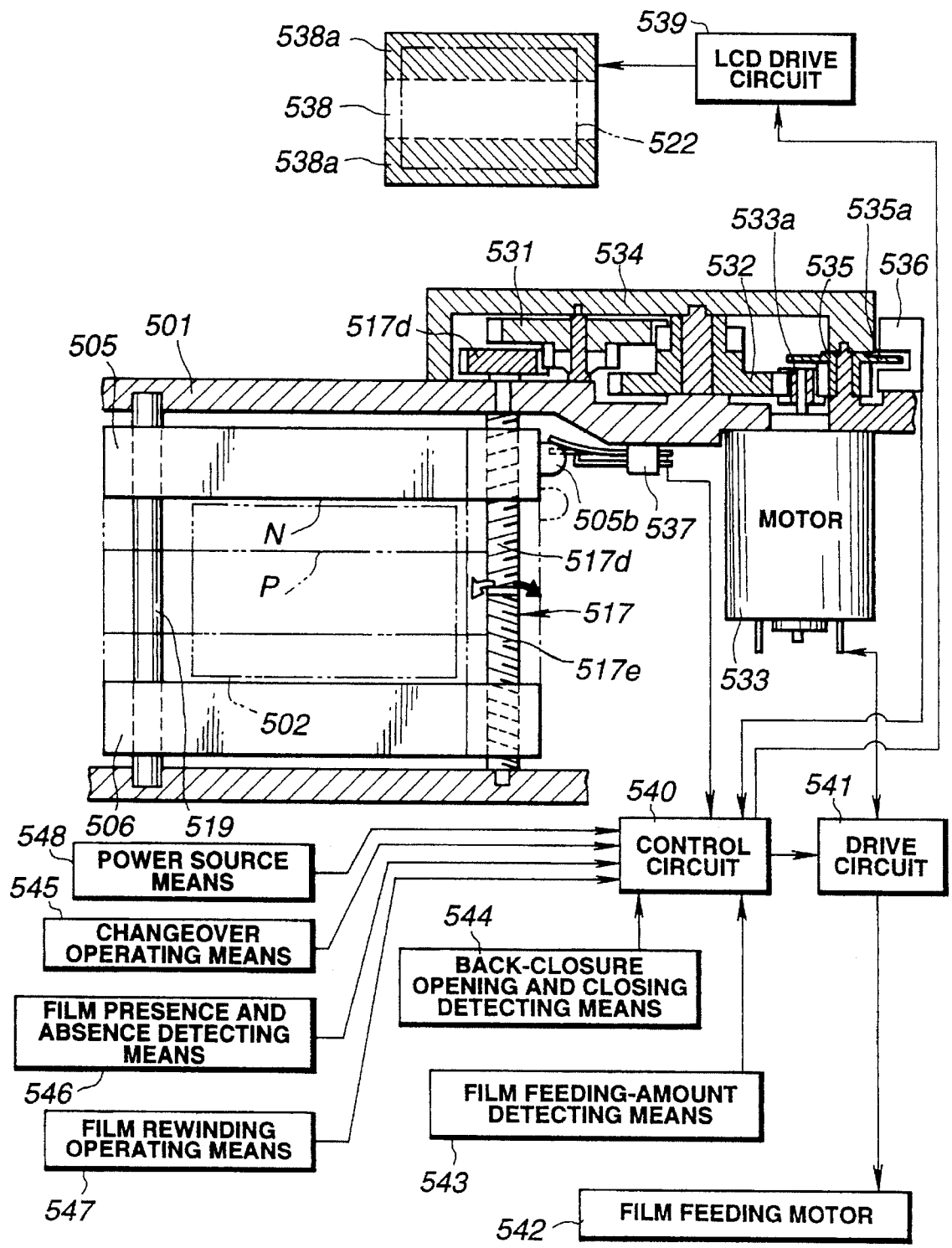
FIG. 27 is a principal-portion enlarged rear view and a block diagram arrangement view of an image-plane-size changeover camera according to a fifth embodiment of the invention.

FIGS. 27 to 31 show a fifth embodiment of the invention. FIG. 27 is a principal-portion cross-sectional view and a block arrangement view of a camera capable of changing over an image-plane size, showing the fifth embodiment. The fifth embodiment is arranged such that mask means for the aperture is changed over by a screw shaft, and a finder visual field frame is changed over by an LCD mask.

An upper changeover mask 505 and a lower changeover mask 506 that are image-plane-size defining means for changing over a photographing image plane size and for limiting a photographing range of an aperture 502 are arranged just in front of the aperture 502 which is formed in a camera body 501 respectively at positions which are vertically symmetric to the aperture 502. Female threads of right-handed screws and left-handed screws are formed in a threaded bore which is formed longitudinally, at one side end of the respective sides of the upper changeover mask 505 and the lower changeover mask 506. These female threads are in mesh respectively with right-handed screws 517d and left-handed screws 517e which are formed respectively in an upper portion and a lower portion of a mask changeover shaft 517. Furthermore, the upper changeover mask 505 and the lower changeover mask 506 respectively have the other ends thereof formed with guide bores longitudinally similar to the first embodiment. The guide bores are fitted over a support shaft 519 in which upper and lower ends thereof are fixedly mounted on the camera body 401, and are so supported as to be slidable vertically.

In view of the above, when the mask changeover shaft 517 is moved angularly in the clockwise direction (a direction indicated by a white arrow) as viewed from the above, the upper changeover mask 505 is moved upwardly (a position where an edge of a lower end is N), and the lower changeover mask 506 is moved downwardly. When the mask changeover shaft 517 is moved in the counterclockwise direction (a direction indicated by a black arrow), the mask 505 is moved downwardly (a position where an edge portion of a lower end is P), and the mask 506 is moved upwardly. The changeover gear 517d which is moved angularly in unison with the mask changeover shaft 517 is fixedly mounted on an upper end of the mask changeover shaft 517. A drive-force transmitting gear 531 having a small diameter gear in mesh with the gear portion 517d and a large diameter gear formed on an upper portion of the small diameter gear is rotatably supported by a gear shaft which is provided in projection in the camera body 501.

Further, in the transmitting gear 531, a drive-force transmitting gear 532 of two steps including a small diameter gear mashing with a large diameter gear of the gear 531 and a large diameter gear formed below the small diameter gear is rotatably supported by the camera body 501. The large diameter gear of the drive-force transmitting gear 532 is further in mesh with a pinion gear 533a which is fixedly mounted on an output shaft of a drive motor 533 which is arranged below one side edge of the camera body 501, and is rotatively driven by the drive motor 533. Moreover, a gear 535 for photo-interrupter (hereinafter referred to as "PI") is also in mesh with the pinion gear 533a. A blade portion 535a in the form of a propeller is fixedly mounted integrally with an upper surface of the PI gear 535. A PI 536 is arranged such that the blade portion 535a extends into a gap between a light projecting portion and a light receiving portion. By rotation of the blade portion 535a, a rotational amount of the drive motor 533 is detected by photoelectric conversion. By a gear enclosure 534, upper portions of the respective gears are covered. The gear enclosure 534 supports a shaft of lock of the gears.

A changeover projection 505b is formed on one side edge of the upper changeover mask 505. A mask switch 537 having a leaf switch is arranged on an outer side of the changeover projection 505b such that an actuator thereof is abutted against the changeover projection 505b so that the switch 537 is changed over to an ON condition and an OFF condition. The arrangement is such that the mask switch 537 is turned OFF when the upper changeover mask 505 is under the normal photographing condition, while the mask switch 537 is turned ON when the mask 505 is slightly moved downwardly.

Furthermore, an LCD mask 538 is arranged in a finder optical path arranged above the camera body 501 so as to cover an entire or whole finder visual field frame 522 such that the LCD mask 538 is perpendicular to the optical path. The LCD mask 538 is driven by an LCD drive circuit 539 such that, in interlocking manner with changeover of the aperture 502 in a photographing area or region, the whole finder visual field frame 522 is brought to a transparent condition of light upon changeover to normal photographing, and finder mask portions 538a that are an upper edge and a lower edge of the finder visual field frame 538 including a region other than the panoramic visual field range of the finder visual field frame 522 upon changeover to panoramic photographing are brought to a light shielding condition. The LCD drive circuit 539 is controlled by a control circuit 540. The drive motor 533 is driven by a motor drive circuit 541. The motor drive circuit 541 is controlled by the control circuit 540. Moreover, the motor drive circuit 54' drives also a film feeding motor 542 which drives film feeding means for performing winding and rewinding of a film (not shown).

The film-feeding-amount detecting means 543 detects movement of perforations in the film by a photo-reflector (hereinafter referred to as "PR") (not shown), to output a detecting signal to the control circuit 540. Back-closure opening and closing detecting means 544 is arranged such that a leaf switch that is a well-known switch means (not shown) is turned ON and OFF by a back closure. A detecting signal therefrom is outputted to the control circuit 540. Changeover operating means 545 is formed by an indication button (not shown) which indicates normal or panorama, and outputs, to the control circuit 540, whether or not the indication button is depressed.

Film presence and absence detecting means 546 is formed by a leaf switch which is turned ON and OFF by a film patrone (not shown). An output signal therefrom is outputted to the control circuit 540. Film rewinding operating means 547 is a push button switch (not shown) which operates when the film is rewound on the way. An output signal therefrom is outputted to the control circuit 540. Power source means 548 is a main switch for switching an OFF condition disabling photographing of the camera and an ON condition enabling photographing of the camera. ON and OFF signals thereof are outputted to the control circuit 540.

Operation of the camera capable of changing the image-plane size arranged as described above will be described with reference to FIGS. 28 and 29.

Figure 28:
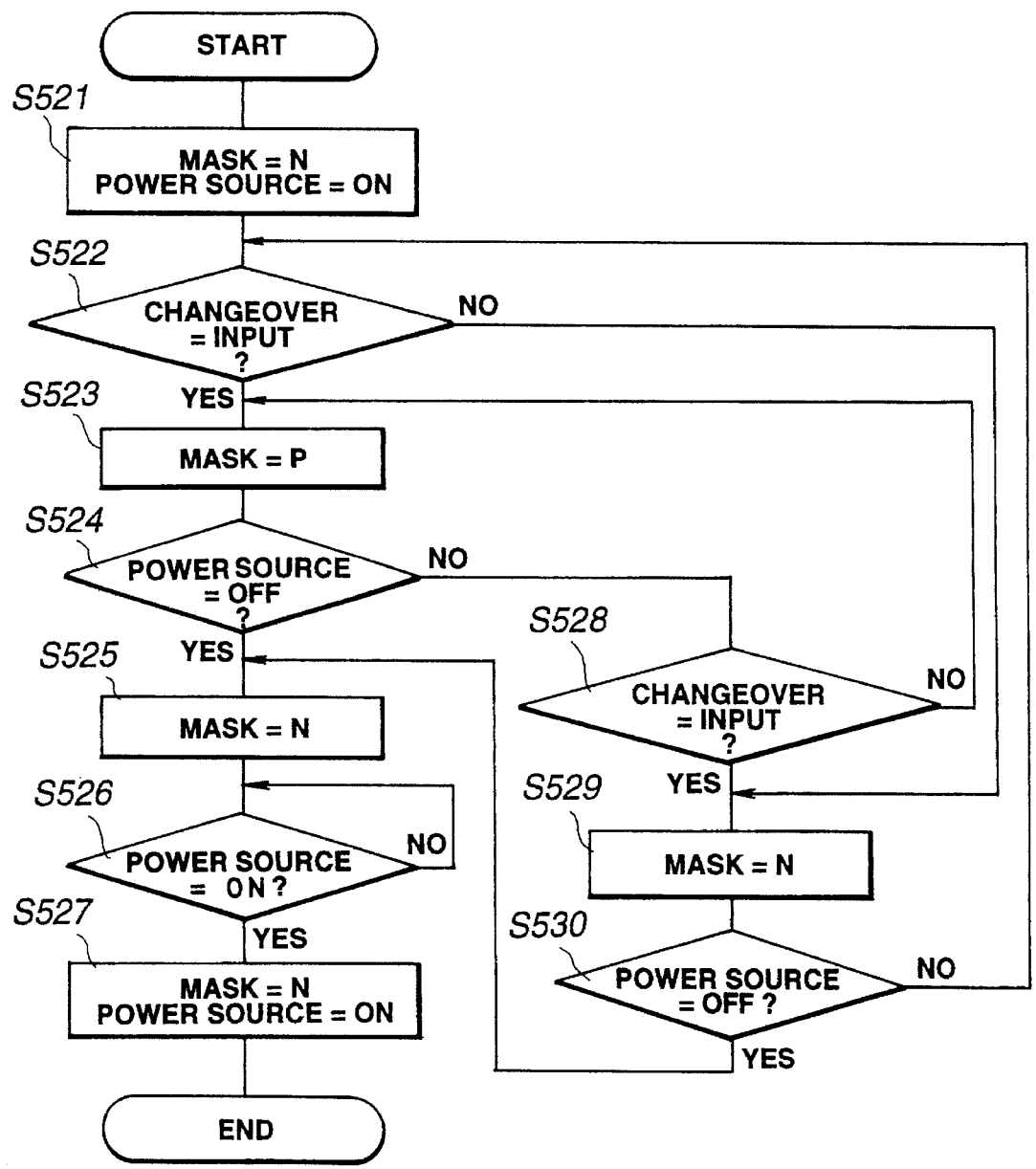
FIG. 28 is a flow chart showing a function of being returned to a normal photographing condition by turning-ON and turning-OFF of a power source of the camera according to the fifth embodiment.

FIG. 28 shows changeover operation to the normal photographing condition in a case where the power source means 548 is changed over to ON and OFF. The back closure maintains a closed condition. A sequence starts. At the time of start under a condition of Step S521, the upper changeover mask 505 and the lower changeover mask 506 are arranged at a position of normal photographing. Further, the finder mask portion 538a of the LCD mask 538 is such that the normal visual field frame is under a condition where light is transparentized. Thus, the power source means 548 is under an ON condition. Subsequently, in Step S522, the changeover operating means 545 operates to judge whether or not a changeover signal is inputted. When the changeover signal is inputted, a program proceeds to Step S523.

In Step S523, the motor drive circuit 541 drives the motor 533 by the control circuit 540. The pinion gear 533a drives the changeover gear 517d of the mask changeover shaft 517, through the driving-force transmitting gears 532 and 531, to angularly move the mask changeover shaft 517 in the counterclockwise direction. Thus, the upper changeover mask 505 and the lower changeover mask 506 are moved downwardly and upwardly, respectively. At start of the movement, the mask switch 537 is switched from OFF to ON. With an ON signal thereof serving as a trigger signal, rotation of the PI gear 535 is detected by the PI 536 to control the motor 533. The changeover masks 505 and 506 are moved to a position where the aperture 502 defines a photographing range of panorama. Moreover, at this time, the control circuit 540 drives the LCD mask 538 by the LCD drive circuit 539 to bring the finder mask portion 538a to a light shielding condition. The finder visual field frame 538 is defined to a finder visual field range of panorama.

Subsequently, in Step S524, it is confirmed whether or not the power source means 548 is turned OFF. If the power source means 548 is turned OFF, the motor 533 is reversed in rotation. The mask changeover shaft 517 is rotated through the gears in the clockwise direction. The upper changeover mask 505 and the lower changeover mask 506 are moved upwardly and downwardly, respectively, from the position of panorama. At the time the changeover projection 505b switches the mask switch 537 from ON to OFF, the motor 533 stops. The changeover masks 505 and 506 stop at a predetermined position of normal. Moreover, the LCD drive circuit 539 drives the LCD mask 538 by the control circuit 540 to bring the finder mask portion 538a to a condition where the light is transparentized, to thereby be brought to the normal photographing condition (Step S525).

In Step S526, it is judged whether or not the power source means 548 is turned ON. If the power source means 548 is turned ON, the program proceeds to Step S527. In Step S527, the upper changeover mask 505 and the lower changeover mask 506 are arranged at a predetermined position upon normal photographing. Furthermore, the LCD mask 538 is arranged such that the finder mask portion 538a is brought to a condition where light is transparentized. Thus, the normal photographing condition is maintained.

Returning to Step S522, when the changeover signal from the changeover means 545 is not inputted, the program proceeds to Step S529. The upper changeover mask 505 and the lower changeover mask 506 are arranged at the position of normal photographing. Further, the finder mask portion 538a of the LCD mask 538 is brought to a condition where the light is transparentized, of the normal visual field frame and is maintained. At Step S530, it is judged whether or not the power source means 548 is turned OFF. If the power source means 548 is turned OFF, the program is returned to Step S525. If the power source means 548 is not turned OFF, the program is returned to Step S522.

Moreover, returning to Step S524, if the power source means 548 is not turned OFF, the program proceeds to Step S528. In Step S528, the changeover operating means 545 is operated. It is judged whether or not the changeover signal is inputted. If the changeover signal is inputted, the program proceeds to Step S529. Unless the changeover signal is inputted, the program is returned to Step S523. The above-described steps are performed, and the program ends under a condition of Step S527.

In this manner, here, the arrangement is such that, once the power source means 548 is turned OFF regardless of which condition the camera occupies, i.e., the panoramic photographing or the normal photographing, changeover is performed to the normal photographing. Even if the power source means 548 is again turned ON, the normal photographing is maintained. The normal photographing is maintained as far as operation to switch to the panoramic photographing is again performed by the changeover operating means 545 under such a condition that the power source means 548 is turned ON.

Figure 29:
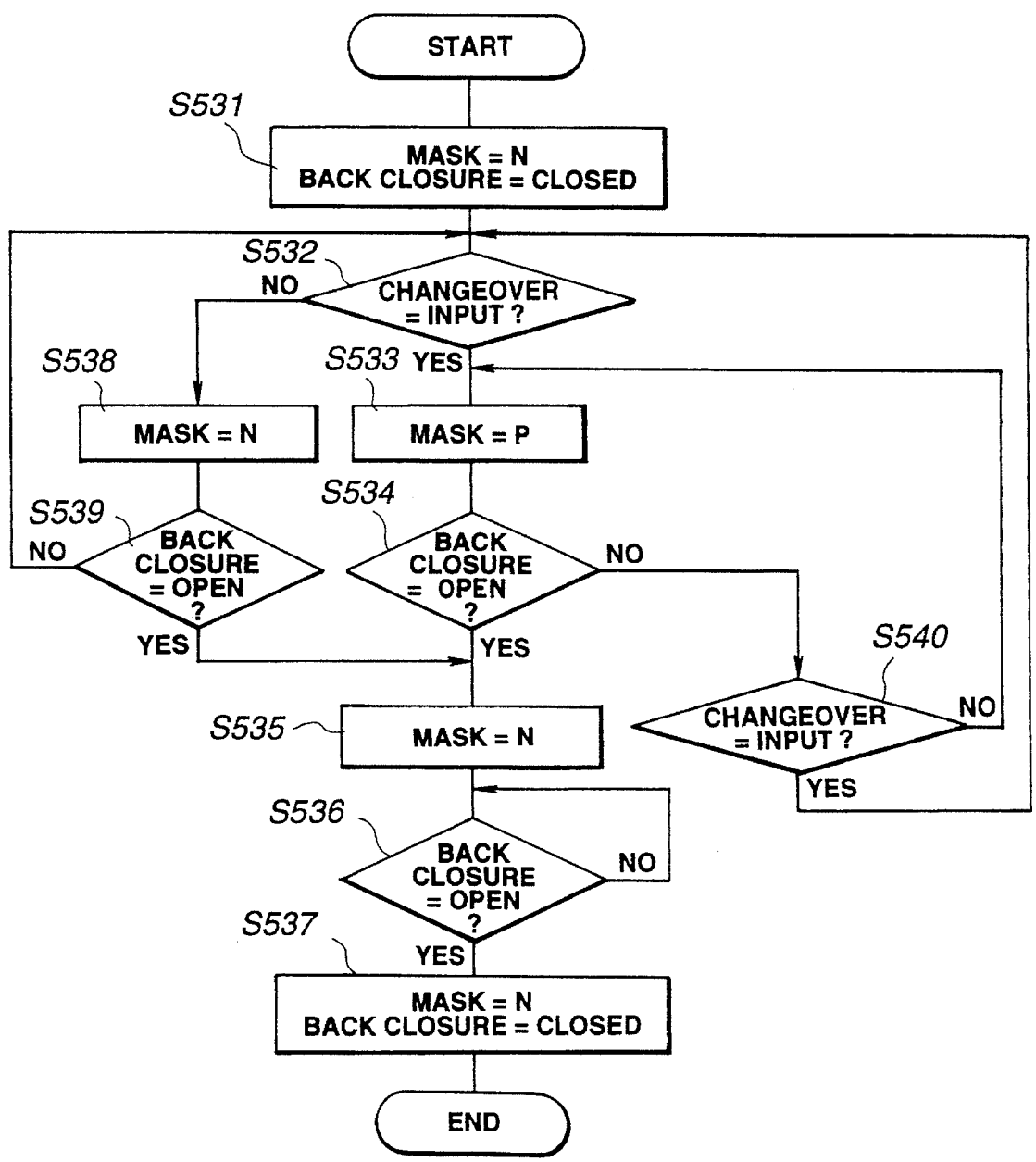
FIG. 29 is a flow chart showing a function of being returned to the normal photographing condition by opening and closing of a back closure in the camera according to the fifth embodiment.

Next, FIG. 29 shows changeover to the normal photographing in a case where the back closure opens and is closed. The power source means 548 maintains an ON condition. The sequence starts. At start point of time in Step S531, the upper changeover mask 505 and the lower changeover mask 506 are arranged at the position of the normal photographing.

Moreover, the finder mask portion 538a of the LCD mask 538 is such that the normal visual field frame is brought to a condition where the light is transparentized, and the power source means 548 is brought to the ON condition. In Step S532, the changeover operating means 545 is operated. It is judged whether or not the panoramic photographing changeover signal is inputted. When the changeover signal is inputted, the program proceeds to Step S533.

In Step S533, the motor drive circuit 541 drives the motor 533 by the control circuit 540, similarly to Step S522 shown in FIG. 28. The mask changeover shaft 517 is moved angularly in the counterclockwise direction through the gears 533a, 532, 531 and 517d. The upper changeover mask 505 and the lower changeover mask 506 are moved to the position defining the aperture 502 to the photographing range of the panorama. Moreover, simultaneously, the LCD drive circuit 539 drives the LCD mask 538 by the control circuit 540, to bring the finder mask portion 538a to a light shielding condition. The finder visual field frame 522 is defined to the finder visual field range of the panorama.

In Step S534, it is confirmed whether or not the back closure opens. If the back closure opens, this is detected by the back-closure opening and closing detecting means 544. A signal thereof is outputted to the control circuit 540. The drive motor 533 is reversed in rotation by the motor drive circuit 541. The mask changeover shaft 517 is rotated in the clockwise direction through the gears. The upper changeover mask 505 and the lower changeover mask 506 are moved from the position of panorama upwardly and downwardly, respectively. The drive motor 533 stops at the time the changeover projection 505b switches the mask switch 537 from ON to OFF. Thus, the changeover masks 505 and 506 stop to a predetermined position of normal. Furthermore, the LCD drive circuit 539 drives the LCD mask 538 by the control circuit 540, to bring the finder mask portion 538a to a condition where the light is transparentized, to thereby be brought to a normal photographing condition (Step S535).

In Step S536, it is judged whether or not the back closure is closed. If the back closure is closed, the program proceeds to Step S537. In Step S537, the upper changeover mask 505 and the lower changeover mask 506 are arranged at the predetermined position upon normal photographing. Further, the LCD mask 538 is such that the finder mask portion 538a is brought to the condition where the light is transparentized, to thereby maintain the normal photographing condition.

Moreover, in Step S532, when a changeover signal from the changeover means 545 is not inputted, the program proceeds to Step S538 so that the normal photographing condition is maintained. In Step S539, it is judged whether or not the back closure is closed. If the back closure is open, the program proceeds to Step S535. If it is not OFF, the program is returned to Step S532. Moreover, in Step S534, if the back closure does not open, the program proceeds to Step S540. In Step S540, the changeover operating means 545 is operated so that it is judged whether or not the normal-photographing changeover signal is inputted. If the normal-photographing changeover signal is inputted, the program is returned to Step S532. If the normal-photographing changeover signal is not inputted, the program is returned to Step S533. The above-described Steps are performed, and the performing ends under a condition of Step S537.

In this manner, here, changeover is made to the normal photographing once the back closure opens regardless which condition (i.e. panoramic photographing or the normal photographing) is present. Even if the back closure is again is closed, the normal photographing is maintained. Thus, the normal photographing is maintained as far as changeover is again made to the panoramic photographing by the changeover operating means 545 under a condition in which the back closure is closed.

As described above, according to the fifth embodiment, even if the power source is turned OFF, and even if the back closure opens, the mode is brought to a normal photographing mode. Thus, it is possible to provide a camera superior in convenience in use.

Further, in the present embodiment, the camera is brought to the normal photographing condition in interlocking manner with the fact that the power source is turned OFF. However, this may be interlocked with the fact that the power source is turned ON. Moreover, a condition is brought to the normal condition in interlocking manner with the fact that the back closure opens. However, the condition may be brought to the normal condition in interlocking manner with the fact that the back closure is closed.

A first modification of the fifth embodiment will next be described.

Arrangement of the first modification of the fifth embodiment is similar to the arrangement of the principal portion of the camera illustrated in FIG. 27, and the function thereof will be described with reference to the flow chart shown in FIG. 28 and a flow chart shown in FIG. 30. The modification is arranged such that the camera is brought to a normal photographing condition in interlocking manner with turning-ON and turning-OFF of the power source and rewinding of the film.

FIG. 28 shows a sequence in which a condition is brought to a normal photographing condition in interlocking with ON and OFF of the power source. The sequence is similar to that described above.

Figure 30:
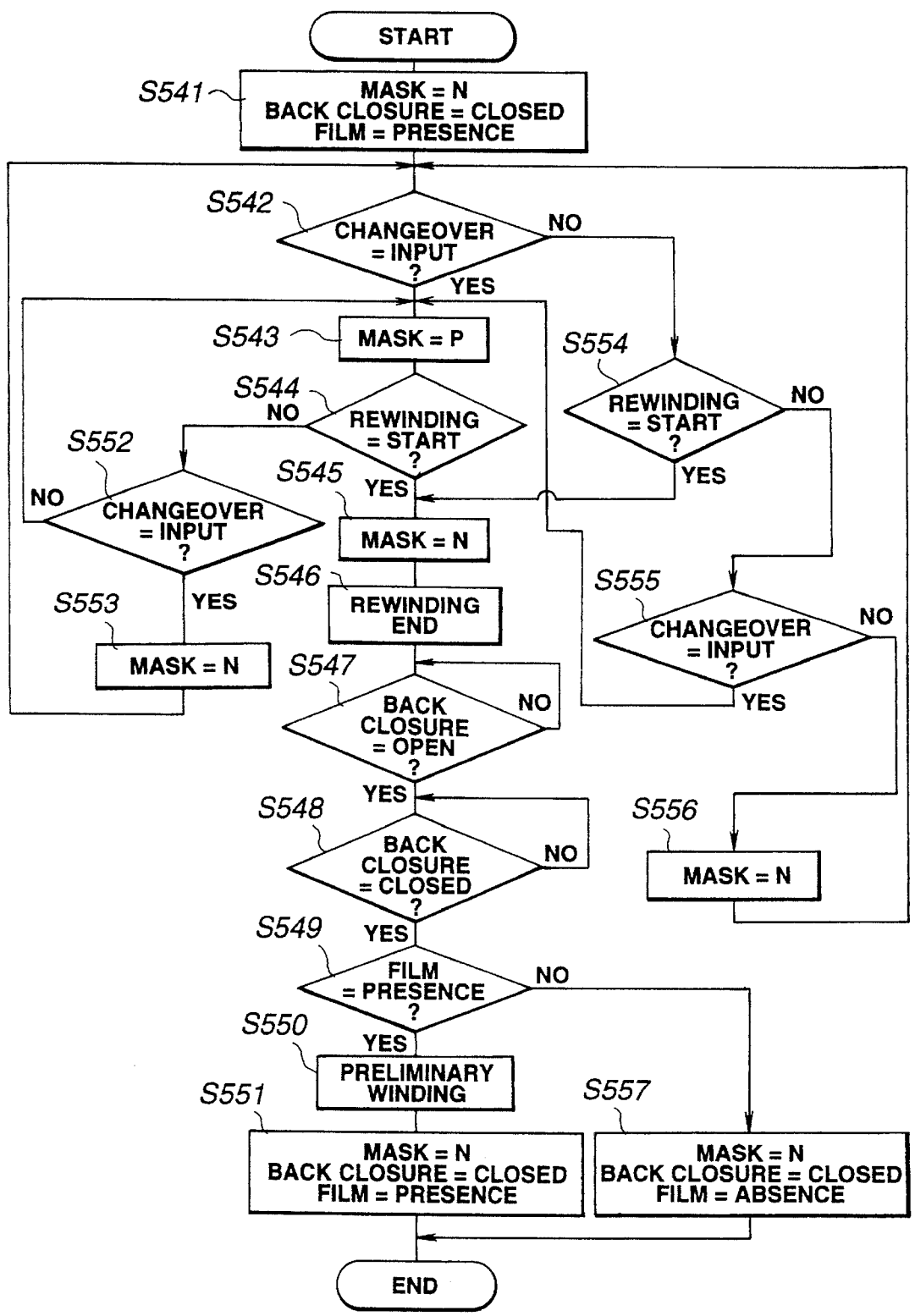
FIG. 30 is a flow chart showing a function of being returned to a normal photographing condition by rewinding of a film in a camera according to a first modification of the fifth embodiment.

FIG. 30 shows a case where the camera is brought to a normal photographing condition in interlocking manner with rewinding of the film. The power source maintains an ON-condition. The sequence starts. In Step S541, the film is loaded and the back closure is closed. The upper and lower changeover masks 505 and 506 and the finder mask portion 538a of the LCD mask 538 are brought to the normal photographing condition. At this time, when a release signal from release means (not shown) is inputted to the control circuit 540, a shutter is controlled so that the film is exposed, and the film is wound. This winding of the film is arranged such that the motor drive circuit 541 drives the film feeding motor 542 by the control circuit 540 so that the film is wound by film feeding means (not shown), and a length corresponding to a single frame of the film is detected by the film feeding-amount detecting means 543, to stop winding of the film. The above-described sequence of winding of film is omitted in this flow chart. In Step S542, the changeover operating means 545 is operated to judge whether or not the panoramic photographing changeover signal is inputted. If the changeover signal is inputted, the program proceeds to Step S543.

In Step S543, the motor drive circuit 541 drives the motor 533 by the control circuit 540, similar to Step S522 shown in FIG. 28. The mask changeover shaft 517 is moved angularly in the counterclockwise direction through the gears 533a, 532, 531 and 517d. The upper changeover mask 505 and the lower changeover mask 506 are moved to a position where the aperture 502 is defined to the photographing range of panorama. Moreover, simultaneously, the LCD drive circuit 539 drives the LCD mask 538 by the control circuit 540 to bring the finder mask portion 538a to a light shielding condition. Thus, the finder visual field frame 522 is defined to the finder visual field range of panorama.

In Step S544, the above-described winding of the film is successively performed at the panorama photographing condition. When the film is wound up to an end thereof, the end is detected by the film feeding-amount detecting means 543. A film rewinding signal is inputted to the control circuit 540 from the film rewinding operating means 547. Thus, rewinding of the film is indicated or instructed so that rewinding starts. However, here, it is judged that rewinding of the film starts. If the rewinding of the film starts, the program proceeds to Step S545. In Step S545, the upper and lower changeover masks 505 and 506 and the finder mask portion 538a of the LCD mask 538 are brought to the normal photographing condition. Furthermore, rewinding of the film is performed. In Step S546, end or completion of the film rewinding is detected by the film feeding-amount detecting means 543.

In Step S547, Steps are repeated until the back closure opens. If the back closure opens, the program proceeds to Step S548. In Step S548, Steps are repeated until the back closure is closed. If the back closure is closed, the program proceeds to Step S549. In Step S549, it is detected by the film presence and absence detecting means 546 whether or not a new film is loaded when the back closure opens in Step S547. If the film is loaded, the program proceeds to Step S550. In Step S550, preliminary or standby winding of the film is performed. In Step S551, the condition is brought to a condition similar to Step S541, and the program ends.

Returning to Step S544, if rewinding of the film does not start, the program proceeds to Step S552. It is judged whether or not the changeover signal to the normal photographing condition is inputted to the control circuit 540 by the changeover operating means 545. If the changeover signal is inputted to the control circuit 540, the program proceeds to Step S553. In Step S553, the upper and lower changeover masks 505 and 506 and the finder mask portion 538a of the LCD mask 538 are brought to the normal photographing condition, and the program is returned to Step S542. If the changeover signal is not inputted to the control circuit 540 in Step S552, the program is returned to Step S543.

Returning to Step S542, if the changeover signal to the normal photographing condition is not inputted to the control circuit 540 by the changeover operating means 545, the program proceeds to Step S554. In Step S554, it is judged whether or not film rewinding starts under the normal photographing condition. If film rewinding starts, the program proceeds to Step S545. If film rewinding does not start, the program proceeds to Step S555. In Step S555, it is judged whether or not the changeover operating means 545 is operated so that the panoramic photographing changeover signal is inputted. If the panoramic photographing changeover signal is inputted, the program proceeds to Step S543. If the panoramic photographing changeover signal is not inputted, the program proceeds to Step S556. In Step S556, the upper and lower changeover masks 505 and 506 and the finder mask portion 539a of the LCD mask 539 are brought to the normal photographing condition. The program is returned to Step S542.

In Step S549, if the film is not loaded, the program proceeds to Step S557. The condition is brought to a condition similar to Step S551 except that the film is not loaded, and the program ends.

In this manner, here, once the back closure opens, changeover is made to the normal photographing, even if the condition is any one of the panoramic photographing and the normal photographing. Even if the back closure is again closed, the normal photographing is maintained. As far as changeover is not again made to the panoramic photographing by the changeover operating means 545 under the condition that the back closure is closed, the normal photographing is maintained.

As described above, according to the first modification of the fifth embodiment, even if the power source is turned OFF, and even if the film rewinding starts, a condition is brought to the normal photographing condition in interlocking therewith. Thus, it is possible to provide a camera which is superior in convenience in use.

Further, in the modification, a condition is brought to the normal photographing condition in interlocking manner with start of the film rewinding. However, the condition may be interlocked with the halfway and the time of end of the film rewinding.

A second modification of the fifth embodiment will next be described. An arrangement of this modification is also similar to the arrangement of the principal portion of the camera illustrated in FIG. 27, but is different in function therefrom. The function will be described with reference to a flow chart shown in FIG. 28 and a flow chart shown in FIG. 31. In this modification, the condition is brought to a normal photographing condition in interlocking manner with ON and OFF of a power source and the fact that a back closure is closed when a film is loaded.

FIG. 28 shows a sequence in which a condition is brought to the normal photographing condition in interlocking manner with turning-ON and -OFF of the power source, which is similar to the above.

Figure 31:
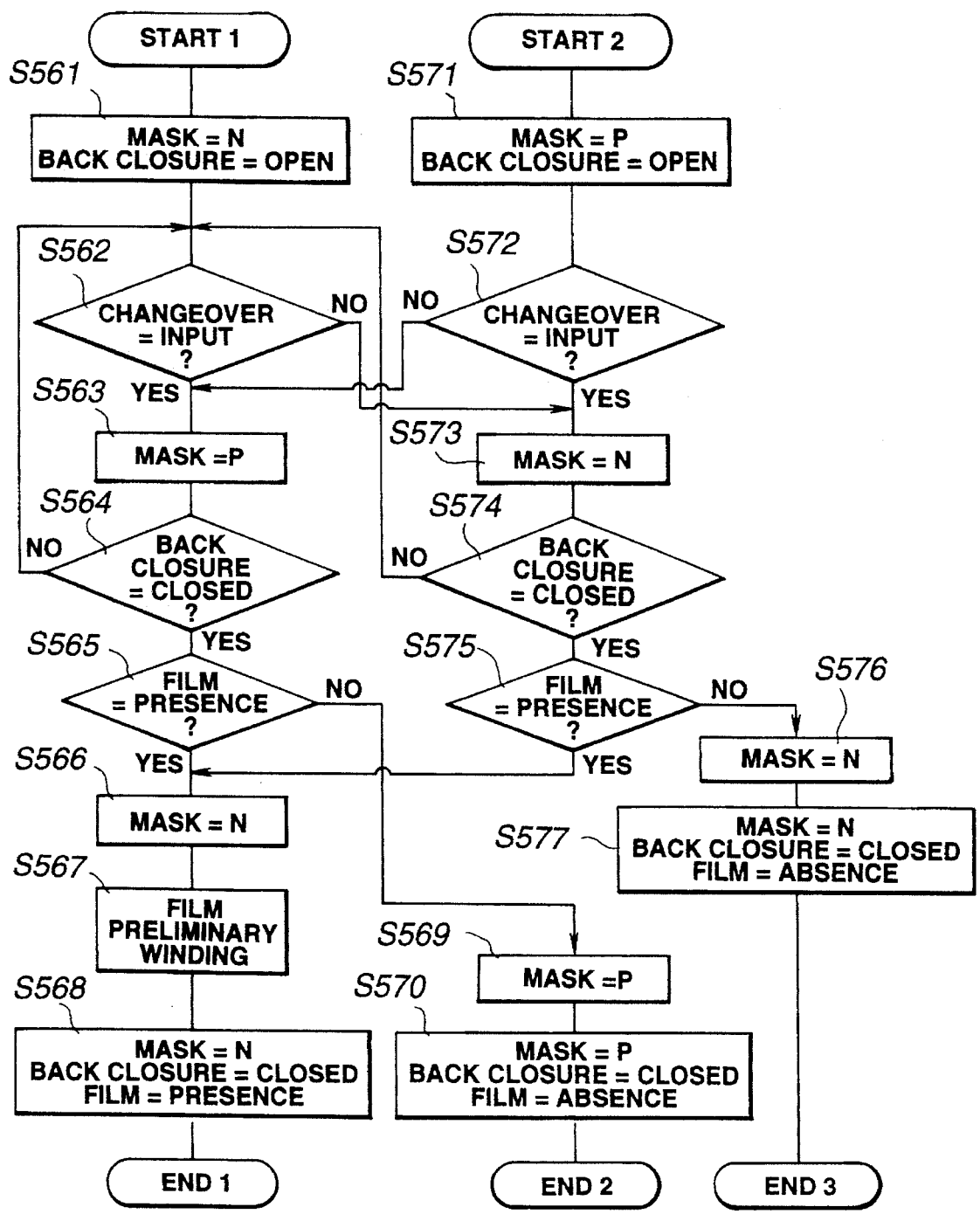
FIG. 31 is a flow chart showing a function of being returned to a normal photographing condition by the fact that a back closure is closed, upon film loading, in a camera according to a second modification of the fifth embodiment.

FIG. 31 shows a case where the camera is brought to the normal photographing condition in interlocking manner with the fact that the back closure is closed, when the film is loaded. The sequence starts at Start 1. In Step S561, the upper and lower changeover masks 505 and 506 and the finder mask portion 538a of the LCD mask 538 are brought to the normal photographing condition, and the condition is brought to a condition in which the back closure opens. In Step S562, the changeover operating means 545 is operated, and it is judged whether or not the panoramic photographing changeover signal is inputted. If the changeover signal is inputted, the program proceeds to Step S563.

In Step S563, the motor drive circuit 541 drives the motor 533 by the control circuit 540. The mask changeover shaft 517 is moved angularly in the counterclockwise direction through the gears 533a, 532, 531 and 517d. The upper changeover mask 505 and the lower changeover mask 506 after the aperture 502 to a position which is defined to the photographing range of the panorama. Moreover, simultaneously, the LCD drive circuit 539 drives the LCD mask 538 by the control circuit 540, to bring the finder mask portion 539a to a light shielding condition. The finder visual field frame 522 is defined to the finder visual field range of the panorama.

In Step S564, detection is made by the backclosure opening-and-closure detecting means. If the back closure is not closed, the program is returned to Step S562. If the back closure is closed, the program proceeds to Step S565. In Step S565, it is detected by the film presence and absence detecting means 546 whether or not the film is loaded. If the film is loaded, the program proceeds to Step S566. In Step S566, the upper and lower changeover masks 505 and 506 and the finder mask portion 538a of the LCD mask 538 are brought to the normal photographing condition, and the program proceeds to Step S567. In Step S567, preliminary winding of the film is performed. In Step S568, the film is loaded and the back closure is closed. The upper and lower changeover masks 505 and 506 and the finder mask portion 538a of the LCD mask 538 maintain the normal photographing condition, and the program ends at End 1.

In Step S565, when the film is not loaded, the program proceeds to Step S569. The program proceeds to Step S570, while the upper and lower changeover masks 505 and 506 and the finder mask portion 538a of the LCD mask 538 are under the panoramic photographing condition. In Step S570, the back closure is closed under the condition where the film is not loaded. The panoramic photographing condition is maintained, and the program ends at End 2.

Here, a sequence starts at Start 2. In Step S571, the back closure opens, and a condition is brought to the panoramic photographing condition. In Step S572, the changeover operating means 545 is operated. It is judged whether or not the normal photographing changeover signal is inputted. Unless the changeover signal is inputted, the program proceeds to Step S563. If the changeover signal is inputted, the program proceeds to Step S573. In Step S573, the condition is brought to a normal photographing condition, and the program proceeds to Step S574.

Here, returning to Step S562, if the panoramic changeover signal is not inputted to the control circuit 540, the program proceeds to Step S573. The normal photographing condition is maintained, and the program proceeds to Step S574.

In Step S574, it is detected by the backclosure opening and closing detecting means 544 whether or not the back closure is closed. If the back closure is not closed, the program is returned to Step S562. If the back closure is closed, the program proceeds to Step S575. In Step S575, it is detected by the film presence and absence detecting means 546 whether or not the film is loaded. If the film is loaded, the program is returned to Step S566. If the film is not loaded, the program proceeds to Step S576. In Step S576, the program proceeds to Step S577 while under the normal photographing condition. In Step S577, the back closure is closed under the condition in which the film is not loaded. The normal photographing condition is maintained, and the program ends at End 3.

In this manner, in the second modification of the fifth embodiment, if the back closure is closed under the condition that the film is loaded, even under an any one condition of the panoramic photographing and the normal photographing, changeover is made to the normal photographing condition. Even if the back closure is closed under the condition in which the film is not loaded, the photographing condition is not changed over.

As described above, according to the second modification of the fifth embodiment, the condition is brought to the normal photographing condition in interlocking manner with the fact that the power source is turned OFF. Thus, it is possible to provide a camera superior in convenience in use. Further, the photographing condition is not changed over even if the back closure is closed under the condition that the film is not loaded. However, the condition is brought to the normal photographing condition in interlocking manner with the fact that the back closure is closed under the condition that the film is loaded. Accordingly, it is possible to provide a camera which is superior in convenience in use, and which is brought to the normal photographing condition upon start of the photographing of a new film.

Moreover, in the second modification, the condition is changed over to the normal photographing condition prior to preliminary winding of the film. However, the changeover may be after the preliminary winding of the film. Furthermore, even in a camera having no preliminary winding, changeover may be made to the normal photographing condition after the back closure has been closed and the loading of the film has been confirmed.

Thus, according to the fifth embodiment of the invention, which includes the above-described modifications, it is possible to provide, in the camera capable of changing over the image-plane size, a camera which is superior in convenience in use, and which is capable of setting the photographing image-plane size to the normal photographing size interlocking with rewinding of the film and loading of the film, opening and closing of the back closure, and turning-ON and -OFF of the power source, that is, the delimiter or break at the time the camera is used.

By the way, in a conventional camera in which photographing means such as a photographing lens, a shutter blade of a focal plane shutter and the like is arranged in the vicinity of an aperture, if mask means is in a non-trimming position under a condition in which the back closure opens, there is a fear that a user touches the photographing lenses and the shutter blade of the focal plane shutter which are arranged in the vicinity of the aperture, and the like, to expose the lens and shutter to dirt and damage the same. It is needless to say that, in a case where such photographing lenses become dirty or are soiled, the photograph is badly taken, or in a case where the shutter blade is broken or damaged, there is a fear that deficiencies such as non-exposure, over-exposure, under-exposure and the like are generated.

In order to solve the above-discussed problems, the photographing means such as the photographing lenses, the shutter and the like should be covered by a protective element in accordance with opening of the back closure. However, since, conventionally, the photographing means is displayed within the finder visual field in interlocking manner with setting of the image plane size due to the mask means, there is a problem that the finder visual field is shielded in light more than the photographing image plane in interlocking manner with opening of the back closure of the camera.

Further, there is also a problem that, upon rewinding of the film, the leader portion of the film is in contact with the photographing means such as the photographing lenses, the shutter and the like to expose them to dirt and break the same.

In view of the above, an embodiment which solves such problems will next be described.

Figure 32:
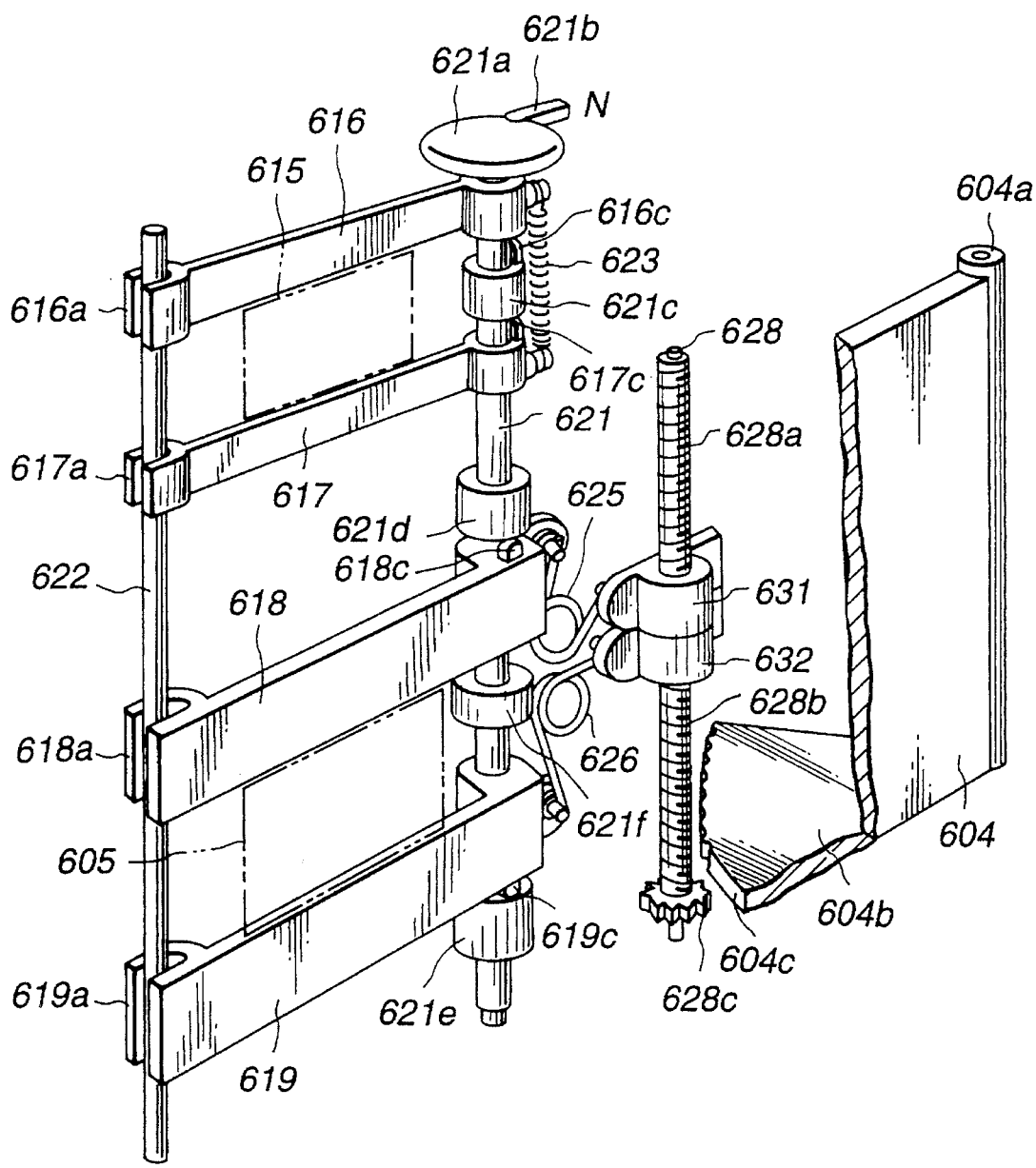
FIG. 32 is a perspective view of a normal condition of a protective unit of a camera according to a sixth embodiment of the invention, as viewed from the side of a back closure.
Figure 33:
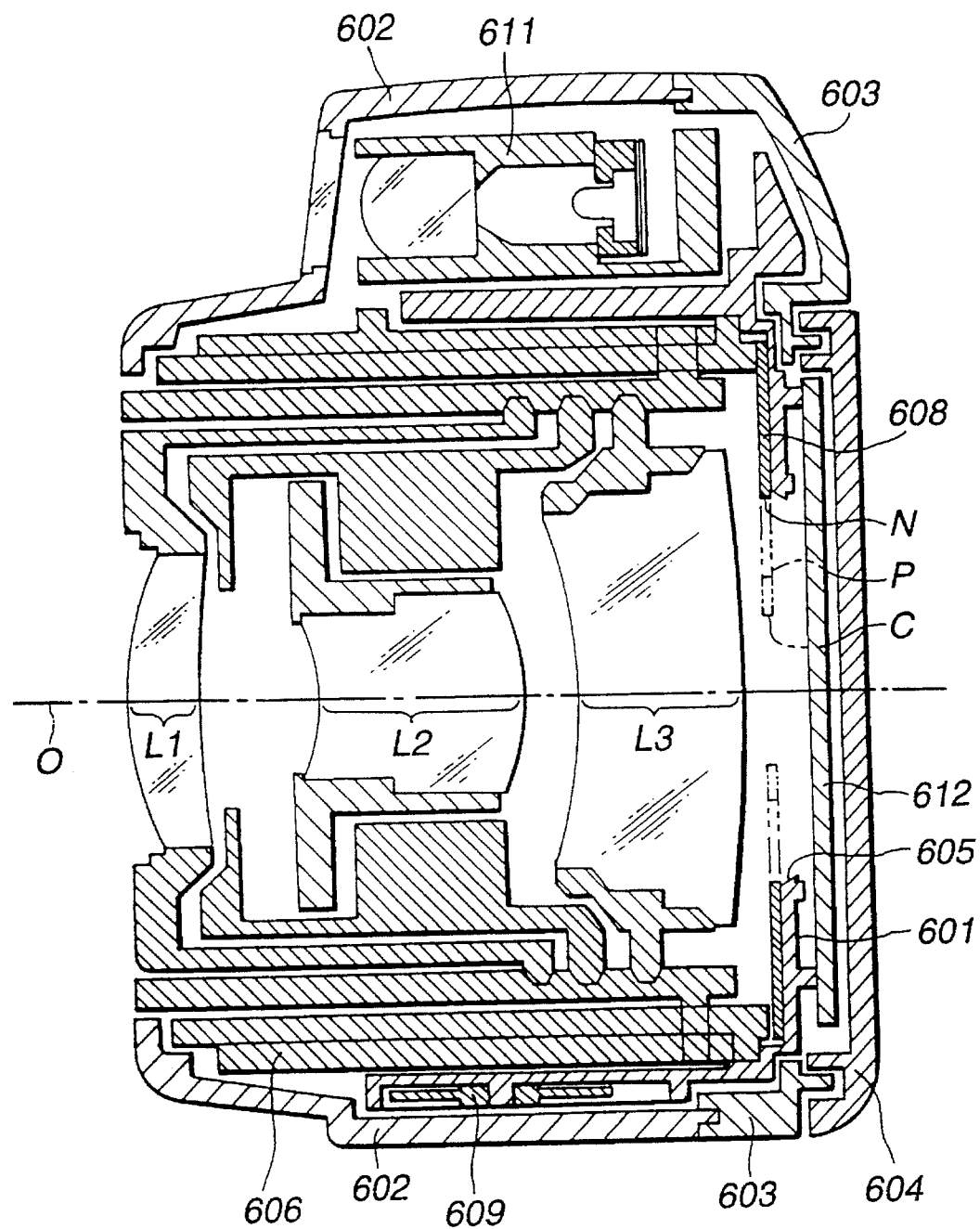
FIG. 33 is a longitudinal cross-sectional view, including an optical axis O, of the camera having the protective unit according to the sixth embodiment.

FIGS. 32 to 35 show a sixth embodiment of the invention. FIG. 33 shows a camera according to the sixth embodiment of the invention, in a longitudinal cross-sectional view including a photographing optical axis O.

The camera has a principal portion thereof which is arranged such that, as shown in the figures, a front cover 602 is arranged on the side of a front of a camera body 601, a rear cover 603 is arranged on the side of a rear, and a back closure 604 is provided from the rear side in openable and closable manner.

An aperture 605 for defining an exposure range upon normal photographing opens at a central portion at a rearward portion of the optical axis O of the camera body 601. A lens frame 606 having a plurality of elements is arranged in front of the aperture 605. The lens frame 606 supports a first group of convex lenses L1, a second group of concave lenses L2 and a third group of concave lenses L3 in order from the front toward the rear. These first, second and third groups of lenses L1, L2 and L3 that are a part of photographing means are moved in a direction of the optical axis O, for example, forward (left-hand side in the figure) while spaces therebetween are held or maintained appropriately, whereby the first, second and third groups of lenses L1, L2 and L3 are so arranged that the focal distances thereof are changeable or capable of being modified. FIG. 33 shows a so-called drum-sunk condition in which a rear end surface (a right-hand surface in the figure) of the third group of lenses L3 is in close vicinity to the aperture 605.

A light shielding mask 608 that comprises light shielding means and protecting elements are arranged vertically symmetrically with the optical axis O arrange therebetween, to the rear of the third group of lenses L3 and in the vicinity of the front surface side of the aperture 605, and are so supported as to be movable to a position N (a normal position) saved (i.e. spaced) from the aperture 605, a position P (a panoramic position) where the mask 608 projects slightly inwardly toward the optical axis O to define an exposure range of the panoramic photograph, and a position C (a closed position) where the mask 608 further projects inwardly toward the optical axis O.

The camera body 601 is provided in extension below the lens frame 606. A rewinding gear 609 for transmitting power to film feeding means (not shown) is supported for angular movement in the vicinity of a lower side of the camera body 601. Moreover, an AF unit (an auto focus unit) 611 that is a distance measuring unit is integrally supported by the camera body 601 above the lens frame 606.

The back closure 604 is supported for angular movement with respect to the camera body 601. By opening and closing of the back closure 604, it is possible to expose or shield a film feeding portion including the aperture 605, a parrone receiving chamber (not shown) and a film winding chamber. The pressure plate 612 is resiliently or elastically supported by the back closure 604. The pressure plate 612 is abutted against a pressure-plate abutting portion in the vicinity of the aperture 605 upon shielding of the back closure 604 to support the film so as to be capable of being fed.

Figure 34:
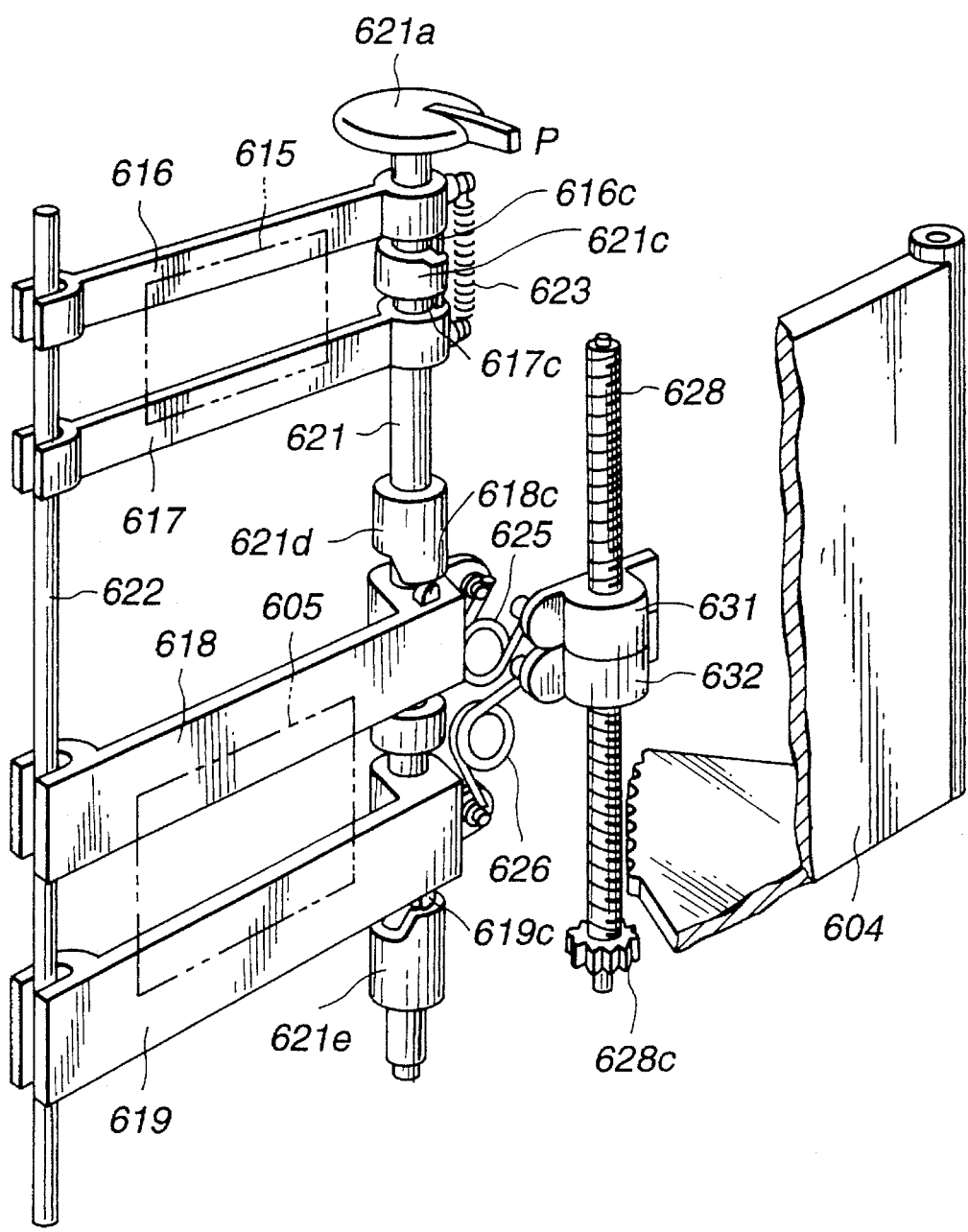
FIG. 34 is a perspective view showing a panoramic condition of the protective unit of the camera illustrated in FIG. 32.
Figure 35:
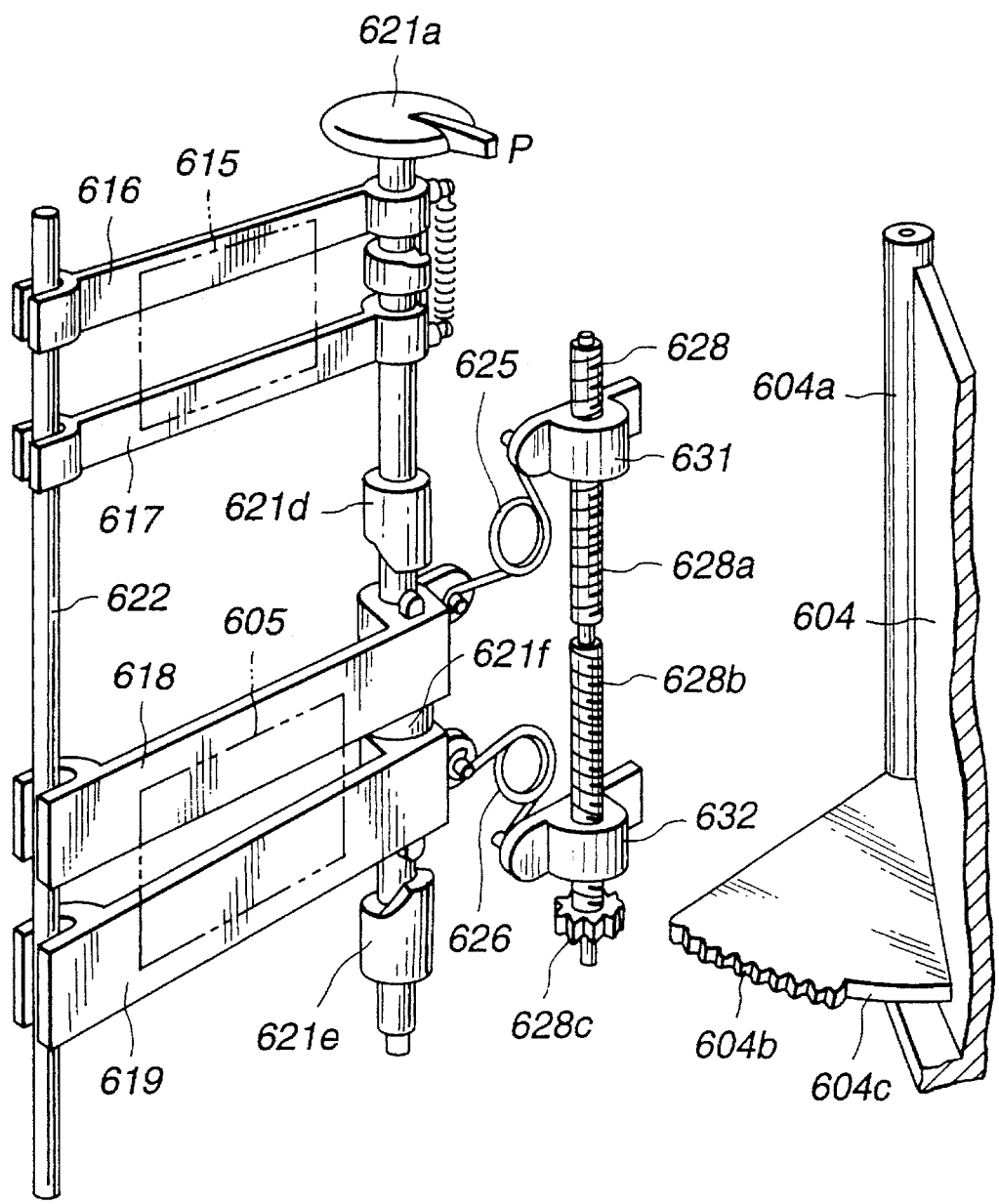
FIG. 35 is a perspective view showing a closed condition of the protective unit of the camera illustrated in FIG. 32.

FIGS. 32, 34 and 35 are perspective views showing a principal portion of a protective unit for the camera according to the sixth embodiment, as viewed from the side of the back closure partially in a transparent view.

An upper mask 618 and a lower mask 619 which cooperate with each other to form the mask 608 is arranged respectively at upper and lower positions symmetrical with each other with the aperture 605 therebetween. These masks 618 and 619 are made of a plate element which is elongated and which is rectangular in shape.

Furthermore, an upper finder mask 616 and a lower finder mask 617 which form a portion of display means having an elongated and rectangular plate element are arranged respectively at upper and lower positions symmetrical with each other with the finder visual field 615 expressing a range of the finder therebetween.

The masks 618 and 619 and the finder masks 616 and 617 are arranged such that one of the ends thereof are supported by a P-shaft (a panoramic shaft) 621 movably vertically, and the other one of the ends which are supported by a support shaft 622 slidably vertically. Angular movement of the masks 618 and 619 and the finder masks 616 and 617 around the P-shaft 621 is regulated.

The P-shaft 621 is supported for angular movement by the camera body 601 (refer to FIG. 33). An upper end portion of the P-shaft 621 projects to an upper end surface of a front cover 602 (refer to FIG. 33). An operating element 621a that is operating means in the form of a disc, provided with a direction projection 621b is integrally formed on the upper end portion. The P-shaft 621 supports the finder masks 616 and 617 at a lower portion of the operating element 621a. These finder masks 616 and 617 are biased in a direction so as to be pulled toward each other, by a finder spring 623 which is formed by a tension coil spring, and are positioned such that the finder masks are abutted against a finder cam portion 621c of the P-shaft 621 by abutting projections 616c and 617c which project respectively from the finder masks 616 and 617. Thus, the finder masks 616 and 617 take an N position and a P position in correspondence with the N position and the P position of the masks 618 and 619.

The P-shaft 621 also supports the masks 618 and 619 as described previously. The upper mask 618 is abutted against an upper cam portion 621d which is provided on the P-shaft, through a projection 618c. The lower mask 619 is abutted against a lower cam portion 621e through a projection 619c. Thus, it is possible to select the N-position and the P-position. A stopper portion 621f larger in diameter in one Step is formed intermediate these masks 618 and 619. Thus, the C-position is regulated.

The upper mask 618 and the lower mask 619 are engaged respectively with an upper charge plate 631 and a lower charge plate 632 threadedly engaged with a charge shaft 628, through toggle springs 625 and 626. Thus, the upper mask 618 and the upper charge plate 631, and the lower mask 619 and the lower charge plate 633 are biased away from each other. The upper mask 618 and the lower mask 619 are abutted respectively against the upper cam portion 621d and the lower cam portion 621e and are vertically positioned by cams 621d, 621e.

The charge shaft 628 is supported for angular movement by the camera body 601 (refer to FIG. 33) on the right side of the P-shaft 621. The charge shaft 628 has an upper half which is formed into a right-hand threaded portion 628a in which a right-hand thread is formed, and a lower half which is formed into a left-hand threaded portion 628b in which a left-hand thread is formed. A gear portion 628c is integrally formed on a lower end portion of the charge shaft 628. The upper charge plate 631 and the lower charge plate 632 are threadedly engaged respectively with the right-hand screw portion 628a and the left-hand screw portion 628b of the charge shaft 628. These charge plates 631 and 632 are supported by the camera body 601 (refer to FIG. 33) to prevent angular movement thereof. By angular movement of the charge shaft 628, the charge plates 631 and 632 are movable toward and away from each other.

The back closure 604 is supported on the camera body 601 (refer to FIG. 33) for angular movement on the right side of the charge shaft 628. A sector-shaped partial gear 604b is integrally formed on the lower end portion of the back closure 604 adjacent to angular movement shaft 604a. Under the condition in which the back closure 604 is closed as shown in FIG. 32, a gear relief portion 604c provided on the partial gear 604b of the back closure 604 is opposed against the gear portion 628c of the charge shaft 628. The gear portion 628c and the partial gear 604b thus are not in mesh with each other.

Moreover, the support shaft 622 is supported integrally by the camera body 601 in parallel to the P-shaft 621. The masks 618 and 619 and the finder masks 616 and 617 are slidably engaged with the support shaft 622 through U-shaped fitting portions 618a, 619a, 616a and 617a.

The gear portion 628c and the partial gear 604b are in mesh with each other as the back closure 604 opens, to rotate the charge shaft 628 through an angle at which the charge plates 631 and 632 are positioned respectively at upper and lower ends. As shown in FIG. 35, as the back closure 604 opens to a certain degree, meshing between the gear portion 628c and the partial gear 604b terminates or is released.

Operation of the sixth embodiment will be described.

First, under a condition in which the back closure 604 is closed, and the P-shaft 621 is in the N-position, the finder masks 616 and 617 are saved from the finder visual field 615, and the masks 618 and 619 are saved from the aperture 605, as shown in FIG. 32.

Next, as shown in FIG. 34, when the P-shaft 621 is rotated and is operated from the N-position to the P-position, the finder cam portion 621c is rotated in accordance with rotation of the P-shaft 621. By the abutting projections 616c and 617c which are abutted against the finder cam portion 621c, a clearance or gap between the finder masks 616 and 617 is reduced to perform trimming with respect to upper and lower portions of the finder visual field 615 to perform display. Meanwhile, the cam portions 621d and 621e are also rotated in accordance with rotation of the P-shaft. The abutting projections 618c and 619c which are abutted respectively against the cam portions 621d and 621e are moved against forces or capacities of the toggle springs 625 and 626. The masks 618 and 619 project toward a center of the aperture 605. Thus, the upper and lower portions of the aperture 605 are trimmed to form an opening of the panoramic size.

Next, a condition in which the back closure 604 opens under a condition of panoramic photographing shown in FIG. 34 is illustrated in FIG. 35.

On the way that the back closure 604 is moved from the condition shown in FIG. 34 to the condition shown in FIG. 35, the partial gear 604b of the back closure 604 is in mesh with the gear portion 628c of the charge shaft 628, so that the charge shaft 628 is moved angularly in the clockwise direction. Thus, the upper charge plate 631 which is threadedly engaged with the right-hand threaded portion 628a is moved upwardly, and the lower charge plate 632 which is threadedly engaged with the left-hand threaded portion 628b is moved downwardly. In this manner, since the charge plates 631 and 632 are positioned to the outside of the masks 618 and 619, the masks 618 and 619 are biased toward each other, and the charge plates 631 and 632 are biased away from each other, by the toggle springs 625 and 626.

Thus, the masks 618 and 619 are abutted against the stopper portion 621f of the P-shaft 621 and are brought to the C-position. The charge plates 631 and 632 are abutted against a stopper portion (not shown) which is provided on the camera body 601 (refer to FIG. 33). At this time, the positions of the respective finder masks 616 and 617 are maintained unchanged, but are maintained at the P-position. The masks 618 and 619 are in the C-position which projects the masks inwardly more than the P-position. In this manner, operation of the finder masks 616 and 617 at the time the back closure opens and operation of the masks 618 and 619 are independent from each other.

Next, when the back closure 604 is closed, operation is reverse to the above-described operation, and a condition is returned to the condition shown in FIG. 34. That is the finder masks 616 and 617 are brought to the P-position, while the masks 618 and 619 are brought to the P-position.

Moreover, also in a case where the back closure 604 opens from the condition of the N-position shown in FIG. 32, the charge shaft 628 is rotated in the clockwise direction, similarly to the above-described manner. The charge plates 631 and 632 are spaced away from each other. The masks 618 and 619 are into the C-position. At this time, the finder masks 616 and 617 are maintained at the N-position. In this manner, also in a case where the back closure 604 opens from the N-position, operation of the finder masks 616 and 617 and operation of the masks 618 and 619 are independent from each other. Also in this case, when the back closure 604 is closed, a condition is, of course, returned to the condition of the N-position as shown in FIG. 32.

Meanwhile, when the P-shaft 621 is brought to the N-position from the condition in which the back closure 604 opens as shown in FIG. 35, the finder masks 616 and 617 are into the N-position. The masks 618 and 619 are maintained to the C-position.

Movement between the various conditions as described previously is indicated in Table 1. In Table 1, the movement between the conditions is as shown by arrows. It is possible to move reversibly between the conditions.

TABLE 1

| POSITION OF BACK CLOSURE | POSITION OF P-SHAFT F-MASK | |
| --- | --- | --- |
| | N | P |
| CLOSING | N ⇌ P | |
| | ⇅ | ⇅ |
| OPENING | C ⇌ C | |

According to such sixth embodiment, the masks 618 and 619 are driven by opening and closing operation of the back closure 604 by a simple mechanism. A position is brought to a projecting position C when the back closure 604 is under the open condition. Accordingly, a fear is reduced that the photographing means such as the third group of lenses L3 and the like is exposed to dirt and damaged or broken by the user, the leader portion of the film and the like. Thus, the camera is brought to a camera high in reliability. Particularly, in the camera in which the photographing lens is located adjacent to the aperture, as shown in FIG. 33, advantages which prevent such photographing means from being exposed to dirt and damaged are high.

Furthermore, the masks 618 and 619 are driven by opening and closing operation of the back closure 604 by a simple mechanism. When the back closure 604 is closed, the masks 618 and 619 are returned to the set position of the P-shaft 621. Accordingly, the camera is brought to a camera which is superior in convenience in use.

Further, regarding the finder masks 616 and 617 which perform display, the P-shaft 621 maintain or maintains a condition assigned by the operating element 621a in spite of opening and closing of the back closure 604. Accordingly, the camera is brought to a camera which is superior in convenience in use.

In addition, the image plane size of the normal (N) and the panorama (P) can be operated from the outside by a simple mechanism. Accordingly, the camera is brought to a camera which is superior in convenience in use.

Thus, according to the sixth embodiment, it is possible to provide an image-plane-size changeover camera which is provided with a protective unit for a camera, which does not expose the interior to dirt and break the photographing means, and which is high in reliability.

In connection with the above, the camera which is capable of changing over the image plane size between the normal and the panorama has been described in the above description. However, the arrangement of the sixth embodiment can also be applied to a camera which can photograph any one of the normal and the panorama. This can easily be carried into practice if the operating portion 621a of the P-shaft 621, the finder cam portion 621c, the finder masks 616 and 617 and the finder spring 623 are omitted, and if the P-shaft 621 is fixedly mounted immovably at a required position.

Moreover, in the present embodiment, a gap is present between the masks 618 and 619 at the C-position, and the design of the mechanisms such as the toggle springs and the like is facilitated or is made easy. However, it is sufficient if there is no such gap. This can easily be coped with by the fact that the position of the stopper portion 621f of the P-shaft 621 is changed or modified, by the fact that widths of the masks 618 and 619 are changed or modified, and the like. In a case where such gap is eliminated, it is possible to enjoy an advantage that dust and dirt do not enter the interior of the camera. Similarly, the arrangement may be such that the gap between the masks 618 and 619 at the C-position is more widened so that the C-position is equal to the P-position.

Figure 36:
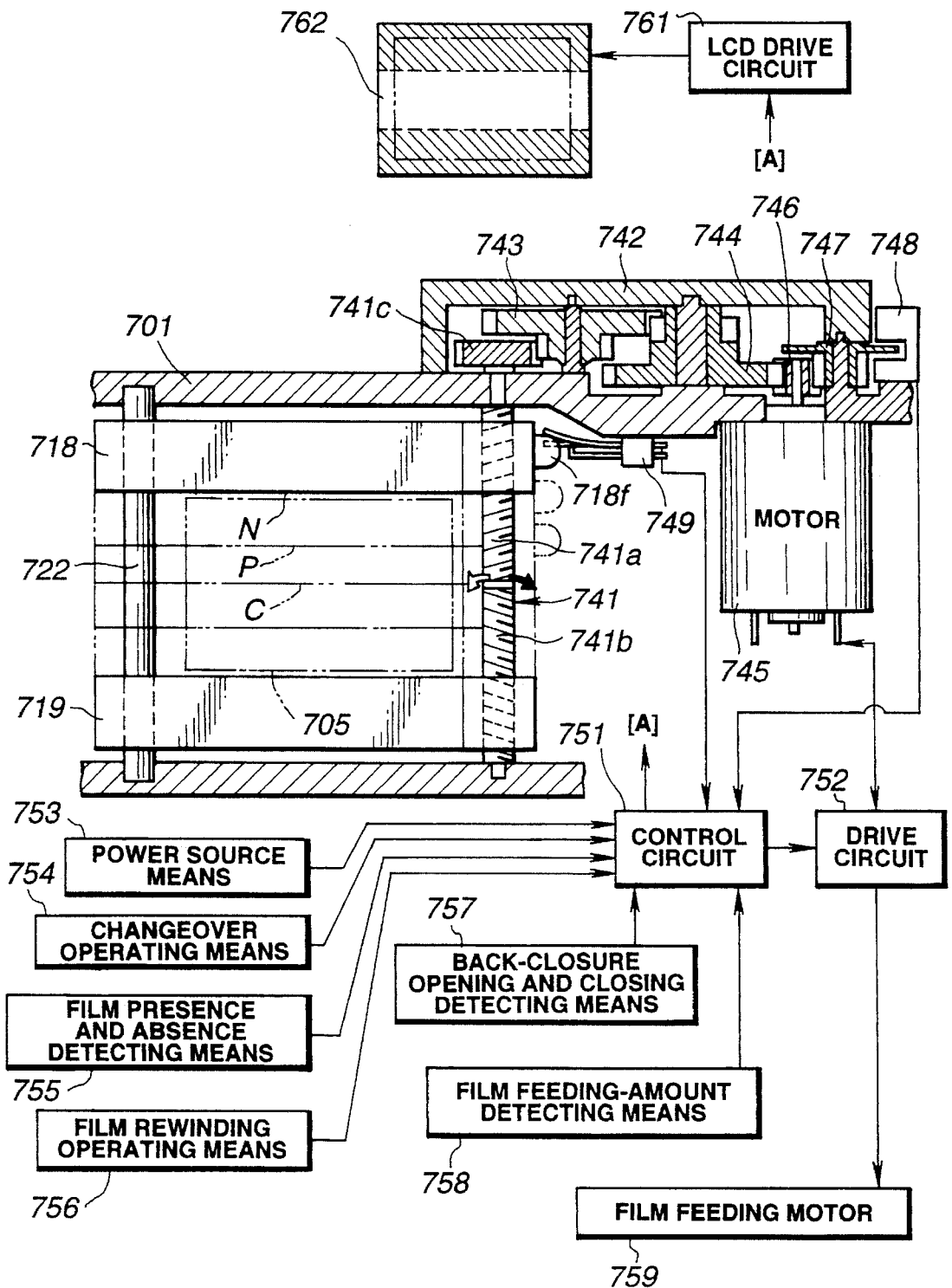
FIG. 36 is a cross-sectional view showing, partially in block diagram, form a camera according to a seventh embodiment of the invention.
Figure 37:
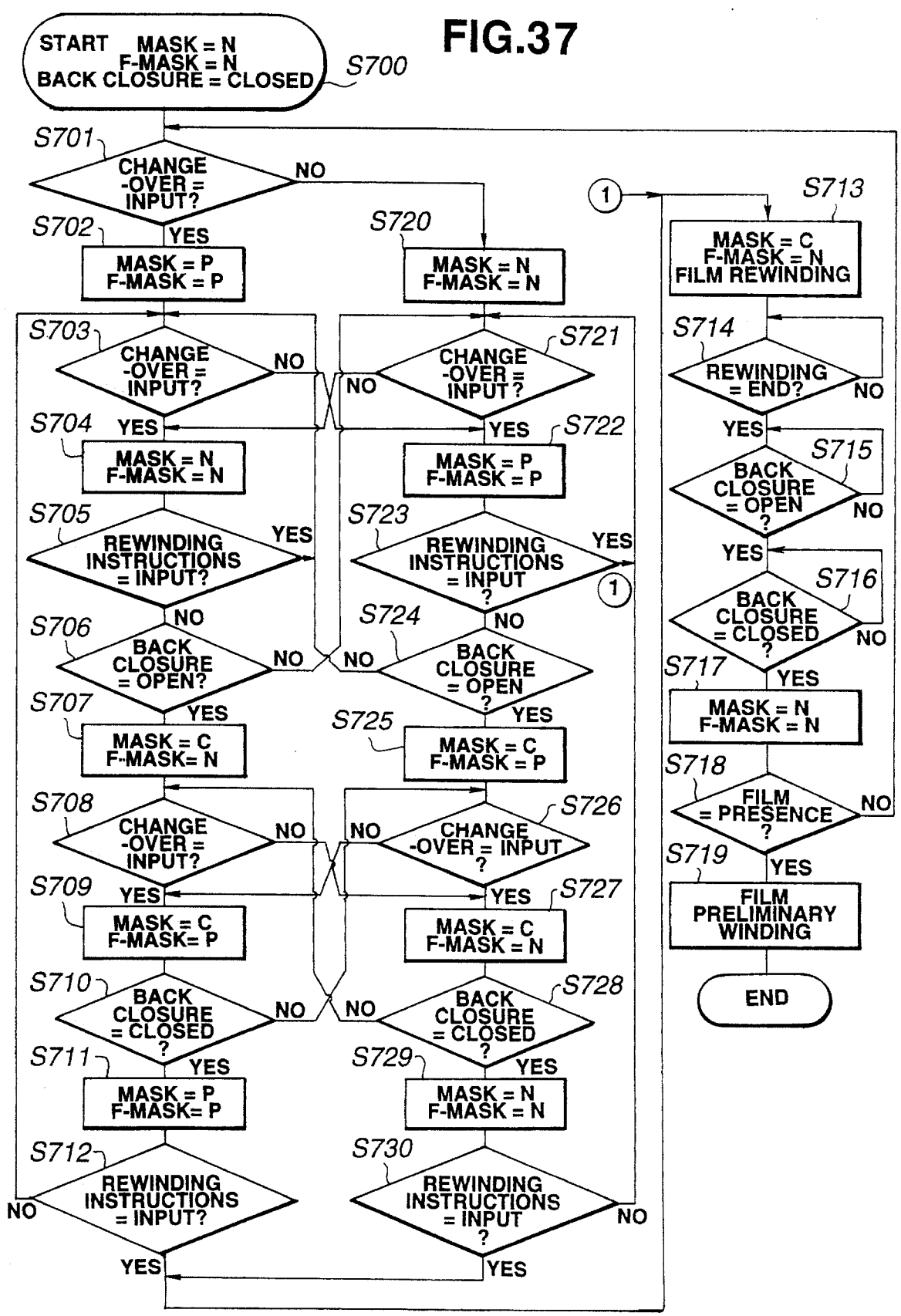
FIG. 37 is a flow chart showing a function of the camera according to the seventh embodiment.
Figure 38:
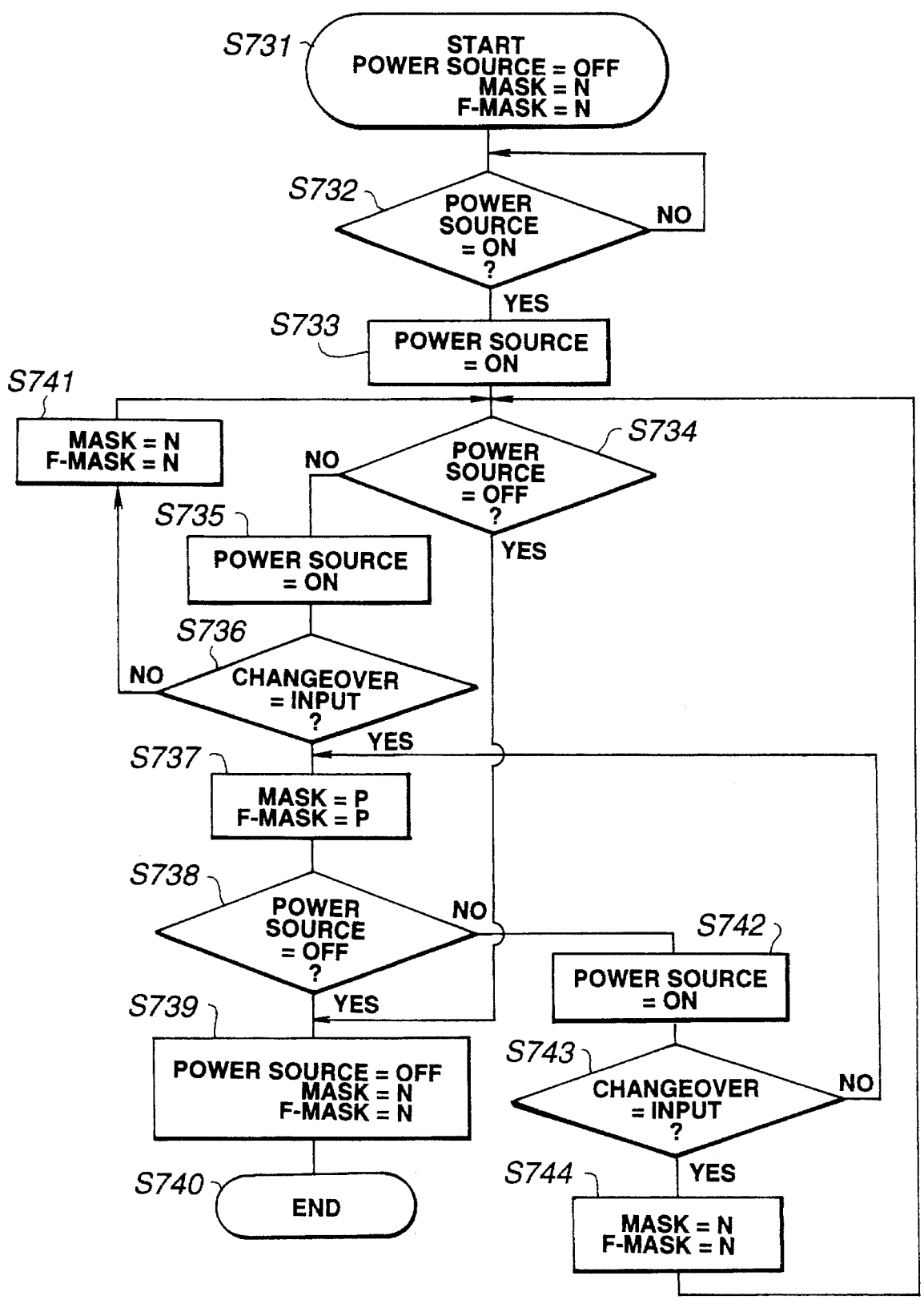
FIG. 38 is a flow chart showing a function of a camera according to a modification of the seventh embodiment.

FIGS. 36 to 38 show a seventh embodiment of the invention. FIG. 36 is a cross-sectional view showing a camera according to the seventh embodiment partially in block diagram.

FIG. 36 is a view looking from the side of a rear surface of the camera, that is, the side of a film. Photographing means such as photographing lenses, a focal plane shutter and the like (not shown) is arranged in front of an optical axis of an aperture 705.

A support shaft 722 is provided on a camera body 701 on the left-hand side with the aperture 705 therebetween, and an angularly movable P-shaft (panoramic shaft) 741 is arranged in parallel to the shaft 722 on the right-hand side of the support shaft 722. The P-shaft 741 is arranged such that an upper half thereof is brought to a right-hand threaded portion 741a, and a lower half thereof is brought to a left-hand threaded portion 741b. An upper mask 718 is threadedly engaged with the right-hand threaded portion 741a, and a lower mask 719 is threadedly engaged with the left-hand threaded portion 741b, with the aperture 705 put therebetween, symmetrically vertically. These masks 718 and 719 are slidably engaged also with the support shaft 722. The masks 718 and 719 are movable to a position (a normal position) N saved outwardly of the aperture 705, a position (a panoramic position) P which slightly projects inwardly of aperture 705 to regulate an exposure range of a panoramic photograph, and a position (a closed position) C projecting further inwardly.

An upper portion of the P-shaft 741 projects into a gear lid or enclosure 742 which is fixedly mounted on the camera body 701, and a gear 741c is integrally provided on the camera body 701. The gear 741c is in mesh with a pinion gear 746 of an output shaft of a motor 745 which is integrally supported by the camera body 701, through a second speed-reduction gear 743 and a first speed-reduction gear 7-44. Meanwhile, a PI gear (a photo-interrupter gear) 747 is in mesh with the pinion gear 746. The PI gear 747 is formed with a light shielding blade portion in the form of a propeller. A rotational amount of The PI gear 747 is photoelectrically detected by a PI (photo-interrupter) 748.

The first speed-reduction gear 744, the second speed-reduction gear 743 and the PI gear 747 are supported by the camera body 701 for angular movement, and are clamped by the gear closure 742.

The upper mask 718 is arranged such that a projection 718f is provided from a right-hand end surface thereof. The projection 718f is engaged with an N-switch (a normal-position detecting switch) 749 which is integrally supported by the camera body 701, to turn ON and OFF the N-switch 749. The N-switch 749 is a so-called leaf switch and is arranged as follows. That is, when the masks 718 and 719 are in the N (a normal position), the N-switch 749 is turned OFF. When the masks 718 and 719 are slightly inwardly from the N, the N-switch 749 is turned ON.

The N-switch 749 and the PI 748 are connected to the control circuit 751, and the motor 745 is further arranged as to be controlled by control circuit 751 through a drive circuit 752.

Connected to the control circuit 751 are power source means 753 that is a so-called main switch capable of switching the camera to OFF incapable of photographing and ON capable of photographing, changeover operating means 754 for indicating N (normal) and P (panorama) by the fact that an operating button is depressed so as to be turned ON, film presence and absence detecting means 755 formed by a leaf switch which is turned ON and OFF by a parrone, film rewinding operating means 756 that is a push button switch which is operated upon rewinding of a film back-closure opening and closing detecting means 757 so arranged as to turn ON and OFF the leaf switch that is well-known switch means, by a portion or part of the back closure, film feeding amount detecting means 758 for detecting movement of perforations in the film by PR (photo-reflector), and a film feeding motor 759 which is driven by the drive circuit 752, for driving film feeding means (not shown) to perform winding and rewinding of the film.

The control circuit 751 is further connected to an LCD (liquid crystal device) 762 that is a finder mask, through an LCD drive circuit (liquid crystal device drive circuit) 761. The LCD 762 is arranged within the finder optical path, and is so driven as to be switched by the LCD drive circuit 761 to a condition (N) looking at the finder visual field as it is in correspondence to the normal photographing condition and a condition (P) shielding, in light, upper and lower portions of the finder visual field in correspondence to the panoramic photographing condition.

Function of the seventh embodiment will be described with reference to a flow chart in FIG. 37.

Under an initial condition, the masks 718 and 719 are in the position N (normal), and the LCD 762 that is the finder mask is in a position N (normal), and the back closure is under a closed condition (S700). Moreover, at this time, the power source means 753 is turned ON.

When there is no changeover input due to the changeover operating means 754 (S701), the masks and 719 and the LCD 762 that is the finder mask are maintained as normal (S720). The program proceeds to a condition awaiting the changeover input (S721). The program proceeds to Step S722 or Step S704 in accordance with presence and absence of the changeover input. Meanwhile, when the changeover input is performed in Step S701, the motor 745 is driven through the drive circuit 752 by the control circuit 751. The P-shaft 741 is rotated in a direction indicated by a black arrow in FIG. 86. Simultaneously, the PI gear 747 is also moved angularly. A rotational amount thereof is detected by the PI 748. When the masks 718 and 719 are slightly moved inwardly, the N-switch 749 is turned OFF. An amount of movement from here is detected by the PI 748. The motor 745 is controlled such that the masks 718 and 719 stop at P (panoramic) position. Simultaneously, the finder mask portion of the LCD 762 is brought to a light shielding condition. The finder is brought to a P (panoramic) condition (S702).

When changeover operation is not performed (S708), the masks 718 and 719 and the LCD 762 that is the finder mask are maintained to P (S722). When rewinding indication is inputted (S728), the program proceeds to Step S718. When the rewinding indication is not inputted (S728) and the back closure opens (S724), the P-shaft 741 is rotated by the motor 745 in the direction indicated by the black arrow in FIG. 36. The masks 718 and 719 are moved inwardly. Meanwhile, when the back closure does not open in Step S724, the program proceeds to Step S703.

When the upper and lower masks 718 and 719 are abutted against each other so as to be brought to the closed position C, the motor 745 is locked, and this is detected by the PI 748 so that the motor 745 stops. At this time, the LCD 762 that is the finder mask is maintained to P (S725). Here, when the changeover operation is performed by the changeover operating means 754 (S726), the masks 718 and 719 are maintained to C, and the LCD 762 that is the finder mask is changed from P to N (S727). Further, when there is no changeover input in Step S726, the program proceeds to Step S709.

Next, in a case where the back closure is not closed, the program proceeds to Step S708. Meanwhile, when the back closure is closed (S728), the P-shaft 741 is moved angularly by the motor 745 in a direction indicated by a white arrow in FIG. 36. The masks 718 and 719 are moved outwardly from the C position. The N-switch 749 is subsequently turned OFF. By detection of the PI 748 from the time of being turned OFF, the masks 718 and 719 accurately stop at the N position. At this time, the LCD 762 that is the finder mask is maintained at N (S729).

Under the condition, in a case where rewinding of the film is not inputted (S730), the program is returned to Step S721. Meanwhile, when it is detected by the film feeding-amount detecting means 758 that the rewinding indication is inputted by the film rewinding operating means 748 or sequential or serial photographing ends so that the film is wound up, so that indication of the rewinding is inputted (S730), the masks 718 and 719 are moved from the N-position to the C-position. The LCD 762 that is the finder mask is in the N-position. The film feeding motor 759 is driven, and the film rewinding starts (S713). It is detected by the film feeding-amount detecting means 758 that the film rewinding ends, and the film feeding motor 759 stops (S714). The back closure opens (S715) and is closed (S716). The masks 718 and 719 are changed from C to N. The LCD 748 that is the finder mask is maintained to N (S717).

When it is detected by the film presence and absence detecting means 755 that the film is taken out (S718), the program is returned to Step S701, changeover operation is again made possible, or when a new film is loaded (S718), the film is wound through a predefined amount to perform preliminary winding (S719). Thus, one sequence ends.

Moreover, when rewinding indication is inputted (S705) at the time the masks 718 and 719 and the LCD 762 that is the finder mask are N (S704), the program proceeds to Step S703. In a case where the rewinding indication is not inputted (S705), if the back closure does not open, the program proceeds to Step S721. When the back closure opens (S706), the masks 718 and 719 are changed from N to C while the LCD 762 that is the finder mask is maintained at N (S707). That is, normally, when the back closure opens, the LCD 762 that is the finder mask is maintained as it is, and the masks 718 and 719 are brought to C.

Even also under the open condition of the back closure, it is possible to freely perform changeover between the normal position N and the panoramic position P. In this case, only the LCD 762 that is the finder mask is changed over (S707, S708, S709, S725, S726 and S727).

When the back closure is closed (S710) at the time the LCD 762 that is the finder mask is P (S709), the masks 718 and 719 are changed from C to P in accordance with display P of the LCD 762 that is the finder mask (S711).

Here, when there is no inputting of the rewinding indication, the program is returned to Step S703. When the rewinding indication is inputted (S712), the LCD 762 that is the finder mask is forcibly changed from P to N. Meanwhile, the masks 718 and 719 are brought to C (S713). Subsequently, the program proceeds to Step S714 similarly to the above.

According to the seventh embodiment arranged as described above, the mask is driven by opening and closing operation of the back closure with a simple mechanism, and the mask is in the projecting position C when the back closure opens. Accordingly, there is no fear that the rear end surface of the photographing lens and the shutter blade of the focal plane shutter is exposed to dirt and is damaged by the user and the leader portion of the film. Thus, the camera is brought to a camera high in reliability.

Moreover, when the back closure opens and is closed, the mask is returned to a previous assigned position. Accordingly, the camera is brought to a camera which is superior in convenience in use.

Furthermore, since the mask is in the projecting position upon rewinding, there is no fear that the photographing lens, the focal plane shutter and the like are broken by the leader portion of the film. Thus, the camera is brought to a camera which is high in reliability.

In addition, display is brought to N that is the normally used mode in interlocking manner with rewinding, and when (the film is taken out) the back closure is closed, the mask is also brought to N. Accordingly, since the display is brought to N that is the normally used mode when a new film is used, the camera is brought to a camera which is superior in convenience in use.

In connection with the above, in the seventh embodiment, the position of the mask can take three (3) positions including N, P and C. However, the invention should not be limited to this specific arrangement. For example, in a case where a 35 mm film is used, the positions of the mask may include the following four (4) positions:

N: 36 mm in width ×24 mm in length;

H: 36 mm in width ×20.25 mm in length;

P: 36 mm in width ×12 mm in length; and

C: shield.

In this case, the positions of the mask on the side of the finder are naturally three (3) conditions including N, H and P. Furthermore, the mask position may take various positions continuously.

A modification of the seventh embodiment will next be described. An arrangement of the modification is similar to the aforesaid seventh embodiment, and is shown in FIG. 36.

Operation of the present modification is similar to the operation described with reference to the flow chart in FIG. 37 which shows the seventh embodiment of the invention. However, this modification further has operation at turning-ON and -OFF of a power source in addition thereto. This will be described with reference to a flow chart in FIG. 38.

First, at the time of start, the power source means 753 that is the main switch is turned OFF. The masks 718 and 719 and the LCD 762 that is the finder mask are in the normal position N (S731).

When the power source means 753 is turned ON (S732, S733, S734 and S735), and when changeover indication is inputted by the changeover operating means 754 (S736), the masks 718 and 719 and the LCD 762 that is the finder mask are in the panoramic position P (S737). Here, when the power source means 753 is turned OFF (S738), the masks 718 and 719 and the LCD 762 that is the finder mask are brought to N (S739), and the program ends (S740).

Moreover, in a case where the power source means 753 is not turned OFF in Step S738, the power source means 753 is maintained to ON (S742). If the changeover indication is not inputted by the changeover operating means 754, the program proceeds to Step S737. In a case where the changeover indication is inputted, the masks 718 and 719 and the LCD 762 that is the finder mask are brought to N, and the program proceeds to Step S734 (S743).

Furthermore, when the power source means 753 is turned OFF (S734) at the time the masks 718 and 719 and the LCD 762 that is the finder mask are N (S741, S744), the masks 718 and 719 and the LCD 762 that is the finder mask are maintained to N (S739), and the program ends (S740).

As described above, according to the modification of the seventh embodiment, since the camera is returned to N that is the usually or normally used mode in interlocking with turning-OFF of the power source, the camera is brought to a camera which is superior in convenience in use in addition to the advantages of the aforesaid seventh embodiment.

In connection with the above, in the present modification, the masks are brought to N in interlocking manner with turning-OFF of the power source. However, the masks may be brought to N in interlocking manner with turning-ON of the power source.

Thus, according to the seventh embodiment, it is possible to provide an image-plane-size changeover camera which is provided with a protective unit for the camera, which does not expose to dirt and break the photographing means and which is high in reliability In this invention, it is apparent that working modes different in a wide range can be formed on the basis of this invention without departing from the spirit and scope of the invention. This invention is not restricted by any specific embodiment except as may be limited by the appended claims.

What is claimed is:

1. A camera changeable between a normal photographing image-plane size and a photographing image-plane size narrower than said normal photographing image-plane size, said camera comprising:

(a) a back closure openable and closable with respect to a camera body;

(b) an aperture arranged between a film and a photographing lens, for regulating an exposure size corresponding to said normal photographing image-plane size;

(c) light shielding means arranged between the film and the photographing lens, said light shielding means being movable between a saving position where said light shielding means is saved from said aperture so as not to interrupt an exposure luminous flux which is incident upon said aperture, and a projecting position where said light shielding means projects inwardly of said aperture to interrupt a part or substantially all of the exposure luminous flux;

(d) operating means for assigning said narrow photographing image-plane size; and (e) drive means for driving said light shielding means, said drive means driving said light shielding means to a predetermined position independently of assignment of said operating means responsive to opening of said back closure whereby said light shielding means serves the dual functions of controlling a photographing frame size of said aperture and preventing a film leader from entering into said aperture.

2. A camera according to claim 1, wherein said predetermined position is the saving position of said light shielding means.

3. A camera according to claim 1, wherein said predetermined position is a position where said light shielding means projects to an inward-most position.

4. A camera changeable between a normal photographing image-plane size and a photographing image plane size narrower than said normal photographing image-plane size, said camera comprising:

(a) an aperture arranged between a film and a photographing lens, for regulating an exposure range corresponding to said normal photographing image-plane size;

(b) light shielding means arranged between the film and the photographing lens, said light shielding means being movable between a saving position where said light shielding means is saved from said aperture so as not to interrupt an exposure luminous flux which is incident upon said aperture, and a projecting position where said light shielding means projects inwardly of said aperture to interrupt a part or substantially all of the exposure luminous flux;

(c) operating means for assigning said narrow photographing image-plane size;

(d) detecting means for detecting an operational condition of said camera; and (e) drive means for driving said light shielding means, said drive means driving said light shielding means to a predetermined position independently of said operating means in accordance with an output from said detecting means, whereby Said light Shielding means serves the dual functions of controlling a photographing frame size of Said aperture and preventing a film leader from entering into said aperture, 5. A camera according to claim 4, wherein said predetermined position is a position where said light shielding means projects to an inward-most position.

6. A camera according to claim 4, wherein said predetermined position is the saving position of said light shielding means.

7. A camera according to claim 4, wherein said detecting means includes means for detecting that a power source of said camera is brought from an ON condition to an OFF condition.

8. A camera according to claim 4, wherein said detecting means includes means for detecting that the back closure of said camera opens from a condition in which the back closure is closed.

9. A camera according to claim 4, wherein said detecting means includes means for detecting a condition that the film is forcedly rewound.

10. A camera according to claim 4, wherein said detecting means includes means for detecting an exposure condition to a surface of the film.

* * * * *